United States Patent
Fortier et al.

(10) Patent No.: US 8,943,128 B2
(45) Date of Patent: *Jan. 27, 2015

(54) SYSTEMS AND METHODS FOR CONVEYING INFORMATION TO AN INSTANT MESSAGING CLIENT

(75) Inventors: Stéphane Maxime François Fortier, Breakeyville (CA); Sean MacLean Murray, Toronto (CA)

(73) Assignee: BCE Inc., Montreal (CA)

( * ) Notice: Subject to any disclaimer, the term of this patent is extended or adjusted under 35 U.S.C. 154(b) by 1019 days.

This patent is subject to a terminal disclaimer.

(21) Appl. No.: 11/614,608

(22) Filed: Dec. 21, 2006

(65) Prior Publication Data
US 2008/0155018 A1 Jun. 26, 2008

(51) Int. Cl.
G06F 15/16 (2006.01)
H04L 12/58 (2006.01)
G06Q 10/10 (2012.01)

(52) U.S. Cl.
CPC .............. *H04L 12/581* (2013.01); *G06Q 10/10* (2013.01); *H04L 51/04* (2013.01); *H04L 12/5875* (2013.01)
USPC ............ 709/204; 709/223; 709/246; 725/135

(58) Field of Classification Search
USPC ........................................................ 709/204
See application file for complete search history.

(56) References Cited

U.S. PATENT DOCUMENTS

| | | | |
|---|---|---|---|
| 6,865,599 B2 | 3/2005 | Zhang | |
| 7,143,118 B2 | 11/2006 | Eichstaedt et al. | |
| 7,315,746 B2 | 1/2008 | Caspi et al. | |
| 2003/0208545 A1* | 11/2003 | Eaton et al. | 709/206 |
| 2004/0117444 A1 | 6/2004 | Goodman et al. | |
| 2004/0146144 A1 | 7/2004 | Gao et al. | |
| 2004/0158608 A1* | 8/2004 | Friedman | 709/206 |
| 2004/0260820 A1 | 12/2004 | Bearman | |
| 2005/0182817 A1 | 8/2005 | Andreev et al. | |
| 2005/0198149 A1 | 9/2005 | Johnson, II et al. | |
| 2005/0235038 A1* | 10/2005 | Donatella et al. | 709/206 |
| 2006/0015923 A1* | 1/2006 | Chuah et al. | 725/135 |
| 2006/0117264 A1 | 6/2006 | Beaton et al. | |
| 2006/0179410 A1* | 8/2006 | Deeds | 715/750 |
| 2006/0230154 A1 | 10/2006 | Nguyenphu et al. | |
| 2007/0043878 A1* | 2/2007 | Carlson et al. | 709/246 |

(Continued)

FOREIGN PATENT DOCUMENTS

WO WO 2006/070067 A1 7/2006
WO PCT/CA2006/002094 8/2007

OTHER PUBLICATIONS

Harold V. Newman, What Is IM bot?—a definition from Whatis.com, Nov. 23, 2003, 5 pages, http://searchdomino.techtarget.com/sDefinition/0,,sid4_gci935566,00.html.

(Continued)

Primary Examiner — Hamza Algibhah
(74) Attorney, Agent, or Firm — Gowling Lafleur Henderson LLP

(57) ABSTRACT

A method, comprising: providing a first client of an instant messaging service, the first client enabling a data service; receiving a request for the data service from a second client of the instant messaging service; and rendering client-controlled information regarding the first client available for persistent conveyance to the second client, the client-controlled information regarding the first client including data related to the data service. This allows a user associated with the second client to become aware of the data in a non-intrusive manner.

69 Claims, 44 Drawing Sheets

(56) References Cited

U.S. PATENT DOCUMENTS

| | | | |
|---|---|---|---|
| 2007/0094337 A1* | 4/2007 | Klassen et al. | 709/206 |
| 2007/0113181 A1* | 5/2007 | Blattner et al. | 715/706 |
| 2007/0162578 A1* | 7/2007 | Bhaskaran et al. | 709/223 |
| 2007/0168480 A1* | 7/2007 | Biggs et al. | 709/223 |
| 2008/0005235 A1* | 1/2008 | Hegde et al. | 709/204 |
| 2008/0065758 A1* | 3/2008 | Narayanaswami | 709/224 |
| 2008/0256107 A1* | 10/2008 | Banga et al. | 707/102 |
| 2009/0191851 A1* | 7/2009 | Hutt et al. | 455/414.1 |

OTHER PUBLICATIONS

Amit Agarwal, Record Google Talk Calls or Yahoo Messenger Voice Chats with Solicall at Digital Inspiration, Sep. 16, 2006, 1 page, http://labnol.blogspot.com/2006/09/record-google-talk-calls-or-yahoo.html.

Written Opinion of the International Preliminary Examining Authority mailed on Jan. 27, 2009 in connection with International Patent Application No. PCT/CA2006/002094.

International Preliminary Report on Patentability completed on Apr. 22, 2009 in connection with International Patent Application No. PCT/CA2006/002094.

Office Action mailed on May 21, 2009 in connection with U.S. Appl. No. 11/614,539.

Office Action mailed on Jul. 6, 2009 in connection with U.S. Appl. No. 11/614,628.

Office Action mailed on Dec. 30, 2009 in connection with U.S. Appl. No. 11/614,628, 44 pages.

Office Action mailed on Jan. 5, 2010 in connection with U.S. Appl. No. 11/614,539, 15 pages.

\* cited by examiner

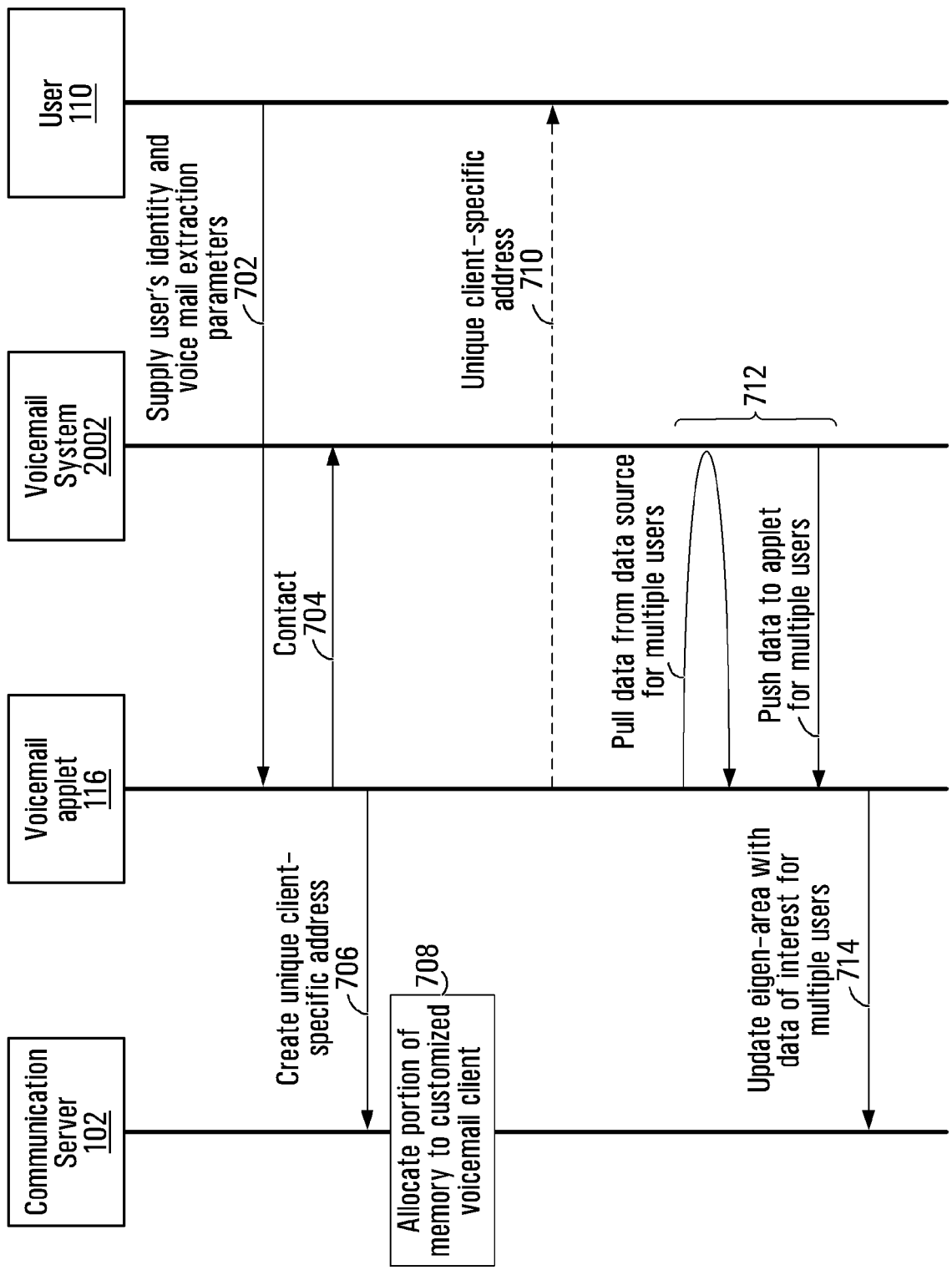

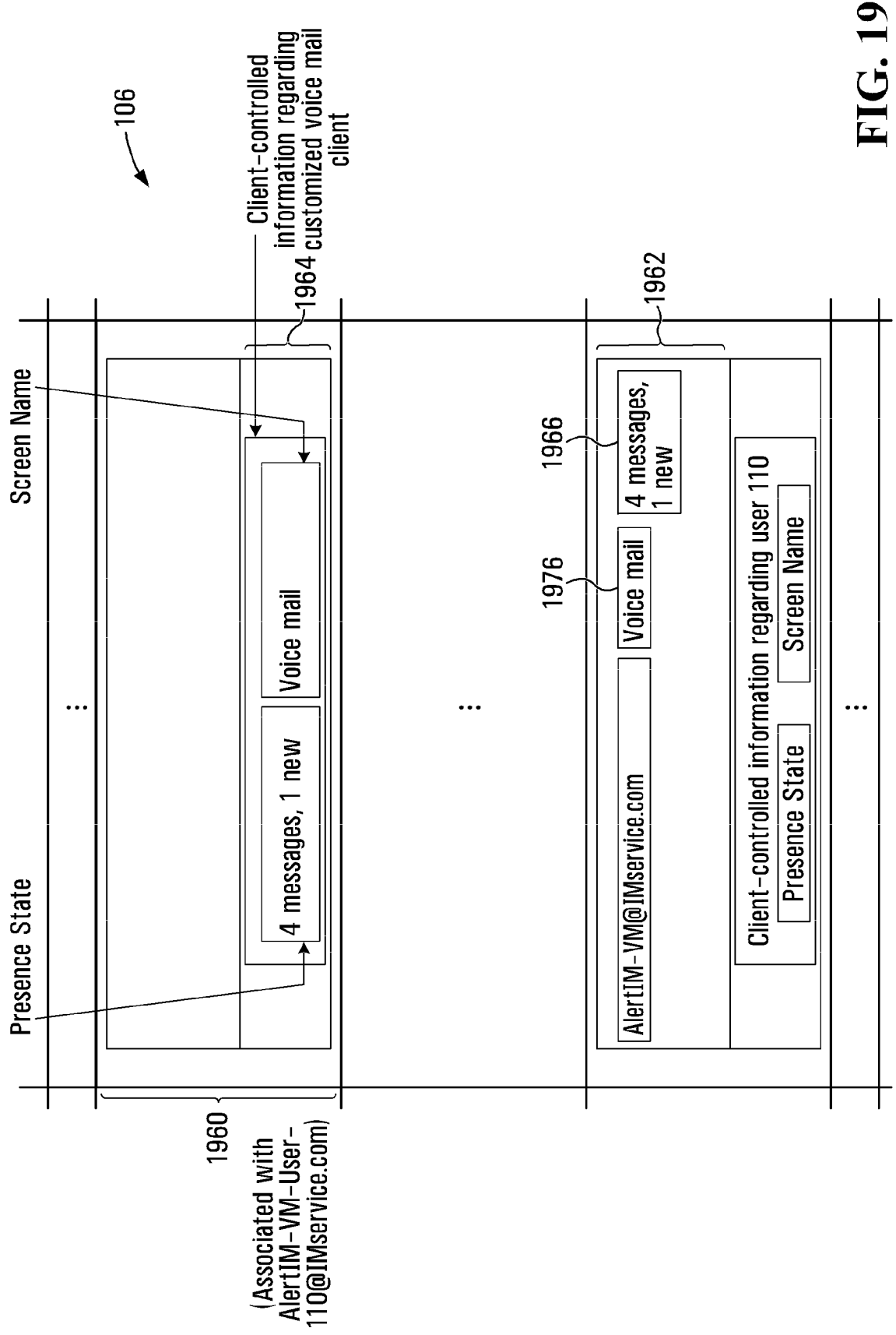

FIG. 20

File  Actions  Tools  Help

My Status:
▼ User 110 (Online)
  ⓘ Click here to join the Customer Experience Improvement Program
  ⊗ All Contacts (7/8)
    👤 Bo Diddley (online)
    👤 Jimi Hendrix (offline)
    ⇧ company ABC ($32.45)
    👤 weather YUL (cloudy +7)
    ✗ Smalltown residents asked to boil water
    ✗ Accident – Galipeault bridge – right lane
    ☒ web Search (133 relevant results, 50% complete)
    ☎ voice mail (4 messages, 1 new)
    ! email (14 messages, 8 unread, 1 from contacts)
    ☎ unified communication (email: 3 new messages)(work voice mail: 10 messages, 0 new)(home voice mail: 3 new messages)

⊗ I want to...
  + Add a Contact
  ☏ Send an Instant Message
  📎 Send a File or Photo
  ☏ Start a Voice Conversation
  ☏ Start a Video Conversation
  More

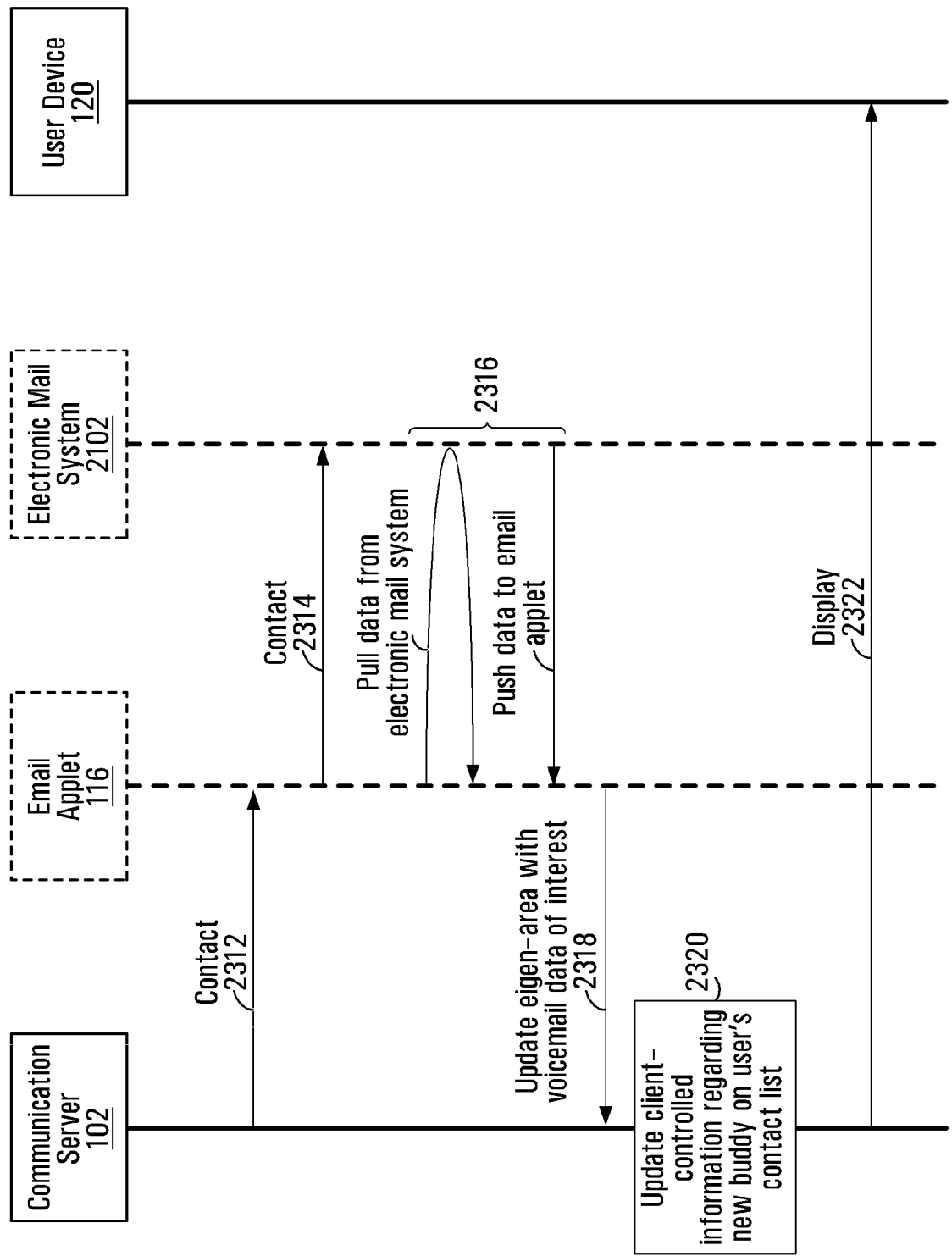

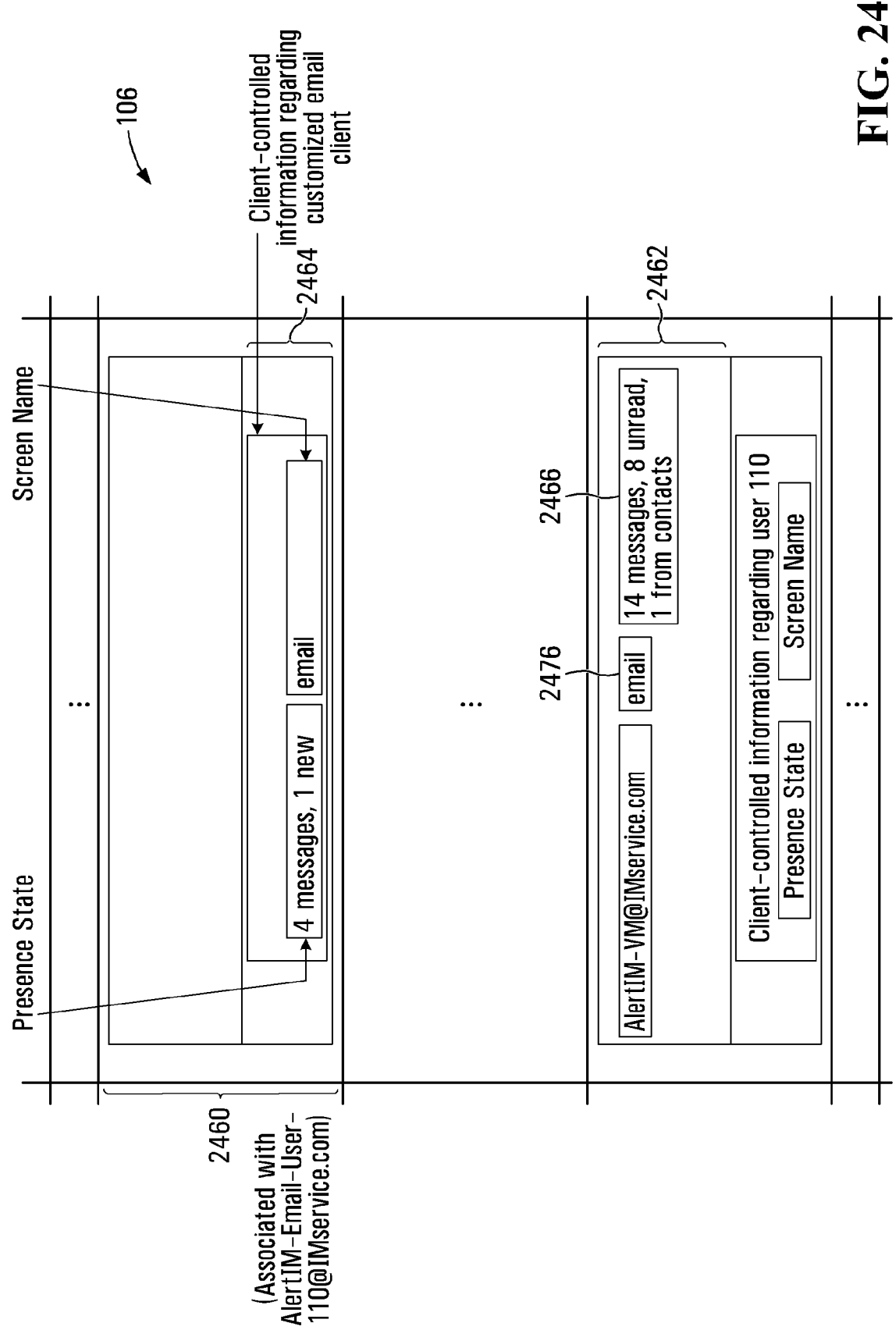

SYSTEMS AND METHODS FOR CONVEYING INFORMATION TO AN INSTANT MESSAGING CLIENT

FIELD OF THE INVENTION

The present invention relates generally to electronic communication and, in particular, to systems and methods for conveying information to clients of an instant messaging service.

BACKGROUND

Instant messaging has become an important communications tool for millions of people worldwide. Instant messaging (or "IM") is a form of real-time communication between two or more users based originally on typed text but which has since been expanded to include other media such as audio and video. The data is conveyed via computers connected over a network such as the Internet. Instant messaging requires the use of a client program that connects to an instant messaging service and differs from e-mail in that "conversations" are then able to happen in real time.

In some cases, the power of instant messaging can be harnessed to deliver services to users. This is done by designing artificial intelligence applications (or "applets" or "bots") and registering these applets as clients of the instant messaging service. However, rather than functioning as conversational end users, the applets provide services to users at large. One example of such a service is a database search (e.g., Internet search) based on a user query. In this scenario, a user who wishes to engage a search engine applet first learns the identity of the instant messaging client associated with the search engine applet. The user then sends an instant message containing a query to the client associated with the search engine applet, thereby invoking a database search. When the database search is complete, the search engine applet (which is logged in to the instant messaging service as a client) sends an instant message containing the search results back to the user.

Similar applets can be designed to provide other services that employ instant messages to inform a user of various events. However, as can be appreciated, the user may find it annoying to receive updates via instant message whenever an event takes place, especially when such events are likely to occur often. Similarly, if the user receives an update via instant message but then forgets the information that it conveys, the user will have difficulty recalling this information, since the prior instant message conveying this information is not easily accessible and may even have been erased from memory.

Thus, persons skilled in the art will appreciate that there is a need for improving the "user experience" associated with the conveyance of information to users of an instant messaging service.

SUMMARY OF THE INVENTION

A first broad aspect of the present invention seeks to provide a method, comprising: providing a first client of an instant messaging service, the first client enabling a data service; receiving a request for the data service from a second client of the instant messaging service; and rendering client-controlled information regarding the first client available for persistent conveyance to the second client, the client-controlled information regarding the first client including data related to the data service.

A second broad aspect of the present invention seeks to provide a system, comprising: an applet associated with a first client of an instant messaging service, the applet enabling a data service; a communication device associated with a second client of the instant messaging service, the second client configured to generate a request for the data service; the applet being configured to respond to said request by rendering client-controlled information regarding the first client available for persistent conveyance to the second client, the client-controlled information regarding the first client including data related to the data service.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 7 is a message flow diagram illustrating interaction between various components of the instant messaging architecture of FIG. 1, in a third example scenario applicable to data services that are private and in an example situation where one of the applets is a voice mail applet;

FIG. 19 illustrates an example of potential contents of memory areas of the memory of the communication server of FIG. 1, in connection with the first variant of the third example scenario and example situation considered in FIG. 7;

FIG. 20 illustrates an example of a window displayable on a screen of one of the communication devices of FIG. 1;

FIG. 23B is a message flow diagram illustrating further interaction between various components of the instant messaging architecture of FIG. 1, in connection with the non-limiting embodiment considered in FIG. 21;

FIG. 24 illustrates an example of potential contents of a memory area of the memory of the communication server of FIG. 1, in connection with the non-limiting embodiment of FIG. 21;

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
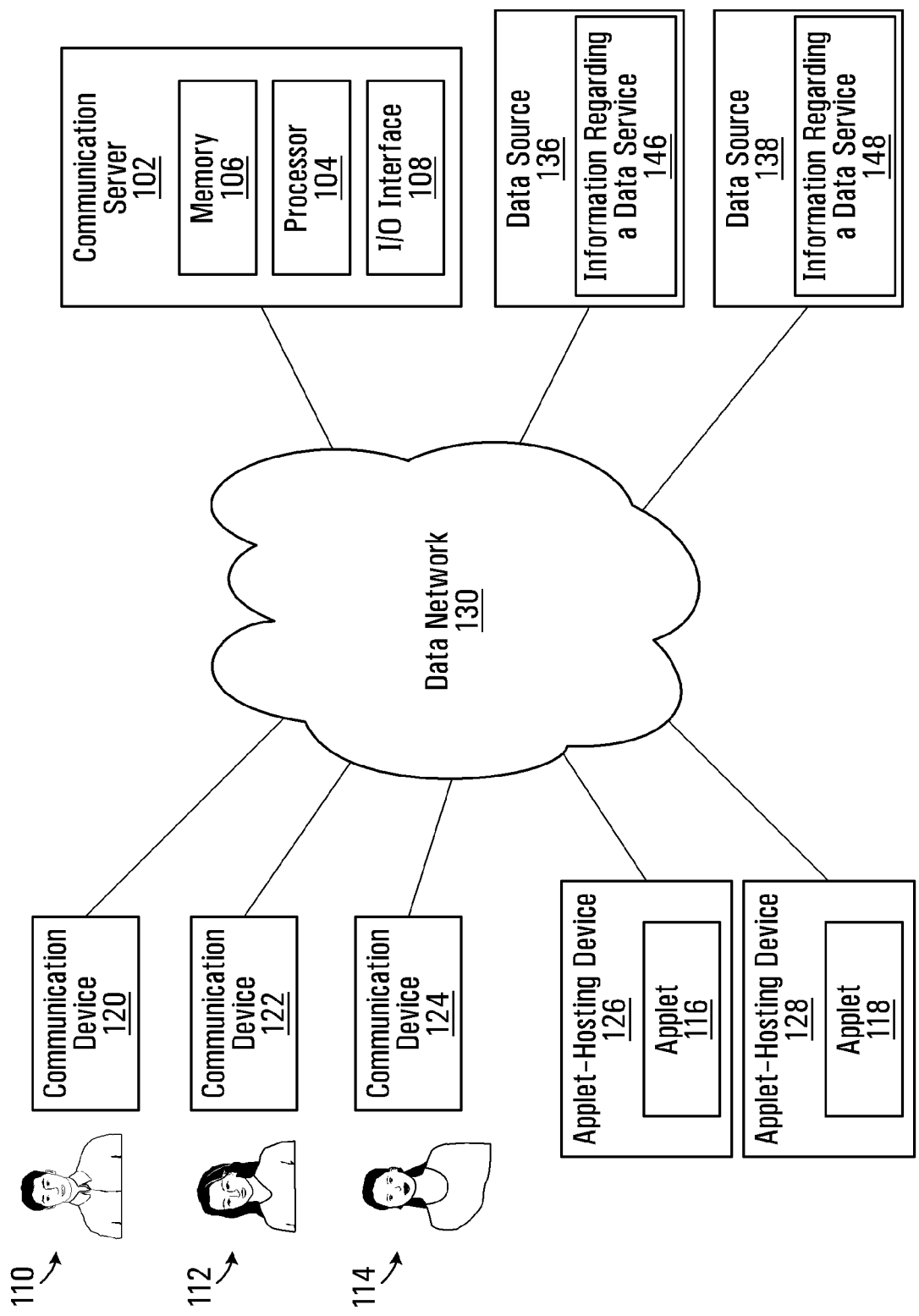
FIG. 1 illustrates an instant messaging architecture comprising a communication server providing an instant messaging service, applet-hosting devices on which reside applets, data sources storing or providing information regarding data services, and communication devices associated with users, in accordance with a non-limiting embodiment of the invention.

With reference to FIG. 1, there is shown an instant messaging architecture comprising a communication server 102 that is generally depicted as having a processor 104, a memory 106 and an interface 108. The processor 104 executes a messaging application, which can be defined by a set of instructions in the form of computer-readable program code stored in the memory 106. In certain embodiments, the memory 106 may be physically co-located with the processor 104, while in other embodiments, the memory 106 may be remote from the processor 104 and connected thereto by a communication link and/or a network (not shown).

The messaging application being executed by the processor 104 allows the communication server 102 to provide an instant messaging service, which can be viewed as a managed conduit for the exchange of instant messages among members of an instant messaging community. The instant messaging service provided by the messaging application may be an existing branded consumer instant messaging service (e.g. MSN Messenger, .NET Messenger Service, AOL Instant Messenger, Excite/Pal, Gadu-Gadu, Google Talk, iChat, ICQ, Jabber, Qnext, QQ, Skype, Trillian, Yahoo! Messenger, etc.) or an existing branded enterprise instant messaging service (e.g., Microsoft Communicator, IBM Lotus Sametime, etc.) or a proprietary instant messaging service or a combination thereof. The clients may include actual people (hereinafter referred to as "users" and denoted 110, 112, 114) as well as artificial intelligence agents (hereinafter referred to as "applets" or "bots" and denoted 116, 118) that are all registered as "clients" of the instant messaging service.

Each of the users (i.e., people) 110, 112, 114 employs a respective one of a plurality of communication devices 120, 122, 124 to exchange instant messages with other clients (i.e., either users or applets) of the instant messaging service via the communication server 102. The communication server 102 is reachable from the communication devices 120, 122, 124 via a data network 130, a non-limiting example of which is the Internet. Examples of communication devices 120, 122, 124 that may be employed by the users 110, 112, 114 include desktop computers, laptop computers, wireless networked personal digital assistants and cellular telephones, to name a few.

The applets 116, 118 may reside on respective applet-hosting devices 126, 128 that comprise the requisite hardware, firmware, software and/or control functionality to make each applet's interaction with the communication server 102 appear to the latter as if it were dealing with a person. Non-limiting examples of the applet-hosting devices 126, 128 include computer servers and server farms, for example. The communication server 102 is reachable from the applet-hosting devices 126, 128 via a data network, which may be—but is not limited to—the aforesaid data network 130. In accordance with non-limiting embodiments of the present invention, the applets 116, 118 provide data services to the users 110, 112, 114, various examples of which will be given later on in this specification.

Figure 17:
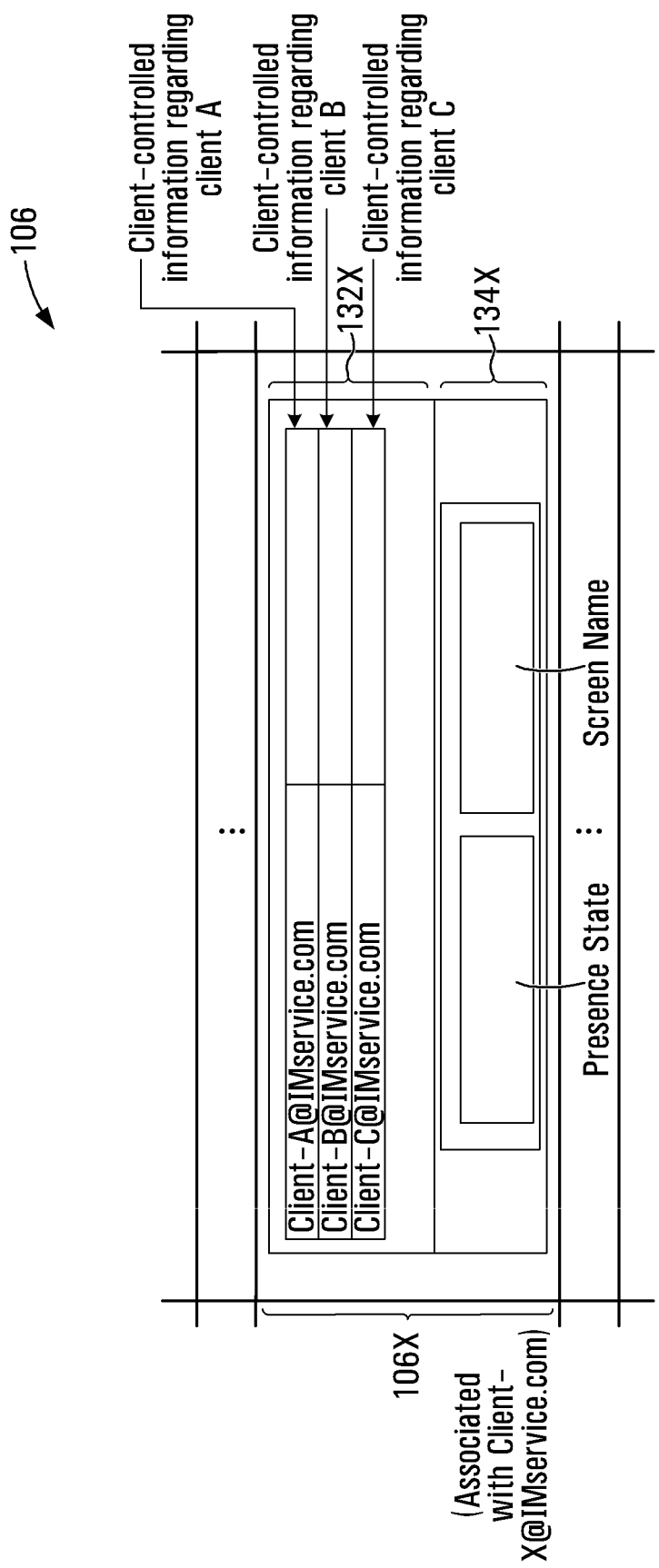
FIG. 17 illustrates an example of potential contents of a memory area of the memory of the communication server of FIG. 1, where the memory area is associated with a given client of the instant messaging service provided by the communication server.

In order to participate in the instant messaging service provided by the communication server 102, the clients of the instant messaging service (i.e., the users 110, 112, 114 and the applets 116, 118) begin by becoming clients of the communication server 102. More specifically, each of the clients of the instant messaging service contacts the communication server 102 at a known address over the data network 130 and sets up an account for that client. This can be done for free or in exchange for payment. With additional reference to FIG. 17, the account for a given client of the instant messaging service (e.g. client X) is characterized by a client-specific address and an area in the memory 106 of the communication server 102 (e.g., 106X) that is allocated to client X. The format of the client-specific address is not material; in the present example, it is an email-like address format (specifically, Client-X@IMservice.com for client X) but other formats (such as, without limitation, an IP address, a Uniform Resource Indicator, a Universal Internet Number, a Unified Identification Number, a proprietary string, etc) are of course possible without departing from the spirit of the present invention.

The client-specific address (in this example, Client-X@IMservice.com) is used to identify the given client of the instant messaging service (in this example, client X) to other clients of the instant messaging service (for instance, clients A, B and C having respective client-specific addresses Client-A@IMservice.com, Client-B@IMservice.com and Client-C@IMservice.com), so that instant messages can be routed to the appropriate recipient. In this way, the given client of the instant messaging service (in this example, client X) will receive instant messages sent to the client-specific address (in this example, Client-X@IMservice.com). In addition, when the given client of the instant messaging service (in this example, client X) sends an instant message to another client of the instant messaging service (for instance, any of clients A, B and C), the client-specific address (in this example, Client-X@IMservice.com) forms part of the instant message so that such other client can ascertain the origin of the instant message upon receipt.

Regarding the memory area 106X allocated to client X, it is used for maintaining a "contact list" 132X for client X, which links client X to other clients of the instant messaging service (e.g., clients A, B and C). More specifically, client X can identify other clients of the instant messaging service that client X may be interested in corresponding with (hereinafter referred to as "buddies" and sometimes also referred to as "contacts", both of which are expressions that have significance in relation to client X). Client X then adds the client-specific addresses of such other clients onto the given client's contact list 132X. Alternatively, the other clients that were identified as buddies of client X may add their respective client-specific addresses to the contact list 132X of client X. In the non-limiting example depicted in FIG. 17, the clients A, B and C are contacts of client X and, accordingly, their respective client-specific addresses (Client-A@IMservice.com, Client-B@IMservice.com and Client-C@IMservice.com) appear in the contact list 132X for client X.

To allow efficient management of communications, the contact list 132X also comprises at least one field that stores client-controlled information regarding each of the buddies of client X, i.e., each of the clients whose client-specific addresses appear in the contact list 132X. For example, a first field 1710 regarding a given buddy of client X may comprise a screen name of the given buddy, while a second field 1720 regarding a given buddy of client X may comprise a "presence state" of the buddy. The presence state of the given buddy of client X specifies an attentiveness of the given buddy of client X to receiving instant messages, while the screen name of the given buddy of client X specifies a name that the given buddy of client X wishes to use as an identifier during a conversation. Other fields (not shown) may also be used without departing from the spirit of the invention. The client-controlled information regarding a given buddy of client X provides information on the given buddy of client X and is available to all clients of the instant messaging service for whom the given buddy of client X is also their buddy—assuming that such availability of information is permitted by the privacy policy in place.

Conversely, to allow client X to appear as a buddy of other clients, the memory area 106X allocated to client X includes an eigen-area 134X containing client-controlled information regarding client X, which the communication server 102 can then make available to such other clients (e.g. clients A, B and C) whose contact lists include client X. As mentioned earlier, privacy settings could limit which of those other clients of the instant messaging service actually have visibility into the client-controlled information in the eigen-area 134X.

Thus, the client-controlled information regarding client X, which is stored in the eigen-area 134X, represents information that client X wishes to convey to certain other clients of the instant messaging service. The client-controlled information regarding client X can be modified by client X at any time (provided that client X is logged in to the instant messaging service). For example, the client-controlled information regarding client X may include a presence state and/or a screen name. In addition to, or in lieu of, the presence state and/or the screen name, and in accordance with non-limiting embodiments of the present invention, the client-controlled information regarding client X of the instant messaging service may include, for example, information regarding a data service, examples of which will be given later on.

In operation, as different clients of the instant messaging service log in and out of the instant messaging service, the communication server 102 ensures that each client's contact list contains up-to-date client-controlled information regarding the buddies of that client. For example, the communication server 102 can ensure that contact lists are kept up-to-date by (i) consulting the eigen-area 134X in order to learn the client-controlled information regarding client X; (ii) identifying which clients of the instant messaging service have included client X on their contact lists; and (iii) updating the client-controlled information regarding client X on those other clients' contact lists. This process would be performed for each client.

In another non-limiting embodiment, the contact list for a given client (user or applet) can be kept up-to-date automatically if it is designed to include pointers to the eigen-areas of the various buddies of the given client, rather than to store copies of the client-controlled information stored in those eigen-areas.

In yet another non-limiting embodiment, it should be appreciated that the contact list for a given client (user or applet) of the instant messaging service can be stored on the communication device or applet-hosting device being used by the given client to participate in the instant messaging service, rather than on the communication server 102. The communication server 102 can therefore disseminate updated client-controlled information to the contact lists stored by the various clients.

It should further be appreciated that in a peer-to-peer embodiment, the various clients of the instant messaging service contact each other without assistance from the communication server 102. Thus, the communication server 102 can be entirely dispensed with, which would leave both the contact lists for the various clients and the eigen-areas for those clients to be stored in a distributed fashion, such as on the devices used by those clients. Thus, if a given client knows the addresses of other clients for whom the given client is a buddy, then in order to ensure that the information on the contact lists of those other clients is up-to-date, the given client can push the client-controlled information regarding the given client to those other clients directly. Alternatively, if a given client knows the addresses of his or her buddies, then to ensure that the information on the given client's contact list is up-to-date, the given client can obtain the client-controlled information regarding its buddies by polling them directly.

For simplicity, the remainder of this description returns to the situation where the communication server 102 stores both the contact list 132X for client X and the eigen-area 134X for client X in the memory area 106X on the communication server 102, although it should be expressly understood that the present invention also applies to embodiments where at least one of the contact list 132X for client X and the eigen-area 134X for client X, and possibly both, may be stored on the device used by client X to participate in the instant messaging service.

Having logged in to the instant messaging service, a given client of the instant messaging service (such as client X) may compose an instant message destined for a recipient (such as client A, B or C). The recipient can be identified by explicitly entering the client-specific address of the recipient (e.g., Client-A@IMservice.com, Client-B@IMservice.com or Client-C@IMservice.com—other formats of course being possible) or by choosing a buddy from the given client's contact list (e.g., contact list 132X). The manner in which instant messages are sent and received is generally known and, as such, it need not be described in greater detail.

As mentioned previously, the applets 116, 118 provide data services to the users 110, 112, 114. Generally speaking, the provision of a data service involves accessing data from one or more data sources and enabling conveyance of the accessed data to one or more of the users 110, 112, 114. To this end, FIG. 1 depicts a plurality of data sources 136, 138 that store or provide data 146, 148 that may be of interest to various ones of the users 110, 112, 114. The data 146, 148 is hereinafter referred to as "information regarding a data service". In some embodiments, the data sources 136, 138 are accessible by the applets 116, 118 via dedicated communication links or via a data network, which can be—but is not limited to—the aforesaid data network 130. In other implementations, certain ones of the data sources 136, 138 may be integrated with certain ones of the applets 116, 118 on the corresponding applet-hosting device(s) 126, 128. Persons skilled in the art will appreciate that the number of data sources 136, 138 and their location within the architecture of FIG. 1 is not particularly limited. Moreover, there is not necessarily a fixed correspondence between the applets 116, 118 and the data sources 136, 138, since a given one of the applets 116, 118 may need to access different ones of the data sources 136, 138 at different times; conversely, a common one of the data sources 136, 138 may need to be accessed by different ones of the applets 116, 118 at different times.

Embodiments of the present invention contemplate a wide variety of data services to be provided by the applets 116, 118. These include data services that are generic (i.e., providing data that is of potential interest to multiple users), customized (i.e., providing data that is requested by individual users) and private (i.e., providing data that is requested by individual users and is only accessible with the user's permission). These non-limiting possibilities are now discussed in greater detail with reference to specific ones of the drawings.

Scenario I (FIGS. 2, 3, 4A-4F, 9A-9C)

Scenario I is applicable to data services that are generic (i.e., providing data that is of potential interest to multiple users). Specific non-limiting examples of data services to which Scenario I applies include, without limitation:

a share price reporting service (where the information regarding a data service is the share price of a given company);

a weather reporting service (where the information regarding a data service is a weather report for a given city);

a sports reporting service (where the information regarding a data service is the current score in a sporting event);

a web monitoring service (where the information regarding a data service is an indication of the most recent addition to a blog or website);

a general traffic reporting service (where the information regarding a data service is an indication of the traffic conditions on certain roads or bridges);

a news reporting service on specific topics (where the information regarding a data service is news regarding the specific topics);

a movie listing service (where the information regarding a data service is a schedule or price grid for movies being shown at a certain movie theater);

a horoscope service (where the information regarding a data service is commentary about each zodiac sign);

a lottery results service (where the information regarding a data service is the result of recent prize draws);

a transportation schedule service (where the information regarding a data service is current information regarding trains, flights, public transit, etc.)

a product pricing service (where the information regarding a data service is information regarding the movement in the price of a certain product available from one or more suppliers);

an advertisement service (where the information regarding a data service is an advertisement for a product or service);

etc.

Figure 2:
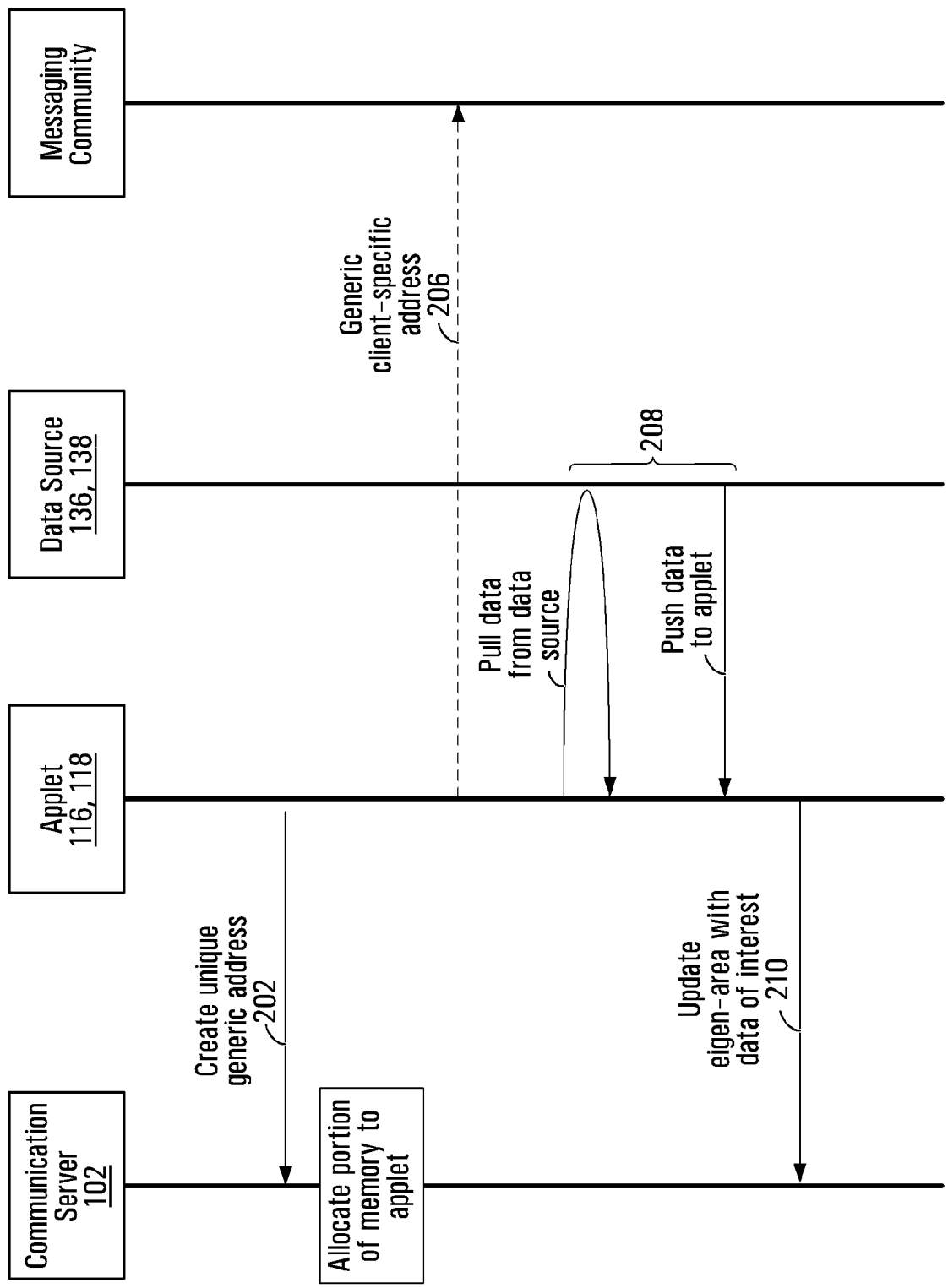
FIG. 2 is a message flow diagram illustrating interaction between various components of the instant messaging architecture of FIG. 1, in a first example scenario applicable to data services that are generic.

For the purposes of the discussion to follow, it is assumed that applet 116 provides a share price reporting service that produces the share price of company ABC, and that applet 118 provides a weather reporting service that produces a weather report for Montreal, Canada. This is of course a non-limiting example. With reference now to FIG. 2, there is shown a message flow diagram that illustrates configuration of the applets 116, 118 under Scenario I, in accordance with a specific non-limiting example of the present invention. Configuration of the applets 116, 118 begins by registering the applet in question (either autonomously or with the aid of a person) as a client of the instant messaging service. As shown at step 202, this is done by contacting the communication server 102 (in this case, www.IMservice.com) and creating a generic client-specific address associated with applet 116 and/or applet 118. What is meant by the client-specific address being "generic" is that it is configured to operate independently of demand for the data service associated with the applet in question. Initial configuration of the applet in question can be done by an operator of the applet in question, or it can occur in response to an original user request. By way of specific non-limiting example, in the case of applet 116, a suitable generic client-specific address could be AlertIM-shareprice-ABC@IMservice.com, while in the case of applet 118, a suitable generic client-specific address could be AlertIM-weather-YUL@IMservice.com (where "YUL" is the airport code for Montreal, Canada).

At step 204, in response to creation of the generic client-specific address associated with the applet in question at step 202, the messaging application executed by the processor 104 in the communication server 102 allocates a portion of the memory 106 to the applet in question. For example, with reference to FIG. 9A, the messaging application executed by the processor 104 in the communication server 102 allocates a memory area 916 to applet 116 and a memory area 918 to applet 118. It will be observed that each of the memory areas 916, 918 comprises a respective contact list 926, 928 for the respective applet 116, 118. Initially, the contact lists 926, 928 can be empty, i.e., they do not include the client-specific addresses of any other clients of the instant messaging service (that is, applets 116, 118 have no "buddies"). The memory areas 916, 918 each further comprise a respective eigen-area 936, 938 containing client-controlled information regarding the respective applet 116, 118, which the communication server 102 will make available to other clients of the instant messaging service (such as, potentially, users 110, 112, 114) if their contact lists ultimately include applet 116 and/or applet 118.

The client-controlled information regarding applet 116 (which is stored in eigen-area 936) represents information that applet 116 wishes to convey to other clients of the instant messaging service. Similarly, the client-controlled information regarding applet 118 (which is stored in eigen-area 938) represents information that applet 118 wishes to convey to other clients of the instant messaging service. The client-controlled information stored in eigen-area 936 or eigen-area 938 may include a presence state and/or a screen name. The presence state could be used to specify an attentiveness of the applet in question to receiving instant messages, while the screen name could be used to specify an identifier that the applet in question wishes to use to identify itself during a conversation. However, in accordance with non-limiting embodiments of the present invention, either or both of the presence state and/or the screen name (and/or possibly other portions of the client-controlled information stored in the eigen-areas 936, 938) is used to convey information regarding a data service, which in the case of applet 116 is the share price of company ABC and in the case of applet 118 is the weather report for Montreal, Canada.

Accordingly, and returning to FIG. 2 at step 208, applets 116 and 118 are configured to obtain the information regarding a data service 146, 148 from one (or more) of the data sources 136, 138. It is assumed for convenience that data source 136 is capable of producing the share price of company ABC for use by applet 116, and that data source 138 is capable of producing the weather report for Montreal, Canada for use by applet 118, although this association between the applets 116, 118 and the data sources 136, 138 is not to be considered a limitation of the present invention.

In order for applet 116 to obtain the share price of company ABC from data source 136, applet 116 may occasionally, continuously, synchronously or asynchronously pull the share price of company ABC from data source 136; alternatively, data source 136 may be configured to occasionally, continuously, synchronously or asynchronously push the share price of company ABC to applet 116. This latter functionality can be achieved by applet 116 placing a request with data source 136 to receive the share price of company ABC. Similarly, in order for applet 118 to obtain the weather report for Montreal, Canada from data source 138, applet 118 may occasionally, continuously, synchronously or asynchronously pull the weather report for Montreal, Canada from data source 138; alternatively, data source 138 may be configured to occasionally, continuously, synchronously or asynchronously push the weather report for Montreal, Canada to applet 118. This latter functionality can be achieved by applet 118 placing a request with data source 138 to receive the weather report for Montreal, Canada.

Assume now that the share price of company ABC is "$32.45" and that the weather report for Montreal, Canada is "cloudy+7". This data is received by the applets 116, 118 as a result of execution of step 208. At step 210, each of the applets 116, 118 is configured to update respective eigen-area 936, 938 for the relevant applet with the received information regarding a data service.

Figure 9A:
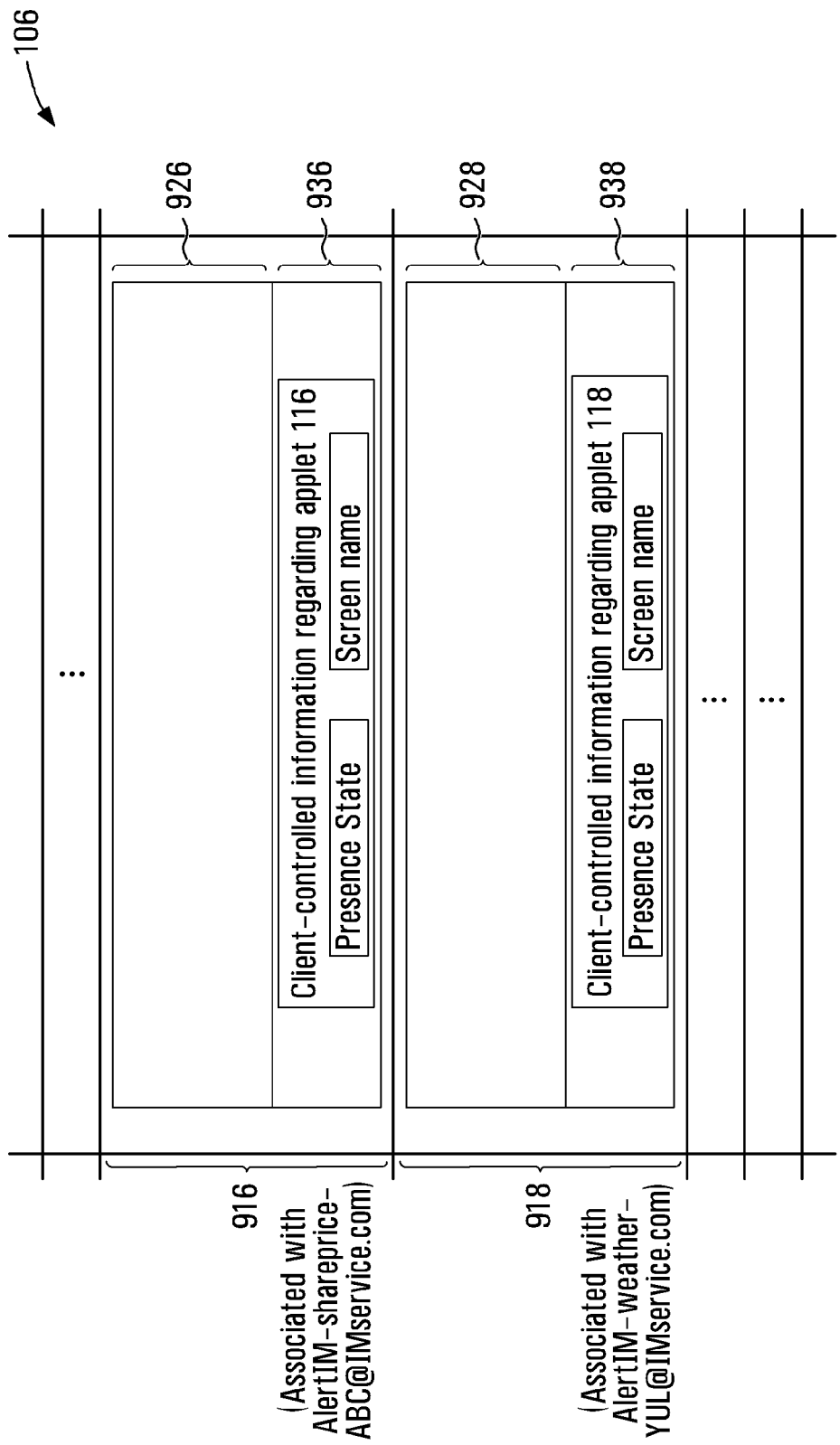
FIG. 9A illustrates an example of potential contents of memory areas of a memory of the communication server of FIG. 1, in connection with the first example scenario considered in FIG. 2.
Figure 9B:
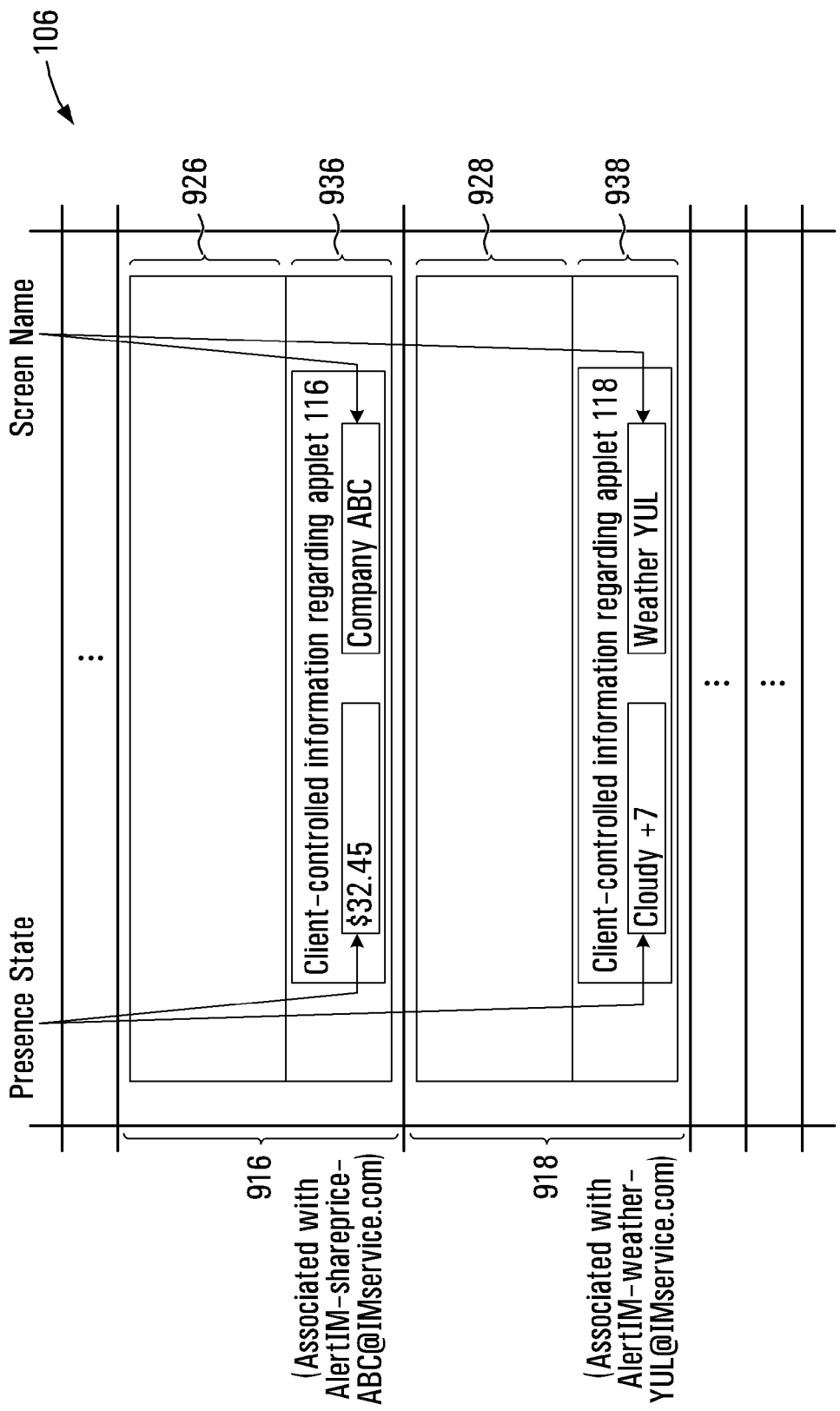
FIG. 9B illustrates an example of potential updated contents of the memory areas of FIG. 9A.

Specifically, and with reference to FIG. 9B, applet 116 can update the client-controlled information in eigen-area 936 by causing the presence state to reflect the share price of company ABC (which, in the present example, is "$32.45"). In addition, or alternatively, applet 116 can update the client-controlled information in eigen-area 936 by causing the presence state to reflect data that can be easily expressed using simple icons, such as whether the share price of company ABC has risen/fallen/remained unchanged since the previous day's close or since the previous trade, or whether the related stock (or the stock market) is open or closed for trading. In one embodiment, the presence state can be caused to indicate "online" when the share price has risen and "offline" otherwise. In another embodiment, the presence state can be caused to indicate "online" when the related stock is open for trading and "offline" otherwise. Of course, in an alternative embodiment, applet 116 could have updated the client-controlled information in eigen-area 936 by also (or instead) causing the screen name and/or possibly other portions of the client-controlled information stored in eigen-area 936 to reflect the share price of company ABC and/or the change in share price and/or other information pertaining to the related stock. In summary, the information of interest is stored in eigen-area 936 as text data or other data (such as data that encodes one or more graphical icons).

Similarly, applet 118 can update the client-controlled information in eigen-area 938 by causing the presence state to reflect the weather report for Montreal, Canada (which, in the present example, is "cloudy+7"). In addition, or alternatively, applet 118 can update the client-controlled information in eigen-area 938 by causing the presence state to reflect data that can be easily expressed using simple icons, such as the presence or absence of headline news. Of course, in an alternative embodiment, applet 118 could have updated the client-controlled information in eigen-area 938 by also (or instead) causing the presence state and/or possibly other portions of the client-controlled information stored in eigen-area 938 to reflect the weather report for Montreal, Canada and/or the general weather conditions (such as cloudy, sunny, snow, etc.) In summary, the information of interest is stored in eigen-area 938 as text data or other data (such as data that encodes one or more graphical icons).

Interaction between a given one of the communication devices 120, 122, 124 and the communication server 102 under Scenario I is now described. For the sake of simplicity, let the given communication device be communication device 120 which is associated with user 110, and let it be assumed that user 110 is a client of the instant messaging service. That is to say, user 110 has a client-specific address, say, "User-110@IMservice.com". In addition, a portion of the memory 106 is allocated to user 110. For example, with reference to FIG. 9C, the messaging application executed by the processor 104 in the communication server 102 allocates a memory area 910 to user 110.

It will be observed that memory area 910 comprises a contact list 920 for user 110. Initially, the contact list 920 can be empty, i.e., it does not include the client-specific addresses of any other clients of the instant messaging service (that is, user 110 has no "buddies"). Over time, various buddies to the contact list 920 can be added or removed by control of the messaging application executed by the processor 104 in the communication server 102. The memory area 910 further comprises an eigen-area 930 containing client-controlled information regarding user 110, which the communication server 102 will make available to other clients of the instant messaging service (such as, potentially, users 112, 114 and applets 116, 118) if their contact lists ultimately include user 110.

Figure 3:
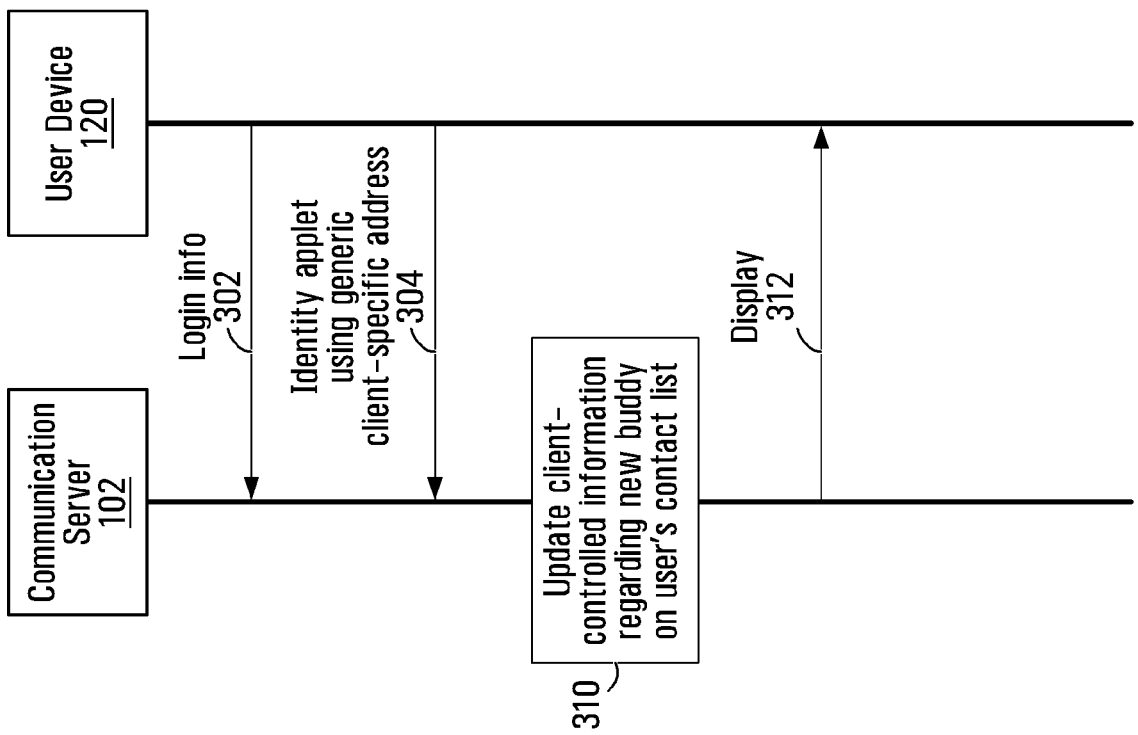
FIG. 3 is a message flow diagram illustrating further interaction between various components of the instant messaging architecture of FIG. 1, in the first example scenario considered in FIG. 2.

With reference now to the message flow diagram in FIG. 3, user 110 uses communication device 120 to log in to (i.e., thereby instantiating a client of) the instant messaging service at step 302. This can be achieved by providing identification and authentication credentials such as a username and a password, for example.

At step 304, user 110 identifies as a "buddy" an applet that provides a desired data service, by entering the generic client-specific address associated with the applet in question. In the example being presently described, user 110 may enter one of the aforesaid generic client-specific addresses, namely AlertIM-shareprice-ABC@IMservice.com (which is associated with applet 116 providing a share price reporting service that produces the share price of company ABC) or AlertIM-weather-YUL@IMservice.com (which is associated with applet 118 providing a weather reporting service that produces a weather report for Montreal, Canada). In certain embodiments, user 110 identifies the applet that provides the desired data service by invoking a directory service offered by the communication server 102, while in other embodiments, user 110 may directly type in the generic client-specific address associated with the applet in question.

Figure 9C:
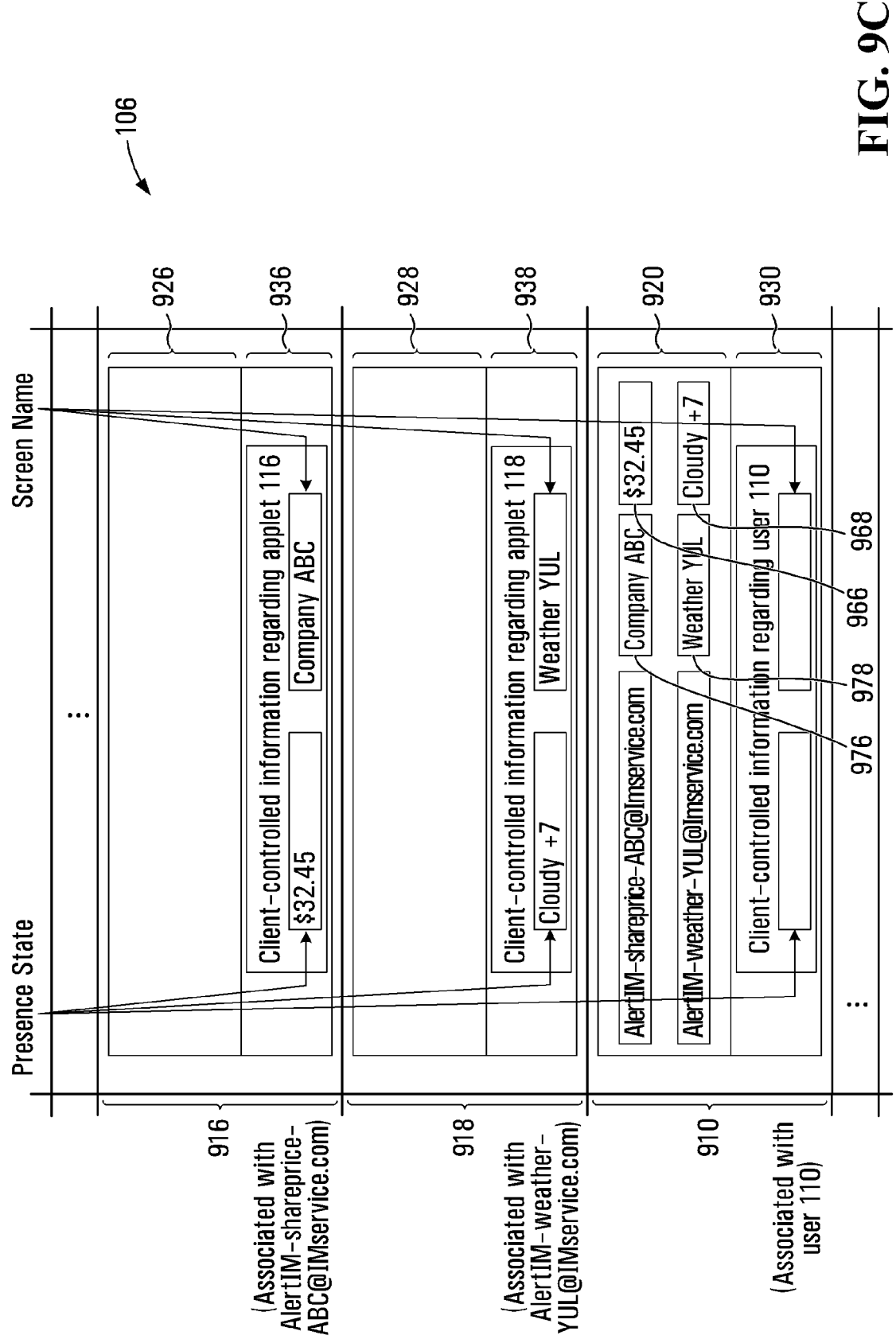
FIG. 9C illustrates a further example of potential contents of memory areas of the memory of the communication server of FIG. 1, in connection with the first example scenario considered in FIG. 2.

Having identified the generic client-specific address associated with the applet that provides the desired data service (e.g. applet 116 or applet 118), and with additional reference to FIG. 9C, the applet in question is added to the contact list 920 of user 110, leaving at least one corresponding field in the contact list 920 for storing the client-controlled information regarding the applet in question. In the present example, not to be considered limiting, fields 966, 976 are used to store the presence state and screen name, respectively, of the client having the generic client-specific address AlertIM-shareprice-ABC@IMservice.com, while fields 968, 978 are used to store the presence state and screen name, respectively, of the client having the generic client-specific address AlertIM-weather-YUL@IMservice.com.

As an aside, it should be appreciated that an optional step (206) could have been performed in FIG. 2, whereby the generic client-specific address created at step 202 could have been revealed to the user community in order to inform the various clients of the instant messaging service (in particular, user 110) of the generic client-specific address associated with applet 116 and/or applet 118. It should be appreciated that step 206 is optional, since the clients of the instant messaging service can gain awareness of the generic client-specific address associated with applet 116 and/or applet 118 in other ways, such as through other communication devices and other methods of communication, including, without limitation: interaction with a customer service representative, interaction with an automated voice response system, interaction with a web portal, receipt of an email, text message or instant message containing the generic client-specific address, etc. It should further be appreciated that the clients of the instant messaging service may employ a directory service (e.g. operated by the communication server 102) and, as such, not need be explicitly aware of the generic client-specific address associated with applet 116 and/or applet 118 in order to identify the applet in question.

Returning now to FIGS. 3 and 9C, at step 310, having determined that the client-controlled information regarding the new buddy (i.e., one of the applets 116, 118) has been updated in eigen-area 936 or 938, the messaging application executed by the processor 104 in the communication server 102 updates the client-controlled information regarding the new buddy on a contact list 920 for user 110.

Specifically, the client-controlled information regarding applet 116 is obtained from eigen-area 936 which, as previously described, conveys the share price of company ABC. In one embodiment, the messaging application executed by the processor 104 in the communication server 102 copies the presence state and screen name from eigen-area 936 into fields 966, 976 of the contact list 920, respectively. In another embodiment where the fields 966, 976 contain pointers to, respectively, the presence state and screen name in eigen-area 936, the client-controlled information regarding the applet in question will be instantly updated without the need for data transfer.

For its part, the client-controlled information regarding applet 118 is obtained from eigen-area 938 which, as previously described, conveys the weather report for Montreal, Canada. In one embodiment, the messaging application executed by the processor 104 in the communication server 102 copies the presence state and screen name from eigen-area 938 into fields 968, 978 of the contact list 920, respectively. In another embodiment where the fields 968, 978 contain pointers to, respectively, the presence state and screen name in eigen-area 938, the client-controlled information regarding the applet in question will be instantly updated without the need for data transfer.

At this point, the client-controlled information regarding the applet in question (which, it is recalled, comprises the information regarding the desired data service) is ready for observation by user 110. Accordingly, at step 312, which can be inherent in step 310 or a separate step altogether, the client-controlled information regarding the applet in question can be conveyed to user 110 in a visual format.

In a specific non-limiting example, and with reference to FIG. 20, the client-controlled information regarding the applet in question can be displayed on a screen of communication device 120 in the form of text, graphics and/or an icon. In this example, "Bo Diddley" and "Jimi Hendrix" are screen names employed by other users that happen to be buddies of user 110. Also, "company ABC" and "$32.45" are, respectively, the screen name and presence state of the client-controlled information regarding applet 116, which provides a share price reporting service that produces the share price of company ABC. Of note is the upwards arrow on the left of "company ABC", which conveys yet further information regarding a data service. In addition, "weather YUL" and "cloudy+7" are, respectively, the screen name and presence state of the client-controlled information regarding applet 118, which provides a weather reporting service that produces a weather report for Montreal, Canada.

Persons skilled in the art will therefore appreciate that the above described embodiments allow the persistent conveyance of client-controlled information regarding the applet in question to user 110, in a non-intrusive manner and without interrupting user 110. Specifically, in two non-limiting examples, user 110 can monitor the share price of company ABC or the weather report for Montreal, Canada on an ongoing basis—and at times of his or her own choosing. Moreover, user 110 is not compelled to remember the share price of company ABC or the weather report for Montreal, Canada since user 110 can refresh his or her knowledge merely by glancing at the contact list 920.

Meanwhile, it will be recalled from step 208 in FIG. 2, applets 116 and 118 continue to obtain the information regarding a data service 146, 148 (i.e., share price of company ABC or weather report for Montreal, Canada) from the data sources 136, 138. Thus, the client-controlled information regarding the applets 116, 118 will continue to be updated in eigen-areas 936, 938 as the applets 116, 118 continue to execute, which ensures currency of the information being persistently conveyed to, and observed by, user 110.

Persons skilled in the art will appreciate that in some embodiments, observation of the information regarding a data service by user 110 does not require adding the applet in question to the contact list 920 for user 110. Specifically, the messaging application executed by the processor 104 in the communication server 102 can be configured to persistently convey the client-controlled information regarding the applets 116, 118 (which is contained in eigen-areas 936, 938) even while user 110 merely browses the directory service.

Persons skilled in the art will also appreciate that despite the public nature of the data services falling under Scenario I, it may nevertheless be beneficial to ensure that a given user who wishes to benefit from a particular data service be first authorized to do so. For example, it is within the scope of the present invention to require that the given user pay for the data service on a per-use basis, on a per-applet basis or in accordance with any suitable subscription scheme. It is also within the scope of the present invention to require that the given user enroll with the applet-hosting device that hosts the applet that provides the particular data service.

Thus, an authorization step may be included at some point during Scenario I, or even prior to step 202 of Scenario I. For the sake of simplicity, the examples to follow assume that user 110 intends to access the data service provided by applet 116. However, this is not to be considered as a limitation of the present invention.

Figure 4A:
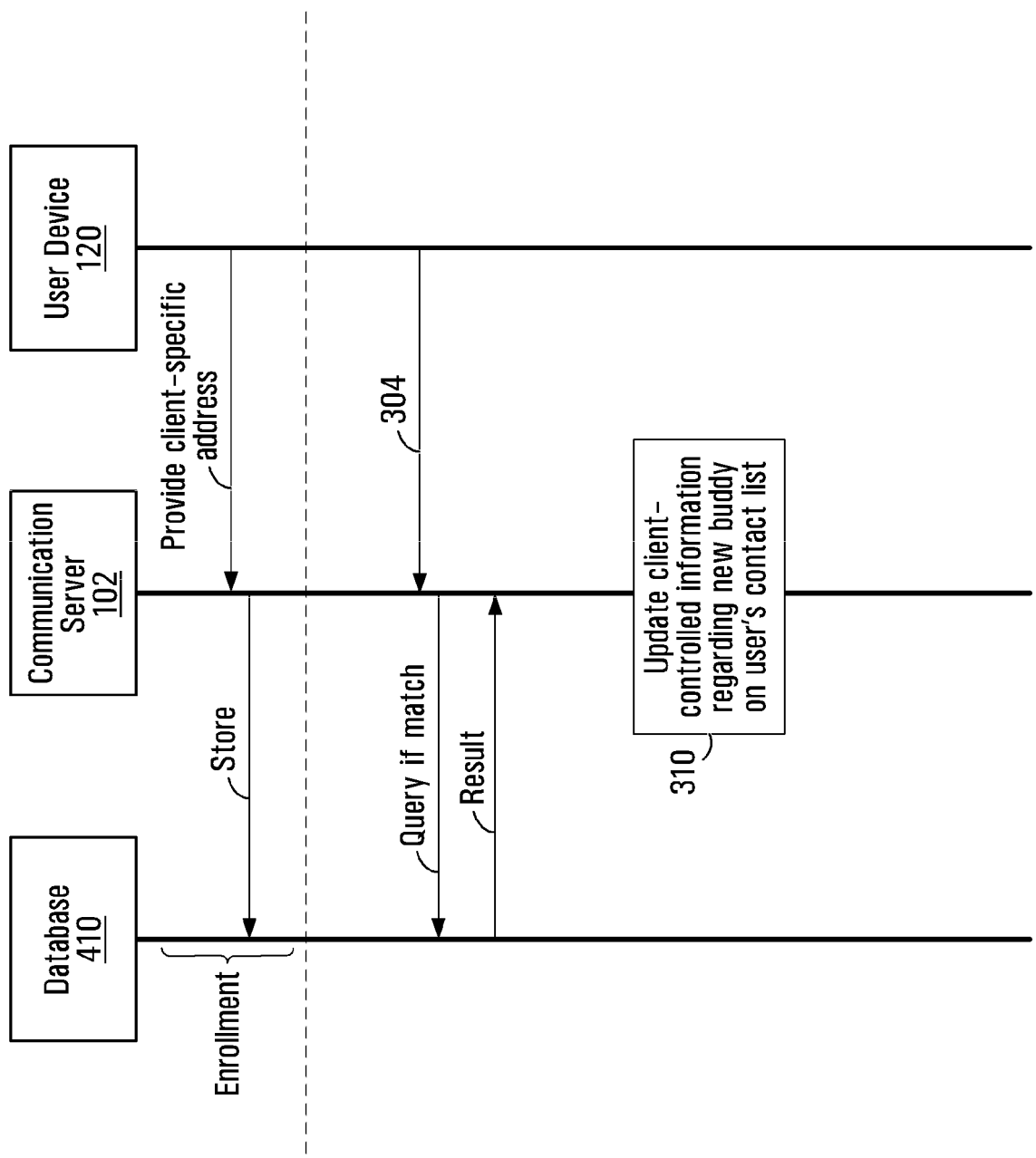
FIG. 4A is a message flow diagram illustrating interaction between various components of the instant messaging architecture of FIG. 1 and a database, in a first example situation where an authorization or enrollment step is to be effected.

In a first non-limiting situation where authorization is required, shown in FIG. 4A, user 110 initially enrolls with the communication server 102. User 110 can enroll by employing communication device 120 but may also enroll in a number of different ways, such as by interaction with a web portal, a customer service representative, an interactive voice response system, etc., and/or by the transmission of email messages or other messages, and using a variety of different devices. Upon enrolment, the communication server 102 stores the client-specific address associated with user 110 in a database 410 for future consultation. Later on, e.g. at step 304, when the messaging application executed by the processor 104 in the communication server 102 determines that the contact list 920 for user 110 includes a new buddy (in this example, applet 116), the messaging application executed by the processor 104 in the communication server 102 can be configured to consult the database 410 and verify whether the client-specific address being employed by communication device 120 appears in the database 410. If so, the messaging application executed by the processor 104 in the communication server 102 proceeds to execute step 310.

Figure 4B:
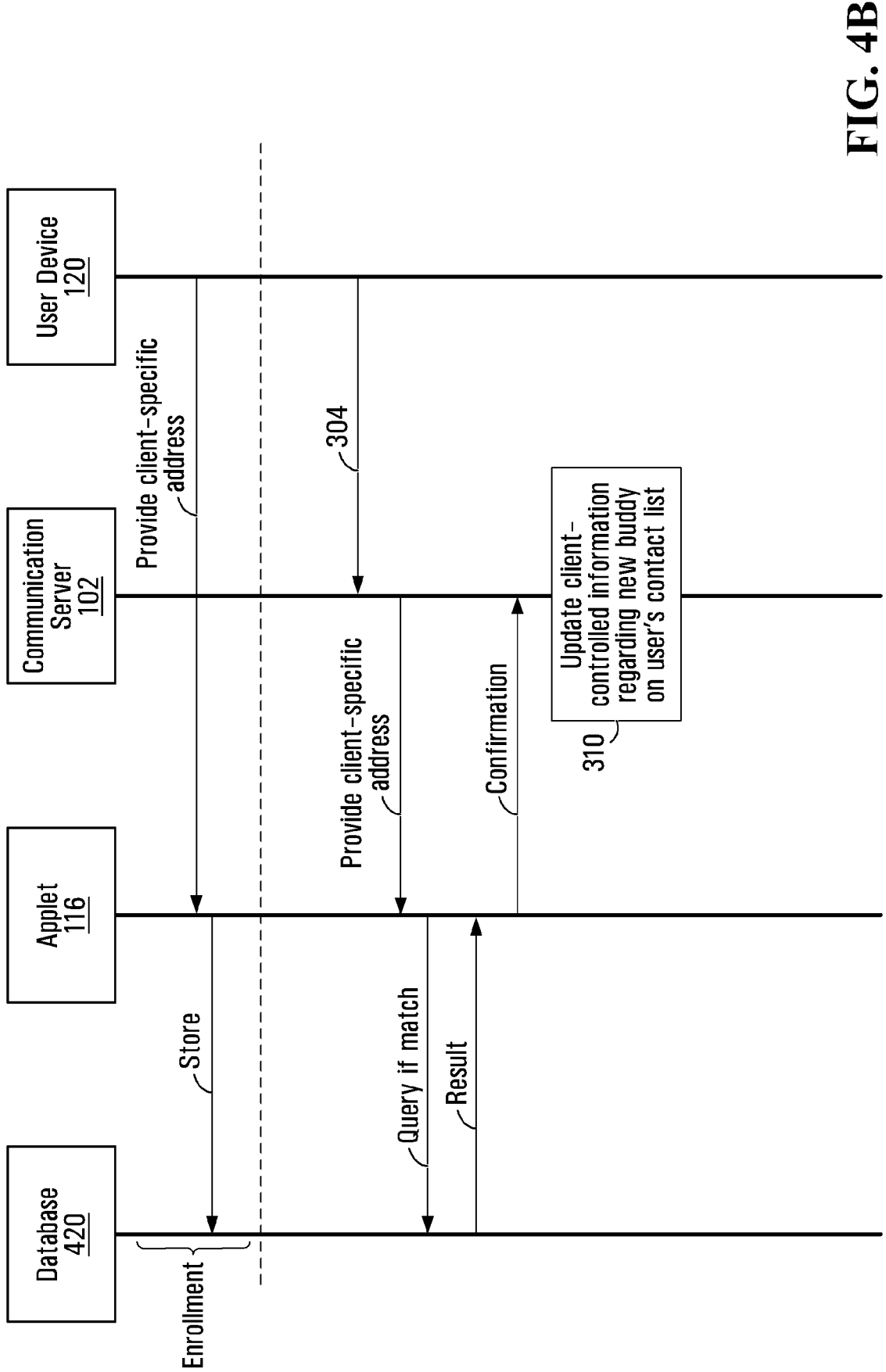
FIG. 4B is a message flow diagram illustrating interaction between various components of the instant messaging architecture of FIG. 1 and a database, in a second example situation where an authorization or enrollment step is to be effected.

In a second non-limiting situation where authorization is required, shown in FIG. 4B, user 110 initially enrolls with applet 116. User 110 can enroll by employing communication device 120 but may also enroll in a number of different ways, such as by interaction with a web portal, a customer service representative, an interactive voice response system, etc., and/or by the transmission of email messages or other messages, and using a variety of different devices. Upon enrolment, applet 116 stores the client-specific address associated with user 110 in a database 420 for future consultation. Later on, e.g. at step 304, when the messaging application executed by the processor 104 in the communication server 102 determines that the contact list 920 for user 110 includes a new buddy (in this example, applet 116), the messaging application executed by the processor 104 in the communication server 102 can be configured to contact applet 116, which can be done by sending information to applet 116 in a variety of ways, including but not limited to using protocols such as IP and SOAP, for example. The information sent to applet 116 contains the client-specific address being employed by communication device 120. In response, applet 116 consults the database 420 and verifies whether the client-specific address supplied by the communication server 102 appears in the database 420. If so, applet 116 proceeds to send a confirmation message to the communication server 102, which then executes step 310.

Figure 4C:
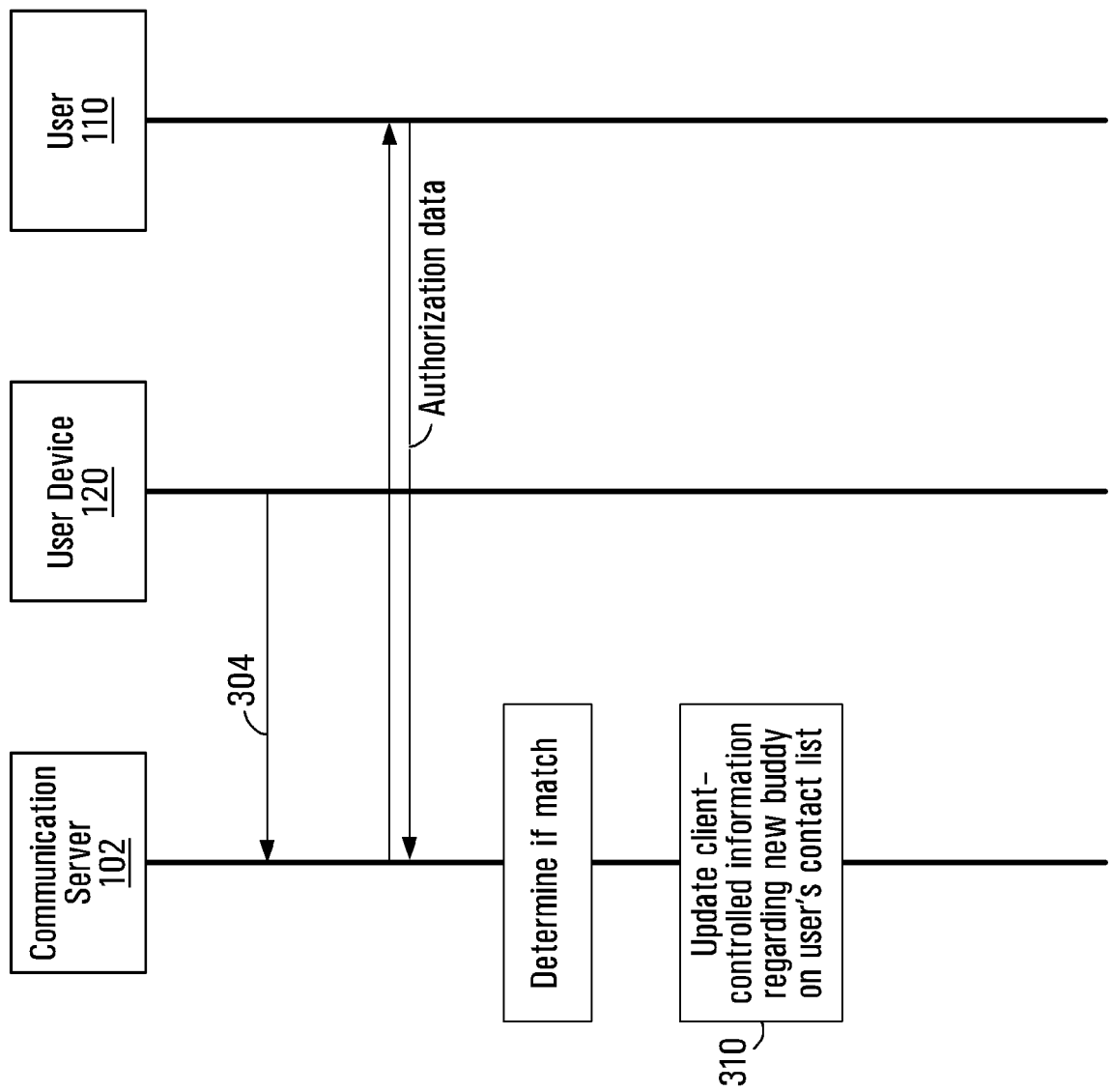
FIG. 4C is a message flow diagram illustrating interaction between various components of the instant messaging architecture of FIG. 1, in a third example situation where an authorization or enrollment step is to be effected.

In a third non-limiting situation where authorization is required, shown in FIG. 4C, once user 110 has added a new buddy (in this example, applet 116) to his or her contact list 920, but before the messaging application executed by the processor 104 in the communication server 102 determines that the contact list 920 includes the new buddy, the messaging application executed by the processor 104 in the communication server 102 can be configured to communicate with user 110. To this end, the communication server 102 can initiate an instant message exchange with communication device 120; alternatively, the communication server 102 can initiate a call back to a telephone number associated with user 110; still other possibilities are within the scope of the present invention, including but not limited to via a web portal, interactive voice response system, URL embedded in an email or other electronic message, etc. During such communication between user 110 and the communication server 102, user 110 may supply to the communication server 102 candidate authorization data (e.g. a product code or a password) which is expected to match a priori authorization data stored by the communication server 102. The a priori authorization data could be learned from, for example, a pre-paid voucher or media advertising (e.g. newspaper, radio, television, Internet) and/or based on interaction with a customer service representative, a web portal, an interactive voice response system, and exchange of email or other messages, etc.; alternatively, user 110 may have previously enrolled with the communication server 102 and agreed on which a priori authorization data to use. The candidate authorization data supplied to the communication server 102 during communication between user 110 and communication server 102 can be provided in a variety of ways including, but not limited to, instant messaging, electronic mail and/or voice communications using communication device 120 or any other communication device. The messaging application executed by the processor 104 in the communication server 102 can be configured to then execute step 310 only if the candidate authorization data supplied by user 110 is considered to match the a priori authorization data stored by the communication server 102.

Figure 4D:
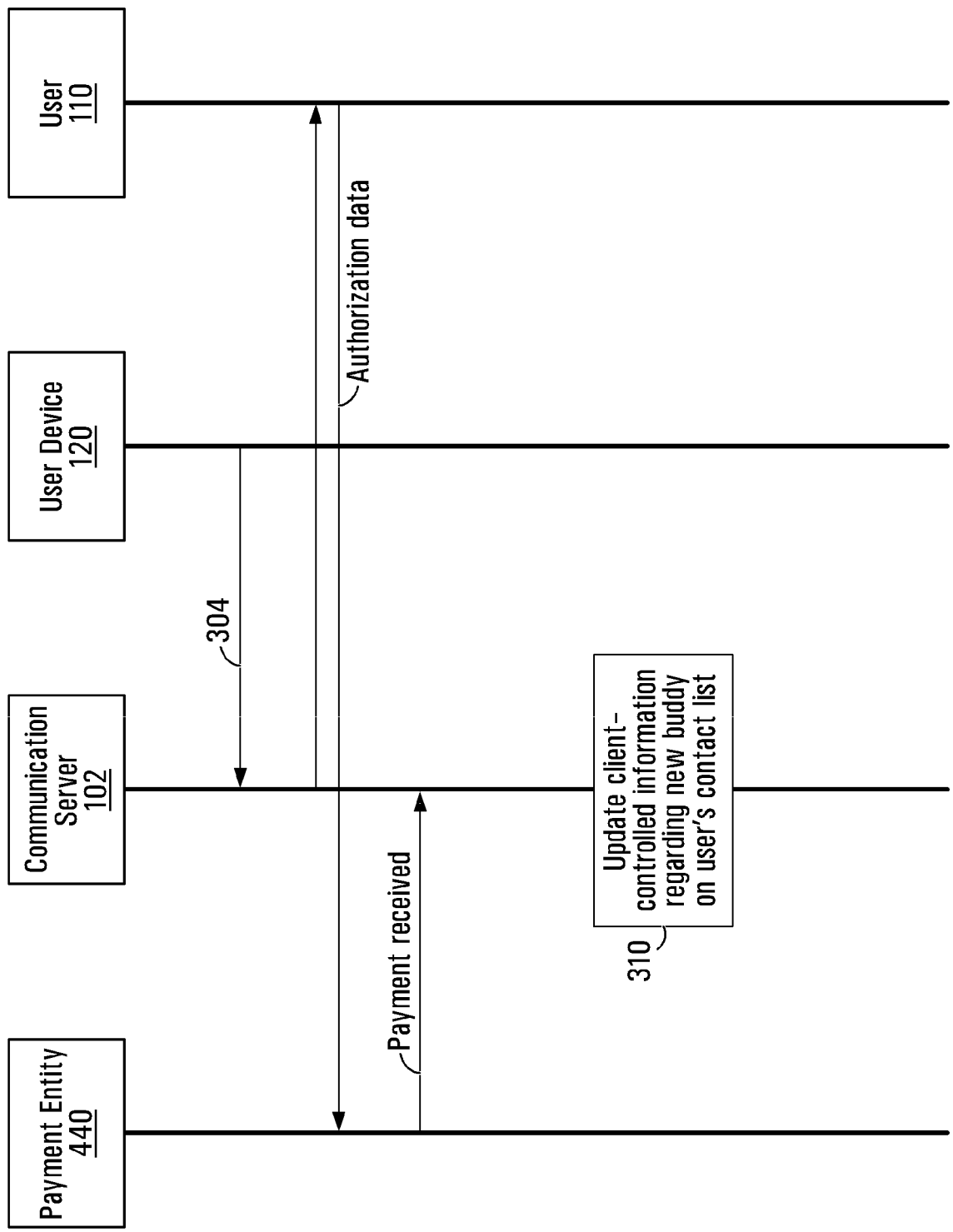
FIG. 4D is a message flow diagram illustrating interaction between various components of the instant messaging architecture of FIG. 1 and a payment entity, in a fourth example situation where an authorization or enrollment step is to be effected.

In a fourth non-limiting situation where authorization is required, shown in FIG. 4D, once user 110 has added a new buddy (in this example, applet 116) to his or her contact list 920, but before the messaging application executed by the processor 104 in the communication server 102 determines that the contact list 920 includes the new buddy, the messaging application executed by the processor 104 in the communication server 102 can be configured to communicate with user 110. Specifically, the communication server 102 can direct user 110 to a payment entity 440 (which, in a non-limiting example, may be associated with a third-party web site). In a non-limiting embodiment, this can be done by sending an instant message to communication device 120 containing a uniform resource locator (URL) that identifies the third-party web site; alternatively, the communication server 102 can establish a three-way conference call between user 110 and the payment entity 440. Still other possibilities are within the scope of the present invention, such as the invoking of a pop-up window containing a URL, the transmission of an email or other electronic message containing a URL, the triggering of an IM conversation with a payment system, and so on. User 110 may then employ communication device 120 or any other communication device to transact with the payment entity 440. The payment entity 440 then returns a message to the communication server 102 indicative of whether payment has been received. The messaging application executed by the processor 104 in the communication server 102 can be configured to then execute step 310 only once payment has indeed been confirmed as received by the payment entity 440.

Figure 4E:
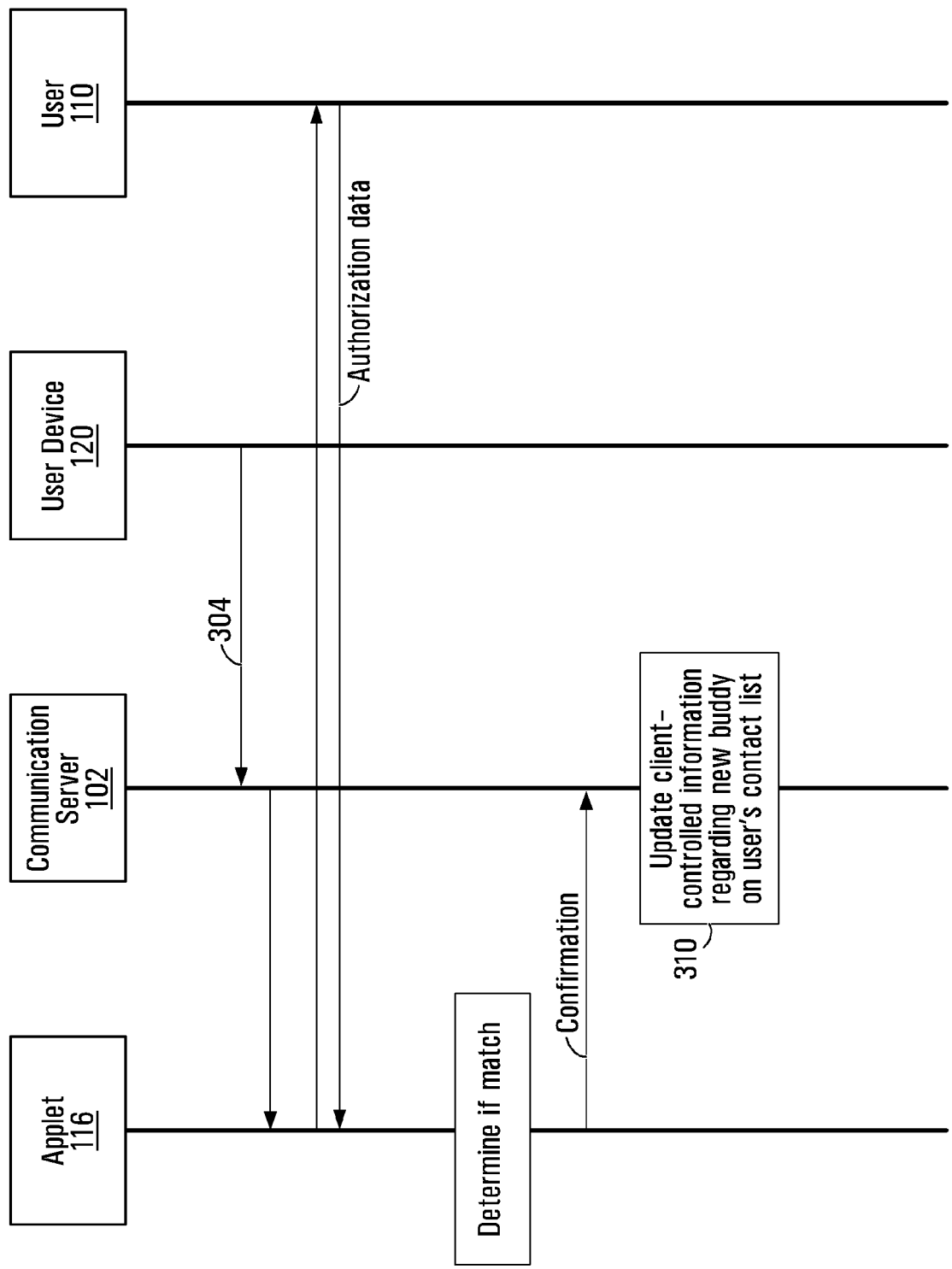
FIG. 4E is a message flow diagram illustrating interaction between various components of the instant messaging architecture of FIG. 1, in a fifth example situation where an authorization or enrollment step is to be effected.

In a fifth non-limiting situation where authorization is required, shown in FIG. 4E, once the messaging application executed by the processor 104 in the communication server 102 determines that the contact list 920 includes a new buddy (in this example, applet 116), the messaging application executed by the processor 104 in the communication server 102 can be configured to contact the new buddy (e.g. via instant message) and ask it whether it wishes to add user 110 to its own contact list (i.e., contact list 926) as a buddy of its own. This may trigger applet 116 to communicate with user 110, e.g. by sending an instant message of its own, thereby resulting in an exchange of instant messages between applet 116 and user 110. In response, user 110 may supply to applet 116 authorization data (e.g. a product code or a password) that could previously have been learned from, for example, a pre-paid voucher or media advertising (e.g. newspaper, radio, television, Internet) and/or based on interaction with a customer service representative, a web portal, an interactive voice response system, and exchange of email or other messages, etc.;. Alternatively, user 110 may have previously enrolled with applet 116 and agreed on which authorization data to use. The authorization data may be supplied to applet 116 in a variety of ways including, but not limited to, instant messaging, electronic mail and/or voice communications using communication device 120 or any other communication device. Once applet 116 authorizes user 110 based on interaction therewith, applet 116 can send a confirmation message to the communication server 102, which then executes step 310. In addition, the messaging application executed by the processor 104 in the communication server 102 can—but need not necessarily—add user 110 to the contact list 926 for applet 116.

It should be appreciated that each of the above first through fifth non-limiting situations can be caused not only once user 110 identifies as a "buddy" an applet that provides a desired data service, but also just prior thereto.

Figure 4F:
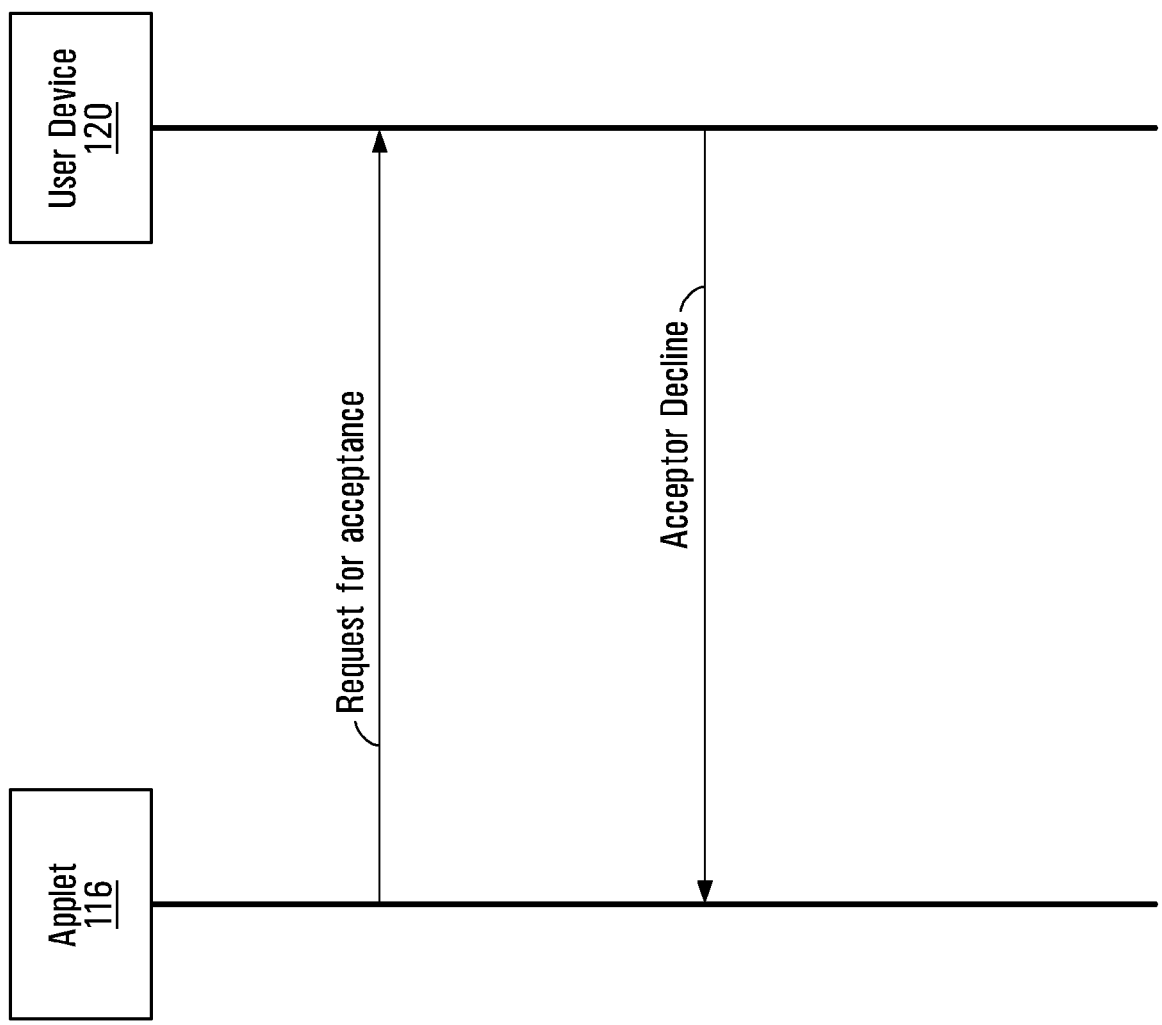
FIG. 4F is a message flow diagram illustrating interaction between various components of the instant messaging architecture of FIG. 1, in a sixth example situation where an authorization or enrollment step is to be effected.

In a sixth non-limiting situation where authorization is required, shown in FIG. 4F, user 110 is given the opportunity to accept or decline adding applet 116 as a buddy. Specifically, prior to step 304, applet 116 learns the client-specific address of user 110 in this example, "User-110@IMservice.com". Such knowledge can be gained through prior interaction between user 110 and applet 116 (e.g., via email, SMS, a web portal, a telephone interface). Applet 116 can then send a request for acceptance, e.g., using the instant messaging service to which user 110 subscribes. The transmission of the request for acceptance can be formulated expressly or it may occur automatically as a result of the attempt by applet 116 to add user 110 as a buddy to its own contact list 926. When user 110 logs in to the instant messaging service, thereby instantiating itself as a client, the request for acceptance will be received by user 110. At this point, user 110 may accept or decline the request for acceptance. If user 110 accepts, then applet 116 is added as a buddy of user 110. This may be a particularly applicable authorization scheme in an advertising scenario. In a more complex scenario, user 110 might in addition to, or instead of, accepting or declining the request for acceptance, send candidate authorization data that can be verified by the communication server 102 and/or applet 116.

Scenario II (FIGS. 5A, 6A and 10A-10C)

Scenario II is applicable to data services that are customized (i.e., providing data that is requested by individual users). Specific non-limiting examples of data services to which Scenario II applies include, without limitation:

- a customized stock portfolio reporting service (where the information regarding a data service is the share price of companies in a user-selected portfolio);
- a customized news reporting service (where the information regarding a data service is the headline news from news sources in a user-selected set of news sources or regarding user-specific topics);
- a customized traffic reporting service (where the information regarding a data service is the current traffic synopsis for a user-selected travel route);
- a customized web search service (where the information regarding a data service is a feature (e.g. current status, number of results, result relevancy score, etc.) of an online search);
- a customized real estate service (where the information regarding a data service is an availability of a property meeting user-defined criteria);
- a customized dating service (where the information regarding a data service is an availability of a person of interest matching a user-defined profile);
- a customized job search service (where the information regarding a data service is an availability of a position matching user-defined criteria);
- a customized shopping service (where the information regarding a data service is an availability of an item or service meeting user-defined price or other criteria);
- a web monitoring service (where the information regarding a data service is an indication of the most recent addition to a user-selected set of blogs or websites);
- etc.

Figure 5A:
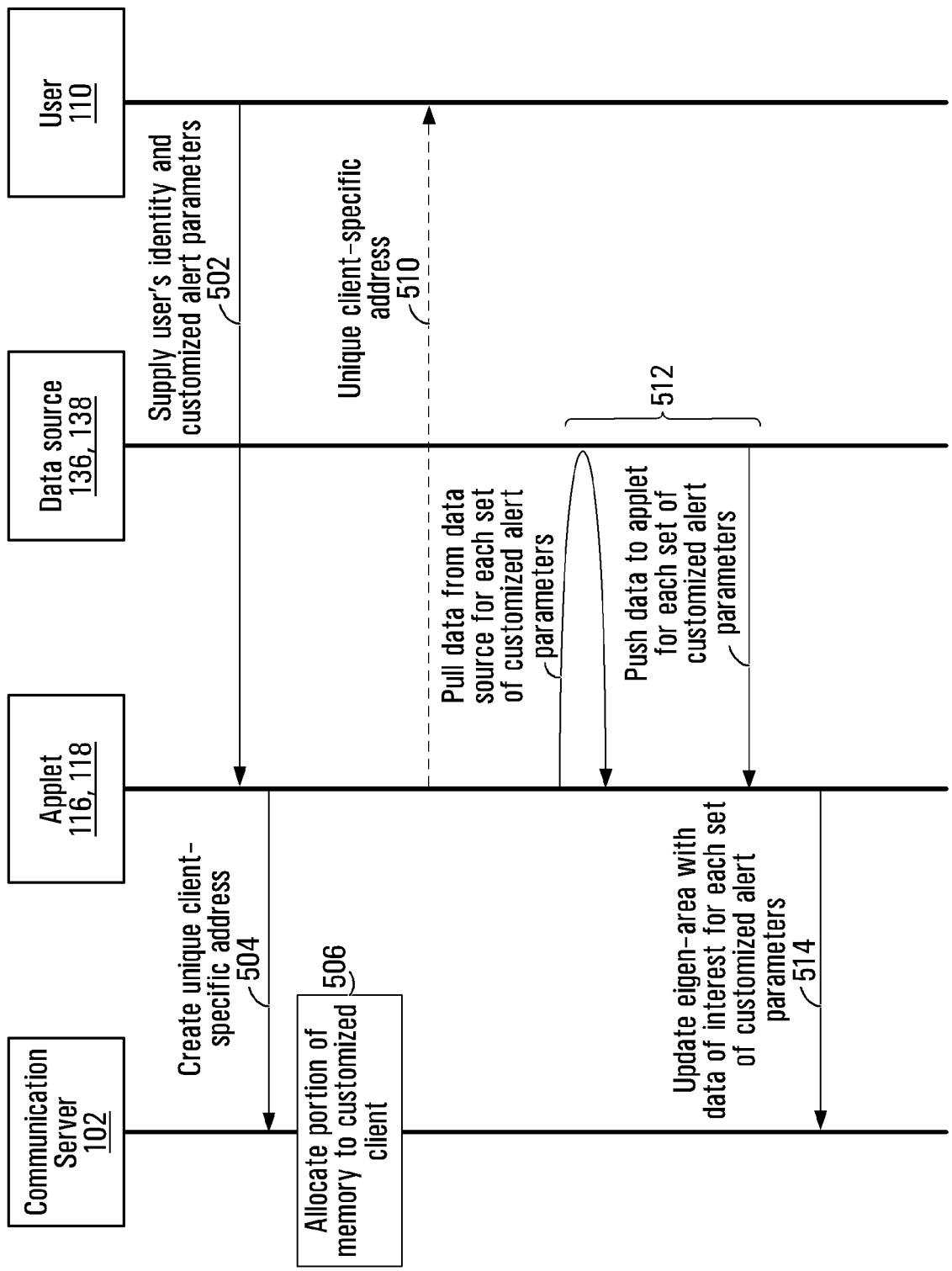
FIG. 5A is a message flow diagram illustrating interaction between various components of the instant messaging architecture of FIG. 1, in a second example scenario applicable to data services that are customized.

With reference to FIG. 5A, Scenario II begins at step 502 by user 110 enrolling with applet 116 and/or applet 118. In particular, user 110 can contact the applet in question by employing communication device 120 but may also enroll in a number of different ways, such as by interaction with a web portal, a customer service representative, an interactive voice response system, etc., and/or by the transmission of email messages or other messages, and using a variety of different devices. During enrolment, user 110 provides an identity of user 110, which can be in the form of the client-specific address associated with user 110 (which, in the example being used herein, is "User-110@IMservice.com"), a name, a telephone number, an IP address, an alias, a social security number, etc.

In addition, user 110 supplies customized alert parameters to the applet in question. For the purposes of the discussion to follow, it is assumed that applet 116 provides a customized news reporting service that produces headline news from news sources in a user-selected set of news sources, and that applet 118 provides a customized traffic reporting service that produces the current traffic synopsis for a user-selected travel route. Thus, if the applet in question is applet 116, the customized alert parameters may include the aforesaid user-selected set of news sources (e.g., URLs, key words, newspaper names). Similarly, if the applet in question is applet 118, the customized alert parameters may include the aforesaid user-selected travel route (e.g., road segments, cardinal direction of travel in each segment).

Based on the information supplied at step 502, the applets 116, 118 are configured at step 504. Specifically, configuration of the applets 116, 118 begins by registering the applet in question (either autonomously or with the aid of a person) as a client of the instant messaging service. This is done by contacting the communication server 102 (in this case, www.IMservice.com) and creating a unique client-specific address associated with user 110 and applet 116 and/or a unique client-specific address associated with user 110 and applet 118. By way of specific non-limiting example, in the case of applet 116, a suitable unique client-specific address could be AlertIM-News-User-110@IMservice.com, while in the case of applet 118, a suitable unique client-specific address could be AlertIM-Traffic-User-110@IMservice.com. It will be noted that the unique client-specific address is associated not only with the data service provided by the applet in question, but also with user 110. Thus, the unique client-specific addresses created at step 504 effectively spawn new clients of the instant messaging service, hereinafter referred to as "customized clients" of the instant messaging service.

Of course, the preceding unique client-specific addresses have been used as examples only, and for the sole purpose of enhancing readability; it should thus be appreciated that in actuality, the unique client-specific address associated with a given user and a given applet, which need not be visible to user 110, could be different, non-standard and/or less meaningful to interpretation by a human being. Also, the unique client-specific address associated with a given user and a given applet could be created by the given user or the given applet.

At step 506, in response to creation of the unique client-specific address associated with a specific customized client of the instant messaging service, the messaging application executed by the processor 104 in the communication server 102 allocates a portion of the memory 106 to the customized client in question. For example, with reference to FIG. 10A, the messaging application executed by the processor 104 in the communication server 102 allocates a memory area 1060 to the customized client identified by AlertIM-News-User-110@IMservice.com and a memory area 1080 to the customized client identified by AlertIM-Traffic-User-110@IMservice.com. It will be observed that each of the memory areas 1060, 1080 comprises a respective contact list 1062, 1082 for the respective customized client of the instant messaging service. Initially, the contact lists 1062, 1082 can be empty, i.e., they do not include the client-specific addresses of any other clients of the instant messaging service (that is, the customized clients have no "buddies"). The memory areas 1060, 1080 each further comprise a respective eigen-area 1064, 1084 containing client-controlled information regarding the respective customized client, which the communication server 102 will make available to user 110 if that user's contact list ultimately includes the respective customized client.

The client-controlled information regarding the customized client identified by AlertIM-News-User-110@IMservice.com (which is stored in eigen-area 1064) represents information that this particular customized client wishes to convey to user 110. Similarly, the client-controlled information regarding the customized client identified by AlertIM-Traffic-User-110@IMservice.com (which is stored in eigen-area 1084) represents information that this particular customized client wishes to convey to user 110. The client-controlled information stored in eigen-area 1064 or eigen-area 1084 may include a presence state and/or a screen name. The presence state could be used to specify an attentiveness of a given client to receiving instant messages, while the screen name could be used to specify an identifier that the given customized client wishes to use to identify itself during a conversation. However, in accordance with non-limiting embodiments of the present invention, either or both of the presence state and/or the screen name (and/or possibly other portions of the client-controlled information stored in the eigen-areas 1064, 1084) is used to convey information regarding the respective data service, which in the case of the customized client identified by AlertIM-News-User-110@IMservice.com is headline news from news sources in a user-selected set of news sources, and in the case of the customized client identified by AlertIM-Traffic-User-110@IMservice.com is the current traffic synopsis for a user-selected travel route.

Accordingly, and returning to FIG. 5A at step 512, applets 116 and 118 are configured to obtain information regarding a data service specifically for user 110 (hereinafter "user-specific information regarding a data service") from one or more of the data sources 136, 138. Examples of user-specific information regarding a data source include headline news from news sources in a user-selected set of news sources and the current traffic synopsis for a user-selected travel route. The obtaining of user-specific information regarding a data source can be performed for other users (e.g., users 112, 114) who have specified their own customized alert parameters. It is assumed for convenience that data source 136 is capable of producing the headline news for user 110 sought by applet 116, and that data source 138 is capable of producing the current traffic synopsis for user 110 sought by applet 118, although this association between the applets 116, 118 and the data sources 136, 138 is not to be considered a limitation of the present invention.

In order for applet 116 to obtain the headline news for user 110 from data source 136, applet 116 may occasionally, continuously, synchronously or asynchronously pull the headline news for user 110 from data source 136; alternatively, data source 136 may be configured to occasionally, continuously, synchronously or asynchronously push the headline news for user 110 to applet 116. This latter functionality can be achieved by applet 116 placing a request with data source 136 to receive the headline news for user 110. Similarly, in order for applet 118 to obtain the current traffic synopsis for user 110 from data source 138, applet 118 may occasionally, continuously, synchronously or asynchronously pull the current traffic synopsis for user 110 from data source 138; alternatively, data source 138 may be configured to occasionally, continuously, synchronously or asynchronously push the current traffic synopsis for user 110 to applet 118. This latter functionality can be achieved by applet 118 placing a request with data source 138 to receive the current traffic synopsis for user 110. Similar data transfers are arranged for each of the other users that may desire customized data services provided by applets 116 and 118.

Assume now that the headline news for user 110 is "Small-town residents asked to boil water" and that the current traffic synopsis for user 110 is "Accident—Galipeault bridge—right lane". This user-specific information regarding a data service is received by the applets 116, 118 as a result of execution of step 512. At step 514, each of the applets 116, 118 is configured to update the respective eigen-area 1064, 1084 for the relevant customized client with the received user-specific information regarding a data service.

Figure 10A:
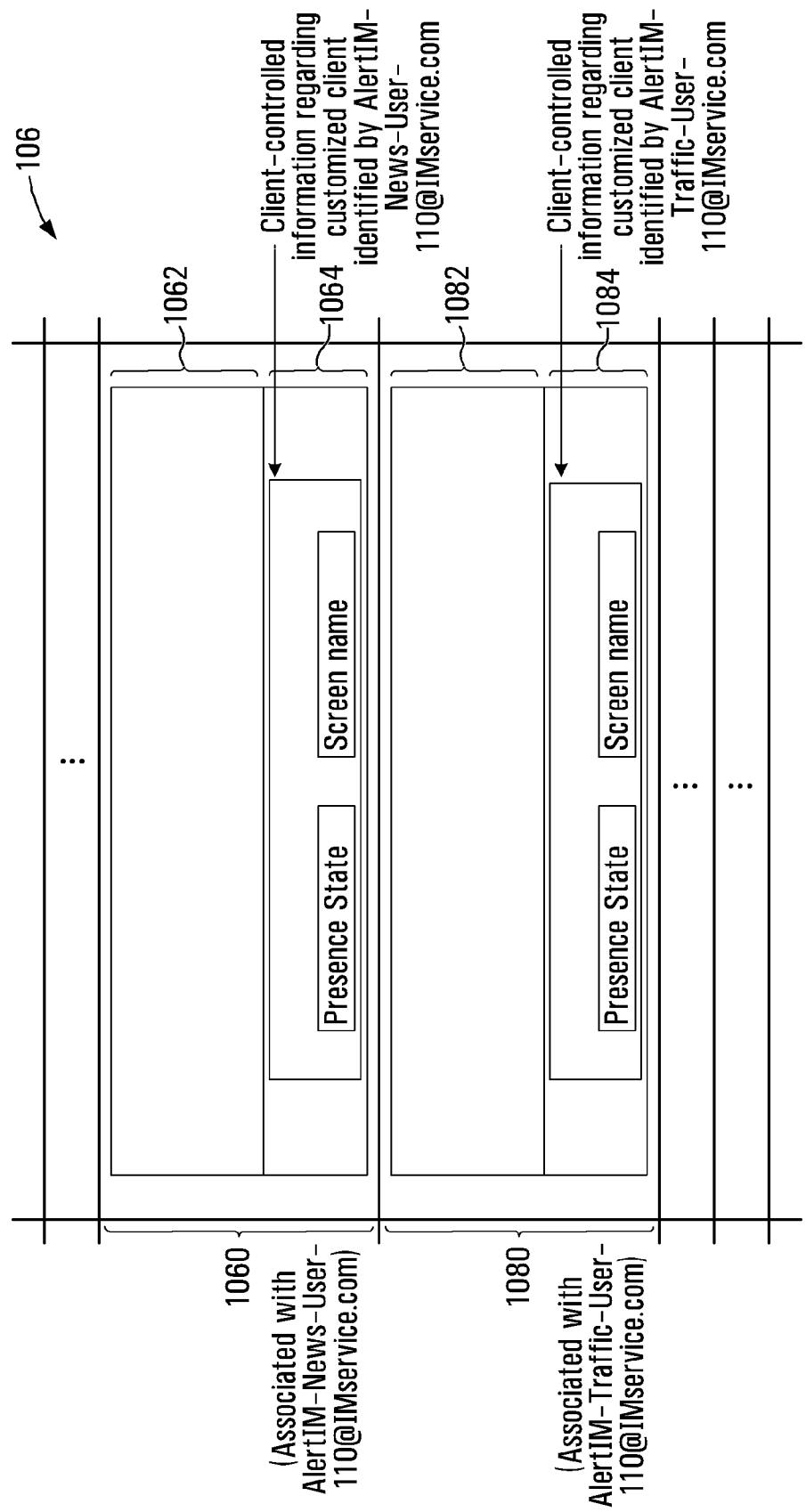
FIG. 10A illustrates an example of potential contents of memory areas of the memory of the communication server of FIG. 1, in connection with the second example scenario considered in FIG. 5A.
Figure 10B:
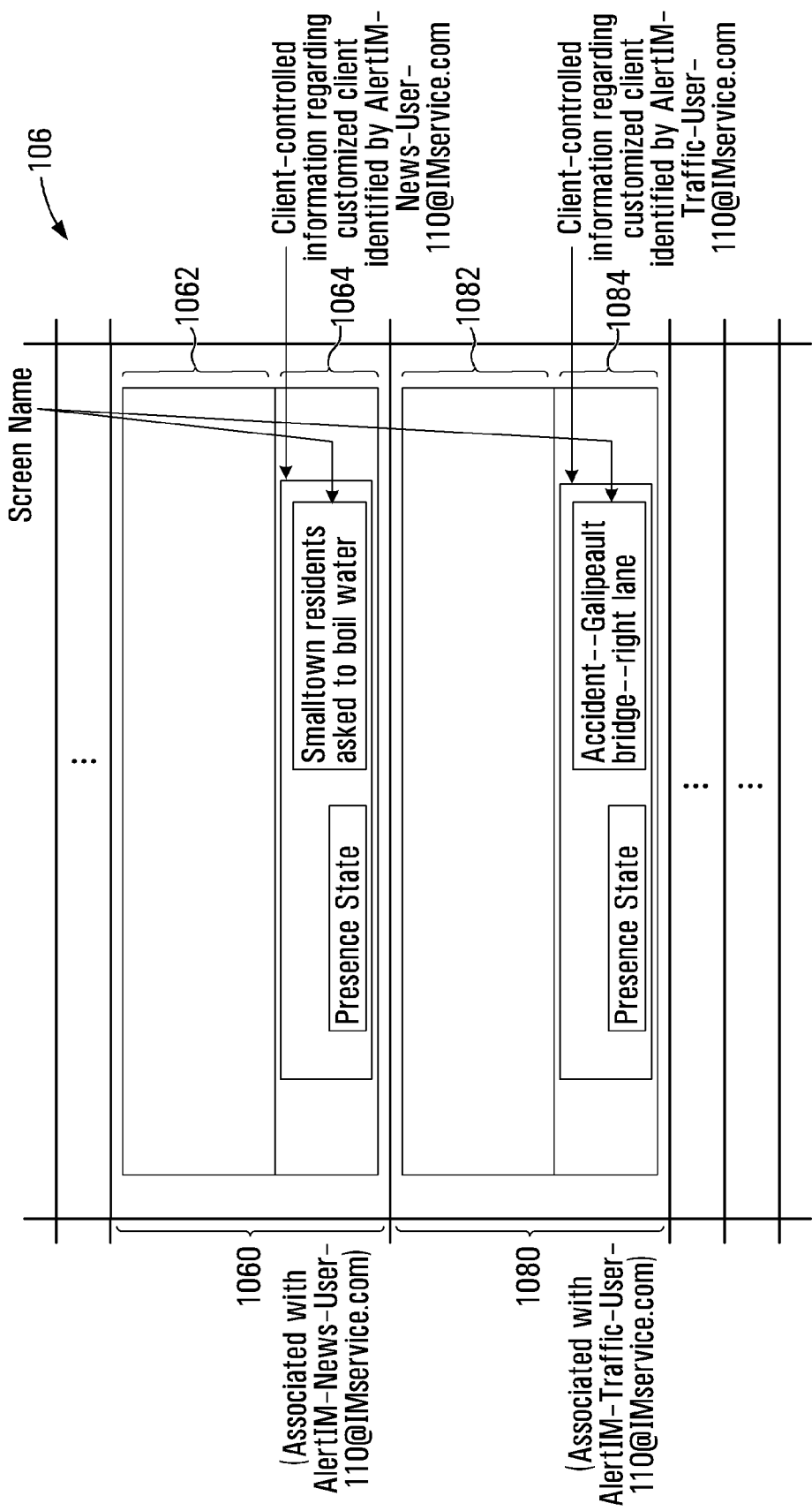
FIG. 10B illustrates an example of potential updated contents of the memory areas of FIG. 10A.

Specifically, and with reference to FIG. 10B, applet 116 can update the client-controlled information in eigen-area 1064 by modifying the screen name to reflect the headline news for user 110 (which, in the present example, is "Small-town residents asked to boil water"). In addition, or alternatively, applet 116 can update the client-controlled information in eigen-area 1064 by causing the screen name to reflect data that can be easily expressed using simple icons, such as the presence or absence of headline news. Of course, in an alternative embodiment, applet 116 could have updated the client-controlled information in eigen-area 1064 by also (or instead) modifying the presence state and/or possibly other portions of the client-controlled information stored in eigen-area 1064 to reflect the headline news for user 110. In summary, the information of interest is stored in eigen-area 1064 as text data or other data (such as data that encodes one or more graphical icons).

Similarly, applet 118 updates the client-controlled information in eigen-area 1084 by modifying the screen name to reflect the current traffic synopsis for user 110 (which, in the present example, is "Accident—Galipeault bridge—right lane"). In addition, or alternatively, applet 118 can update the client-controlled information in eigen-area 1084 by causing the screen name to reflect data that can be easily expressed using simple icons, such as whether the user-selected traffic route is recommendable, passable or to be avoided. Of course, in an alternative embodiment, applet 118 could have updated the client-controlled information in eigen-area 1084 by also (or instead) modifying the presence state and/or possibly other portions of the client-controlled information stored in eigen-area 1084 to reflect the current traffic synopsis for user 110. In summary, the information of interest is stored in eigen-area 1084 as text data or other data (such as data that encodes one or more graphical icons).

Interaction between a given one the communication devices 120, 122, 124 and the communication server 102 under Scenario II is now described. For the sake of simplicity, let the given communication device be communication device 120 which is associated with user 110, and let it be assumed that user 110 is a client of the instant messaging service. That is to say, user 110 has a client-specific address, say, "User-110@IMservice.com". In addition, a portion of the memory 106 is allocated to user 110. For example, with reference to FIG. 10C, the messaging application executed by the processor 104 in the communication server 102 allocates a memory area 1010 to user 110.

It will be observed that memory area 1010 comprises a contact list 1012 for user 110. Initially, the contact list 1012 can be empty, i.e., it does not include the client-specific addresses of any other clients of the instant messaging service (that is, user 110 has no "buddies"). Over time, user 110 may add/remove various buddies to/from the contact list 1012 by control of the messaging application executed by the processor 104 in the communication server 102. The memory area 1010 further comprises an eigen-area 1014 containing client-controlled information regarding user 110, which the communication server 102 will make available to other clients of the instant messaging service (such as, potentially, users 112, 114 and each of the aforesaid customized clients) if their contact lists ultimately include user 110.

Figure 6A:
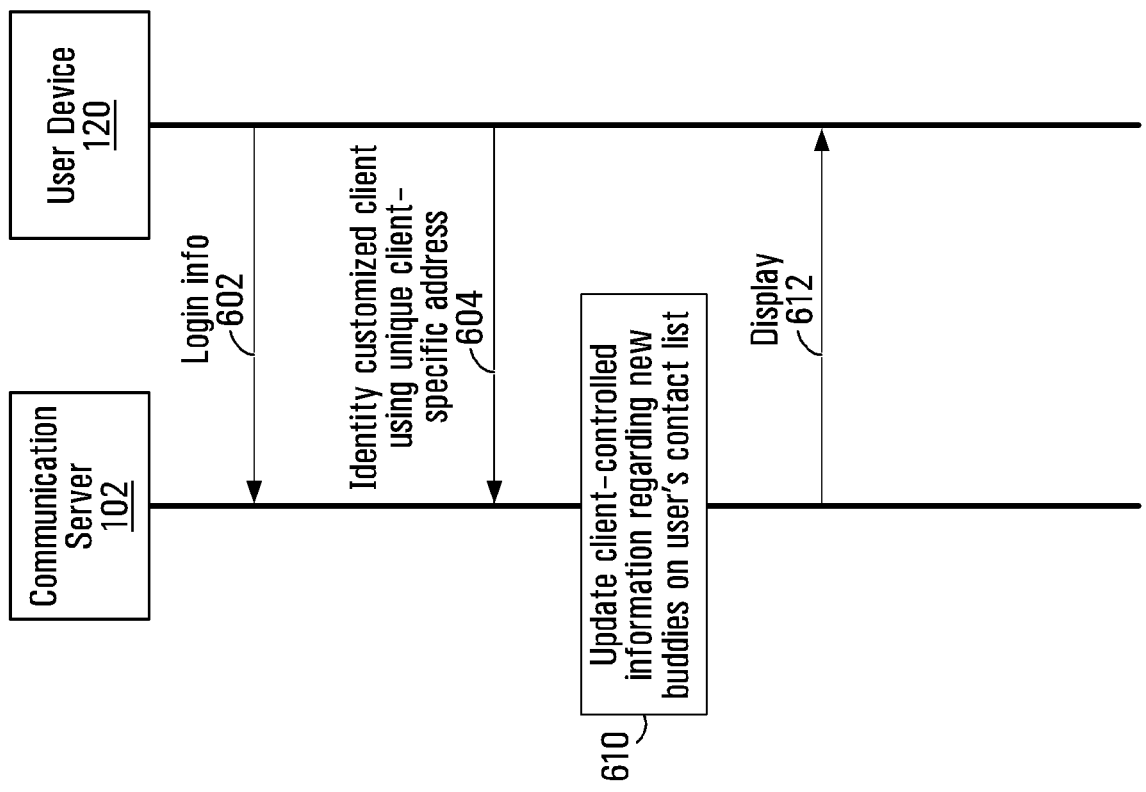
FIG. 6A is a message flow diagram illustrating further interaction between various components of the instant messaging architecture of FIG. 1, in the second example scenario considered in FIG. 5A.

With reference to the message flow diagram in FIG. 6A, user 110 uses communication device 120 to log in to (i.e., thereby instantiating a client of) the instant messaging service at step 602. This can be achieved by providing identification and authentication credentials such as a username and a password, for example.

At step 604, user 110 identifies a customized client of the instant messaging service which provides a desired data service by entering the unique client-specific address associated with the customized client in question. In the example being presently described, user 110 may enter one of the aforesaid unique client-specific addresses, namely AlertIM-News-User-110@IMservice.com (which is associated with applet 116 producing the headline news for user 110) or AlertIM-Traffic-User-110@IMservice.com (which is associated with applet 118 producing the current traffic synopsis for user 110). In certain embodiments, user 110 identifies the customized client of the instant messaging service that provides the desired data service using a directory service offered by the communication server 102, while in other embodiments, user 110 may directly type in the unique client-specific address associated with the customized client in question.

Alternatively, since user 110 has previously enrolled with applet 116 producing the headline news for user 110 and/or with applet 118 producing the current traffic synopsis for user 110, the customized client may send a request for acceptance to user 110, such that when user 110 logs in as a client of the instant messaging service, user 110 is prompted to accept or decline the request for acceptance. If user 110 accepts, then the customized client will be added to the contact list 1012 of user 110.

Either way, this results in the unique client-specific address associated with the customized client in question being added to the contact list 1012, and leaving at least one corresponding field to be filled with the client-controlled information regarding the customized client in question. In the present example, not to be considered limiting, fields 1066, 1076 are used to store the presence state and screen name, respectively, of the customized client having the unique client-specific address AlertIM-News-User-110@IMservice.com, while fields 1068, 1078 are used to store the presence state and screen name, respectively, of the customized client having the unique client-specific address AlertIM-Traffic-User-110@IMservice.com.

As an aside, it should be appreciated that an optional step (510) could have been performed in FIG. 5A, whereby the unique client-specific address created at step 504 can be revealed to user 110 in order to inform him or her of the unique client-specific address AlertIM-News-User-110@IMservice.com and/or of the unique client-specific address AlertIM-Traffic-User-110@IMservice.com. It should be appreciated that step 510 is optional, since the clients of the instant messaging service can gain awareness of the unique client-specific address AlertIM-News-User-110@IMservice.com and/or of the unique client-specific address AlertIM-Traffic-User-110@IMservice.com in other ways, such as through other communication devices and other methods of communication, including, without limitation: interaction with a customer service representative, interaction with an automated voice response system, interaction with a web portal, receipt of an email, text message or instant message containing the unique client-specific addresses, etc. It should further be appreciated that the clients of the instant messaging service may employ a directory service (e.g. operated by the communication server 102) and, as such, not need be explicitly aware of the unique client-specific addresses associated with the customized clients of the instant messaging service.

Returning now to FIG. 6A and 10C, at step 610, having determined that the client-controlled information regarding the new buddy (i.e., one of the aforesaid customized clients) has been updated in eigen-area 1064 or 1084, the messaging application executed by the processor 104 in the communication server 102 updates the client-controlled information regarding the new buddy on the contact list 1012 for user 110.

Specifically, the client-controlled information regarding the customized client identified by AlertIM-News-User-110@IMservice.com is obtained from eigen-area 1064 which, as previously described, conveys headline news from news sources in a user-selected set of news sources. In one embodiment, the messaging application executed by the processor 104 in the communication server 102 copies the presence state and screen name from eigen-area 1064 into fields 1066, 1076 of the contact list 1012. In another embodiment where fields 1066, 1076 contain pointers to, respectively, the presence state and screen name in eigen-area 1064, the client-controlled information regarding the customized client in question will be instantly updated without the need for data transfer. A similar updating operation is performed by the communication server 102 with respect to the contact lists for other users.

For its part, the client-controlled information regarding the customized client identified by AlertIM-Traffic-User-110@IMservice.com is obtained from eigen-area 1084 which, as previously described, conveys the current traffic synopsis for a user-selected travel route. In one embodiment, the messaging application executed by the processor 104 in the communication server 102 copies the presence state and screen name from eigen-area 1084 into fields 1068, 1078 of the contact list 1012. In another embodiment where fields 1068, 1078 contain pointers to, respectively, the presence state and screen name in eigen-area 1084, the client-controlled information regarding the customized client in question will be instantly updated without the need for data transfer. A similar updating operation is performed by the communication server 102 with respect to the contact lists for other users.

At this point, the client-controlled information regarding the customized client in question (which, it is recalled, comprises the information regarding the desired data service) is ready for observation by user 110. Accordingly, at step 612, which can be inherent in step 610 or a separate step altogether, the client-controlled information regarding the customized client in question can be conveyed to user 110 in a visual format.

In a specific non-limiting example, and with reference to FIG. 20, the client-controlled information regarding the customized client in question can be displayed on the aforesaid screen of communication device 120 in the form of text, graphics and/or an icon. In this example, "Smalltown residents asked to boil water" is the screen name of the client-controlled information regarding the customized client identified by the unique client-specific address AlertIM-News-User-110@IMservice.com, which provides headline news from news sources in a user-selected set of news sources. In addition, "Accident—Galipeault bridge—right lane" is the screen name of the client-controlled information regarding the customized client identified by the unique client-specific address AlertIM-Traffic-User-110@IMservice.com, which provides a customized traffic reporting service that produces the current traffic synopsis for a user-selected travel route. Of note is the "X" on the left of "Accident—Galipeault bridge—right lane", which indicates a problem with the user-selected travel route.

Persons skilled in the art will therefore appreciate that the above described embodiments allow the persistent conveyance of client-controlled information regarding the customized client in question, in a non-intrusive manner and without interrupting user 110. Specifically, in two non-limiting examples, user 110 can monitor headline news from news sources in a user-selected set of news sources or the current traffic synopsis for a user-selected travel route on an ongoing basis—and at times of his or her own choosing. Moreover, user 110 is not compelled to remember the headline news or current traffic synopsis since user 110 can refresh his or her knowledge merely by glancing at the contact list 1012.

Meanwhile, it will be recalled from step 512 in FIG. 5A, applets 116 and 118 continue to obtain from the data sources 136, 138 the user-specific information regarding a data service associated with the various customized clients of the instant messaging service. Thus, the client-controlled information regarding the customized clients of the instant messaging service will continue to be updated in eigen-areas 1064, 1084 as the applets 116, 118 continue to execute, which ensures currency of the information being persistently conveyed to, and observed by, user 110.

Moreover, it should be appreciated that the client-controlled information regarding a given customized client can include passive data, which can be intended merely for observation by user 110, as well as active data, which can allow user 110 to perform an action on the active data, triggering an interaction with the given customized client and allowing user 110 to retrieve further information related to the active data. For example, where the client-controlled information regarding the given customized client is headline news from news sources in a user-selected set of news sources or regarding user-specific topics, the "further information" can be an in-depth story behind the headline news. Other examples of "further information" include stock details, traffic details, real estate listing details, weather details, etc.

The aforesaid interaction between user 110 and the given customized client may be triggered by user 110 sending an electronic message (e.g., an instant message) to the given customized client, which can serve as a request for the further information. Alternatively, the given customized client can send an electronic message (e.g., an instant message) to user 110 containing an actionable URL, which can lead user 110 to a web portal where user 110 may interact further with the applet that supports the given customized client.

The aforesaid interaction between user 110 and the given customized client may also lead to downstream actions such as a sale, purchase or reservation.

Also, it should be appreciated that the client-controlled information regarding a given customized client can be dynamically updated based on the aforesaid interaction between user 110 and the given customized client. For example, the given customized client can track which client-controlled information regarding the given customized client has been observed by user 110. This can be achieved by tracking which further information has been retrieved by user 110 pursuant to an interaction with the given customized client. Alternatively, this can be achieved by monitoring cookies within communication device 120, or in a variety of other ways. With the knowledge of what information user 110 has actually observed, the given customized client can accordingly update the client-controlled information regarding the given customized client.

For example, where the user-specific client-controlled information regarding the given customized client is a list of ten headlines related to Iraq, and where user 110 has retrieved further information related to headline #3 of 10, the given customized client can gain knowledge of this fact in one of the aforesaid ways. The result is that the client-controlled information regarding the given customized client will now be a list of nine headlines, which were formerly headlines #1, #2 and #4 through #10. Alternatively, the ten headlines could remain displayed, with headline #3 being displayed differently from the others (e.g., grayed out) to assist user 110 in navigating through the headlines. Alternatively, or in addition, the client-controlled information regarding the given customized client can also include an icon which is indicative (e.g., by a change in color, size or shape) of the existence of unreviewed content. Similar navigation aids can be provided for the various other data services within the scope of the present invention.

Persons skilled in the art will also appreciate that it may be beneficial to ensure that a given user who wishes to benefit from a particular customized data service falling under Scenario II be authorized to do so. For example, it is within the scope of the present invention to require that the given user pay for the data service. It is also within the scope of the present invention to require that the given user enroll with the applet-hosting device that hosts the applet that provides the particular data service. Thus, an authorization step may be included at some point during Scenario II. Reference is made to the above description of FIGS. 4A through 4F, which also apply to Scenario II, with the exception that the enrollment steps in FIGS. 4A and 4B can be considered redundant, since user 110 is assumed to have enrolled with applet 116 and/or applet 118 (see step 502 in FIG. 5A).

First Variant of Scenario II (FIGS. 5B, 6B, 11, 12)

A first variant of Scenario II is now described, wherein customized clients of the instant messaging service are identified using generic client-specific addresses. Accordingly, reference is made to FIG. 5B, which repeats steps 502 through 506 of FIG. 5A. Once this point is reached, step 508 is executed, whereby the messaging application executed by the processor 104 in the communication server 102 invokes an aliasing function. The aliasing function allows user 110 to identify a specific customized client of the instant messaging service using a generic client-specific address, i.e., an address that is not unique to user 110. This may enhance traction within the user community from the commercial perspective as it allows the generic client-specific address associated with a particular data service to be advertised without waiting for any particular user to enroll at step 502.

Specifically, the aliasing function creates an association between (i) a given one of the unique client-specific addresses created at step 504; (ii) the unique client-specific address associated with user 110; and (iii) a (previously created) generic client-specific address associated with a given one of applets 116, 118. To this end, and with reference to FIG. 11, the aliasing function may rely on a database 1110 in order to store the aforesaid association. In this non-limiting example, it will be observed that the combination of User-110@IMservice.com (which uniquely identifies user 110) and AlertIM-Customized-News@IMservice.com (which is a generic client-specific address associated with the customized news reporting service provided by applet 116) uniquely specifies the address AlertIM-News-User-110@IMservice.com, which was created at step 504. Analogously, it will be observed that the combination of User-110@IMservice.com and AlertIM-Customized-Traffic@IMservice.com (which is a generic client-specific address associated with the customized traffic reporting service provided by applet 118) uniquely specifies the address AlertIM-Traffic-User-110@IMservice.com, which was also created at step 504. Similar associations are stored in the database 110 for other users, such as user 112 and user 114.

Figure 5B:
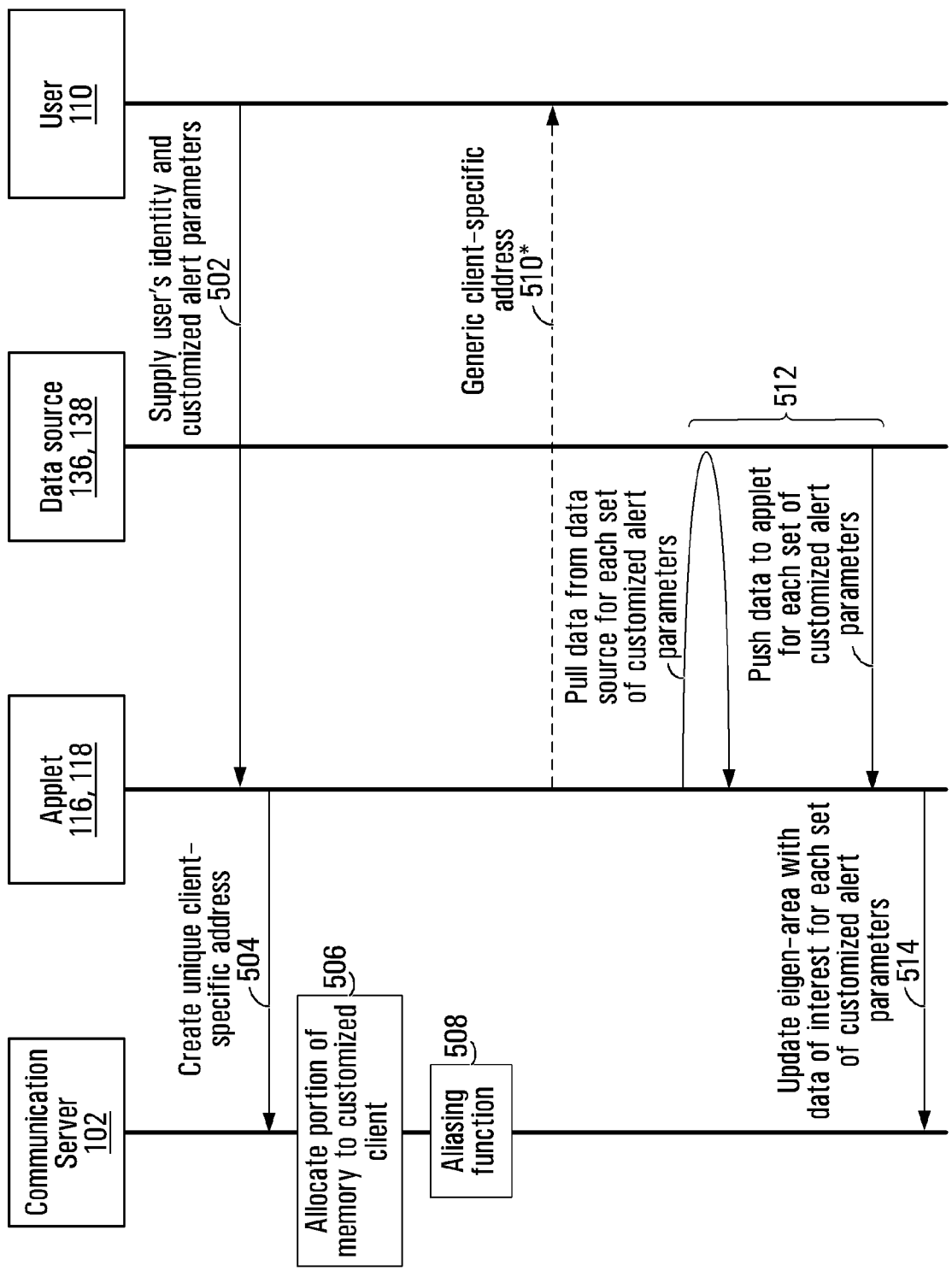
FIG. 5B is a message flow diagram related to a first variant of the second example scenario considered in FIG. 5A.

Following step 508, steps 512 and 514 of FIG. 5A are repeated in FIG. 5B.

Figure 10C:
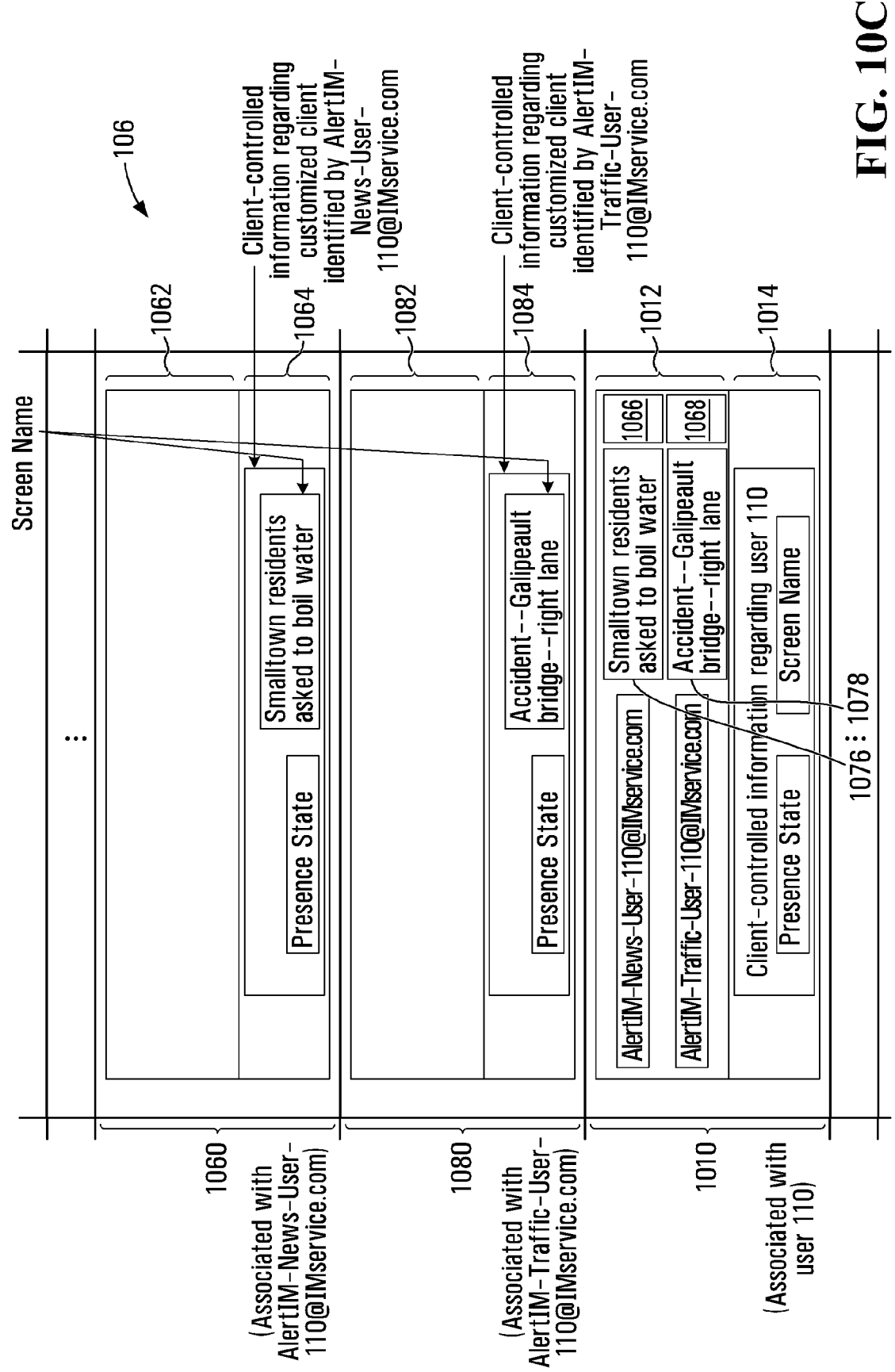
FIG. 10C illustrates a further example of potential contents of memory areas of the memory of the communication server of FIG. 1, in connection with the second example scenario considered in FIG. 5A.
Figure 11:
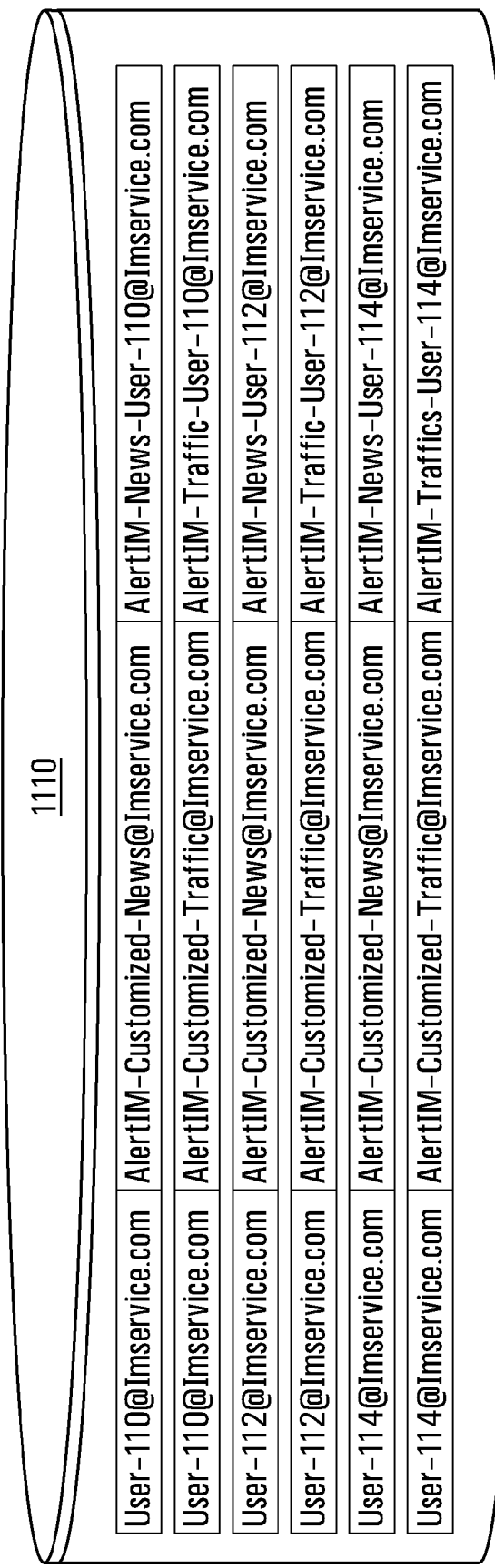
FIG. 11 illustrates an example of potential contents of a database storing addresses as part of an aliasing function, in accordance with a non-limiting embodiment of the invention.
Figure 12:
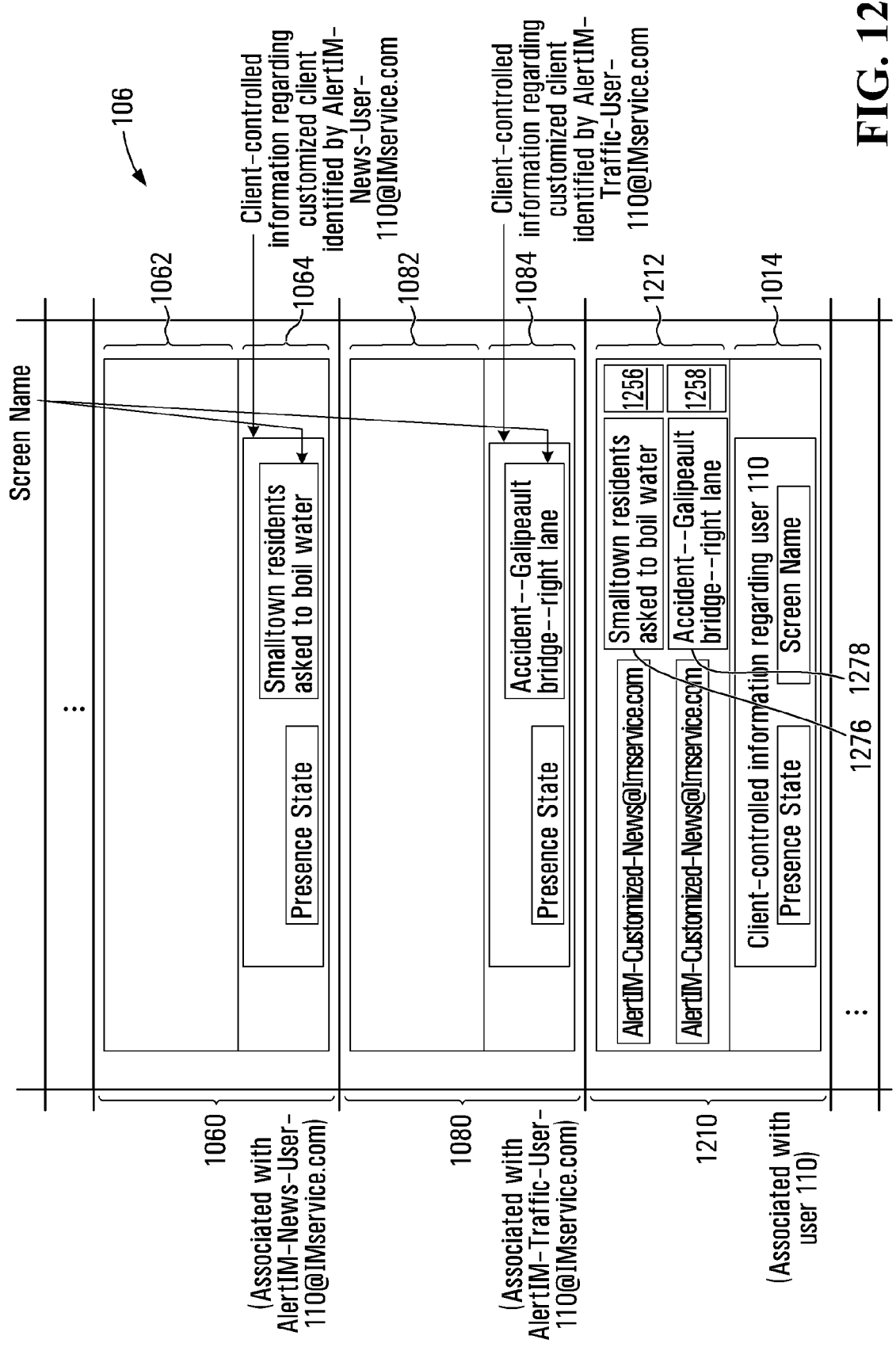
FIG. 12 illustrates an example of potential contents of memory areas of the memory of the communication server of FIG. 1, in connection with the first variant of the second example scenario that is considered in FIG. 5B.

Reference is now made to FIG. 12, which is analogous to FIG. 10C but is specifically applicable to the first variant of Scenario II. With user 110 being a client of the instant messaging service, the messaging application executed by the processor 104 in the communication server 102 will have allocated a memory area 1210 to user 110. It will be observed that memory area 1210 comprises a contact list 1212 for user 110. Initially, the contact list 1212 can be empty, i.e., it does not include the client-specific addresses of any other clients of the instant messaging service (that is, user 110 has no "buddies"). Over time, user 110 may add/remove various buddies to/from the contact list 1212 by control of the messaging application executed by the processor 104 in the communication server 102. The memory area 1210 further comprises an eigen-area 1214 containing client-controlled information regarding user 110, which the communication server 102 will make available to other clients of the instant messaging service (such as, potentially, users 112, 114 and each of the aforesaid customized clients) if their contact lists ultimately include user 110.

Figure 6B:
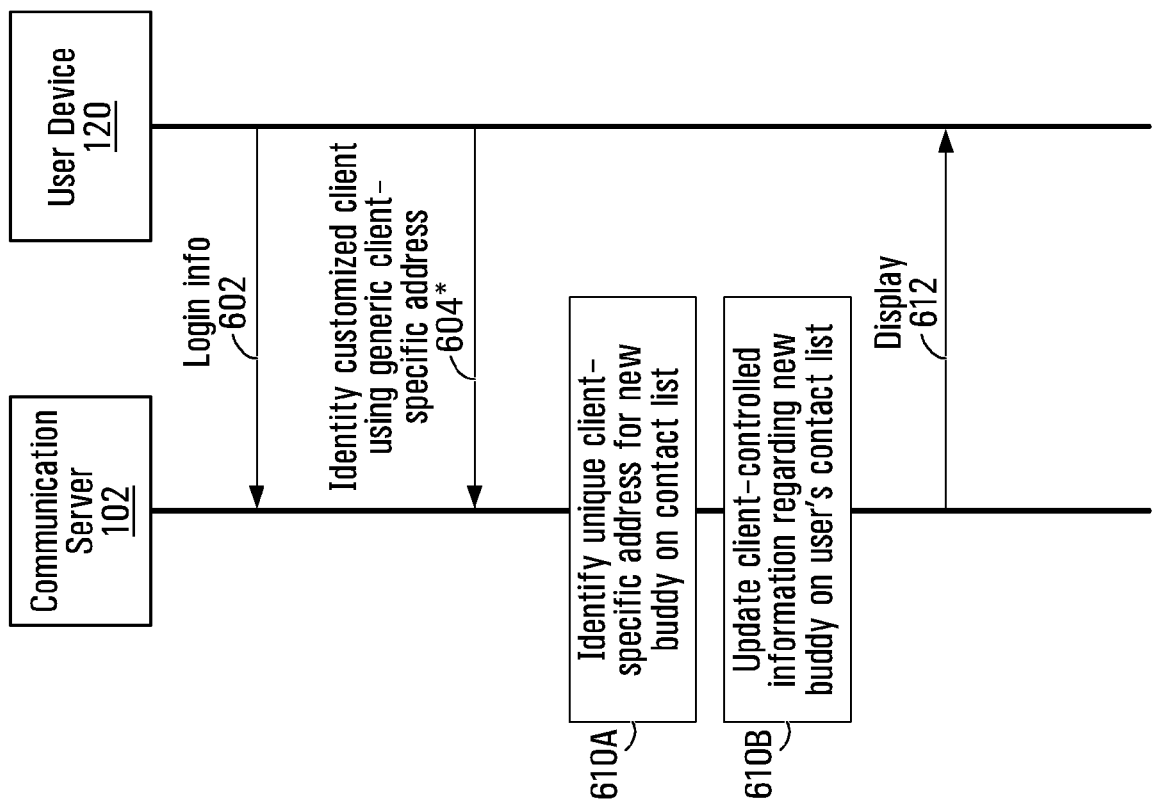
FIG. 6B is a message flow diagram illustrating further interaction between various components of the instant messaging architecture of FIG. 1, in the first variant of the second example scenario that is considered in FIG. 5B.

Turning now to the message flow diagram in FIG. 6B, user 110 uses communication device 120 to log in to (i.e., thereby instantiating a client of) the instant messaging service at step 602, as was the case in FIG. 6A. This can be achieved by providing identification and authentication credentials such as a username and a password, for example.

At step 604\*, user 110 identifies a customized client of the instant messaging service which provides a desired data service. In contrast to step 604 in FIG. 6A, this is done at step 604\* by entering the generic client-specific address associated with the customized client in question. In the example being presently described, user 110 may enter one of the aforesaid generic client-specific addresses, namely AlertIM-Customized-News@IMservice.com or AlertIM-Customized-Traffic@IMservice.com. In some embodiments, user 110 obtains knowledge of the generic client-specific address associated with the customized client of the instant messaging service that provides the desired data service through media advertising, for example, and/or based on interaction with a customer service representative, interaction with an automated voice response system, interaction with a web portal, receipt of an email, text message or instant message containing the generic client-specific address, etc. In other embodiments, user 110 obtains the generic client-specific address associated with the customized client of the instant messaging service that provides the desired data service by invoking a directory service offered by the communication server 102.

Alternatively, since user 110 has previously enrolled with applet 116 and/or applet 116, the customized client in question may send a request for acceptance to user 110, such that when user 110 logs in as a client of the instant messaging service, user 110 is prompted to accept or decline the request for acceptance. If user 110 accepts, then the customized client will be added to the contact list 1212 of user 110.

Either way, this results in the generic client-specific address associated with the customized client in question being added to the contact list 1212, leaving at least one corresponding field in the contact list 1212 for storing the client-controlled information regarding the customized client in question. In the present example, not to be considered limiting, fields 1256, 1276 are used to store the presence state and screen name, respectively, of the client having the generic client-specific address AlertIM-Customized-News@IMservice.com, while fields 1258, 1278 are used to store the presence state and screen name, respectively, of the client having the generic client-specific address AlertIM-Customized-Traffic@IMservice.com.

As an aside, it should be appreciated that an optional step (510\*) could have been performed in FIG. 5B, whereby the (previously created) generic client-specific address associated with a given one of the customized clients could have been revealed to the user community in order to inform the various other clients of the instant messaging service (in particular, user 110) of the generic client-specific address associated with the given one of the customized clients. It should be appreciated that step 510\* is optional, since the clients of the instant messaging service can gain awareness of the generic client-specific address associated with the customized clients in other ways, such as through other communication devices and other methods of communication, including, without limitation: interaction with a customer service representative, interaction with an automated voice response system, interaction with a web portal, receipt of an email, text message or instant message containing the generic client-specific address, etc. It should further be appreciated that the clients of the instant messaging service may employ a directory service (e.g. operated by the communication server 102) and, as such, not need be explicitly aware of the generic client-specific address associated with the customized clients in order to identify a given customized client.

Returning now to FIGS. 6B and 12, at step 610A, having determined that the contact list 1212 includes a new buddy, the messaging application executed by the processor 104 in the communication server 102 accesses the database 1110 on the basis of (i) the client-specific address of the new buddy (i.e., the generic client-specific address associated with the customized client in question) and (ii) the client-specific address associated with user 110, in order to identify a unique client-specific address associated with the customized client in question. In the non-limiting example depicted in FIG. 11, accessing the database 1110 on the basis of AlertIM-Customized-News@IMservice.com and User-110@IMservice.com would yield AlertIM-News-User-110@IMservice.com; analogously, accessing the database 1110 on the basis of AlertIM-Customized-Traffic@IMservice.com and User-110@IMservice.com would yield AlertIM-Traffic-User-110@IMservice.com.

At step 610B, having determined that the client-controlled information regarding the new buddy (i.e., customized client identified by the unique client-specific address obtained from the database 1110) has been updated in eigen-area 1064 or 1084, the messaging application executed by the processor 104 in the communication server 102 updates the client-controlled information regarding the new buddy on the contact list 1212 for user 110.

Specifically, the client-controlled information regarding the customized client identified by AlertIM-News-User-110@IMservice.com is obtained from eigen-area 1064 which, as previously described, conveys headline news from news sources in a user-selected set of news sources. In one embodiment, the messaging application executed by the processor 104 in the communication server 102 copies the presence state and screen name from eigen-area 1064 into fields 1256, 1276 of contact list 1212, respectively. In another embodiment where fields 1256, 1276 contain pointers to, respectively, the presence state and screen name in eigen-area 1064, the client-controlled information regarding the customized client in question will be instantly updated without the need for data transfer. A similar updating operation is performed by the communication server 102 with respect to the contact lists for other users.

For its part, the client-controlled information regarding the customized client identified by AlertIM-Traffic-User-110@IMservice.com is obtained from eigen-area 1084 which, as previously described, conveys the current traffic synopsis for a user-selected travel route. In one embodiment, the messaging application executed by the processor 104 in the communication server 102 copies the screen name and the presence state from eigen-area 1084 into fields 1258, 1279 of contact list 1212, respectively. In another embodiment where fields 1258, 1278 contain pointers to, respectively, the presence state and screen name in eigen-area 1084, the client-controlled information regarding the customized client in question will be instantly updated without the need for data transfer. A similar updating operation is performed by the communication server 102 with respect to the contact lists for other users.

At this point, the client-controlled information regarding the customized client in question (which, it is recalled, comprises the information regarding the desired data service) is ready for observation by user 110. Accordingly, at step 612, which can be inherent in step 610B or a separate step altogether, the client-controlled information regarding the customized client in question can be conveyed to user 110 in a visual format.

Persons skilled in the art will therefore appreciate that the above described embodiments allow the persistent conveyance client-controlled information regarding the customized client in question to user 110, in a non-intrusive manner and without interrupting user 110. Specifically, user 110 can monitor headline news from news sources in a user-selected set of news sources or the current traffic synopsis for a user-selected travel route on an ongoing basis—and at times of his or her own choosing. Moreover, user 110 is not compelled to remember the headline news or current traffic synopsis since user 110 can refresh his or her knowledge merely by glancing at the contact list 1012. Moreover, in this first variant of Scenario II, user 110 can access the desired data service using a generic client-specific address, which can be conveniently retained by user 110.

Meanwhile, it will be recalled from step 512 in FIG. 5B, applets 116 and 118 continue to obtain from the data sources 136, 138 the user-specific information regarding a data service associated with the various customized clients of the instant messaging service. Thus, the client-controlled information regarding the customized clients of the instant messaging service will continue to be updated in eigen-areas 1064, 1084 as the applets 116, 118 continue to execute, which ensures currency of the information being persistently conveyed to, and observed by, user 110.

Figure 13A:
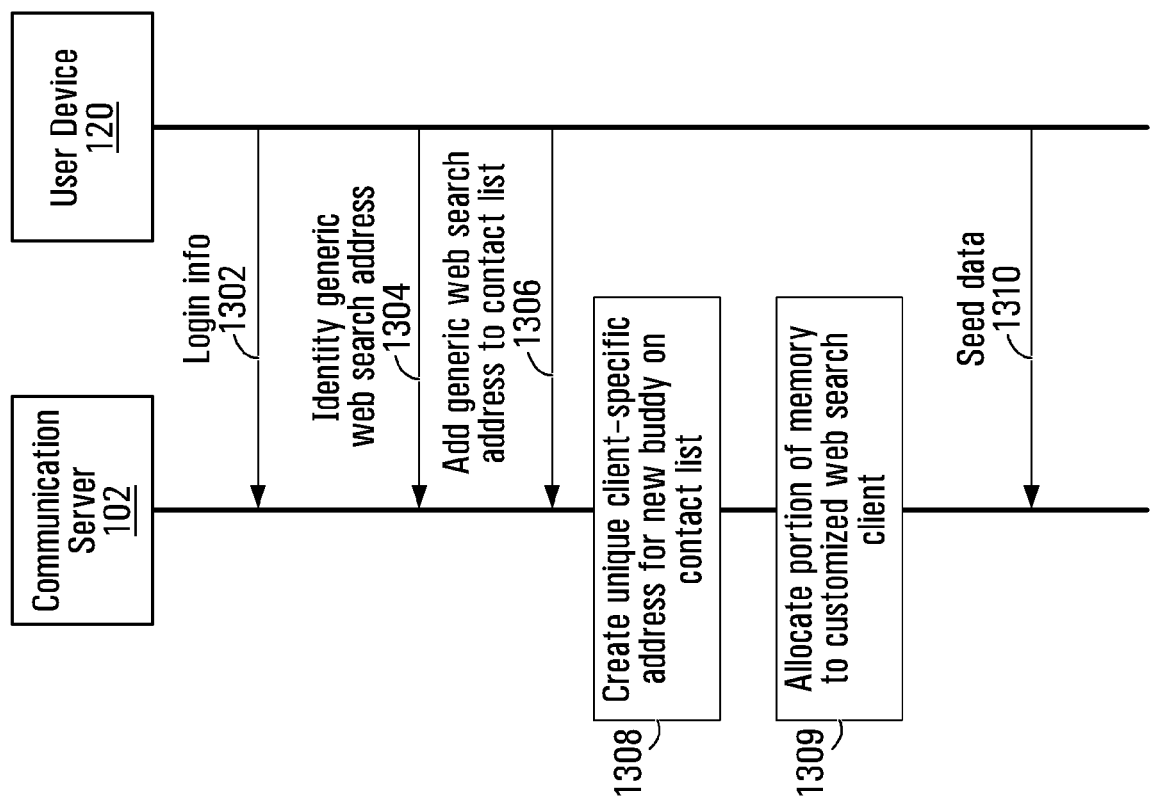
FIG. 13A is a message flow diagram illustrating interaction between various components of the instant messaging architecture of FIG. 1, in a second variant of the second example scenario considered in FIG. 5A.
Figure 13B:
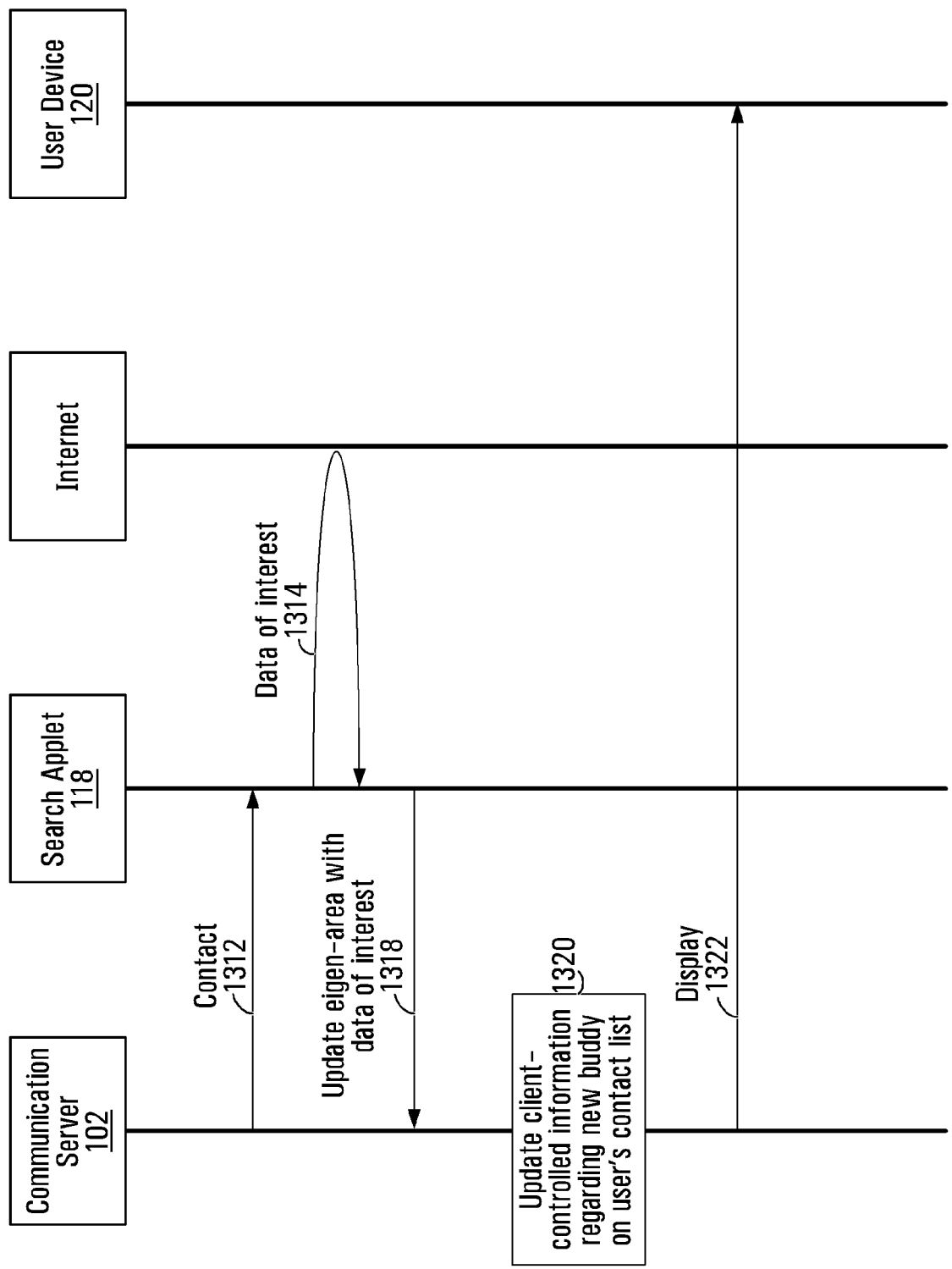
FIG. 13B is a message flow diagram illustrating further interaction between various components of the instant messaging architecture of FIG. 1, in the second variant of the second example scenario that is considered in FIG. 13A.
Figure 14:
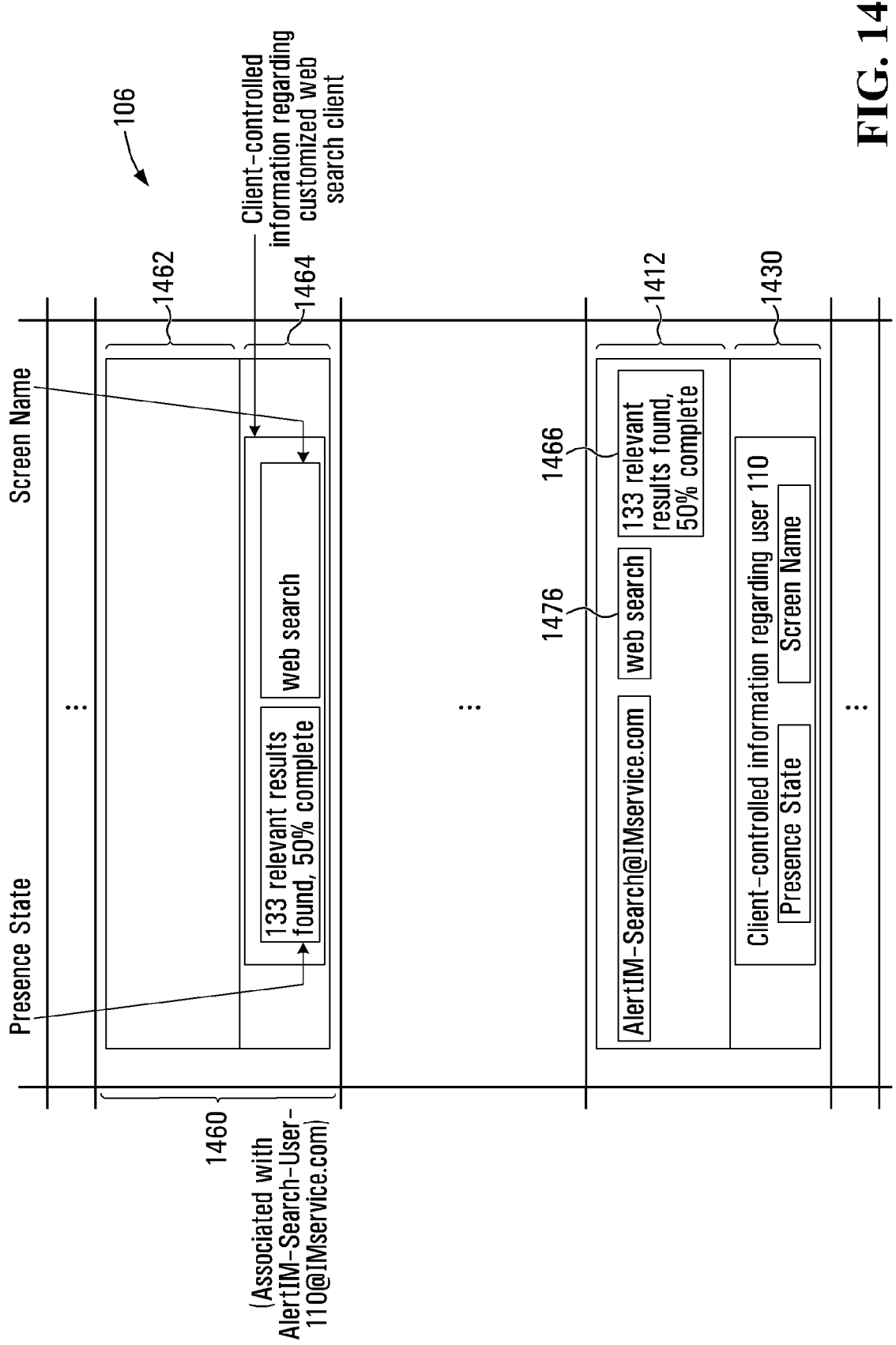
FIG. 14 illustrates an example of potential contents of memory areas of the memory of the communication server of FIG. 1, in connection with the second variant of the second example scenario that is considered in FIG. 13A.

Second Variant of Scenario II (FIGS. 13A, 13B and 14)

A second variant of Scenario II is now described, wherein user 110 provides seed data for initiating a particular data service provided by a particular applet, say, applet 118, which is hereinafter referred to as a search applet 118. For the purposes of the present example, let the particular data service be a customized web search service, where the user-specific information regarding a data service is a feature (e.g., current status, number of results, relevancy, etc.) of an online search performed by the search applet 118, based on the aforementioned seed data provided by user 110.

Accordingly, reference is made to FIG. 13A, where user 110 logs in to the instant messaging service at step 1302. This can be achieved by providing identification and authentication credentials such as a username and a password, for example. At step 1304, user 110 enters a generic client-specific address associated with the customized web search service (hereinafter referred to as a "generic web search address"), such as "AlertIM-Search@IMservice.com". In some embodiments, user 110 obtains knowledge of the generic web search address through media advertising, interaction with a customer service representative, interaction with an automated voice response system, interaction with a web portal, receipt of an email, text message or instant message containing the generic web search address, etc. In other embodiments, user 110 obtains the generic web search address by invoking a directory service offered by the communication server 102.

Alternatively, since user 110 has previously enrolled with the search applet 118, the customized client in question may send a request for acceptance to user 110, such that when user 110 logs in as a client of the instant messaging service, user 110 is prompted to accept or decline the request for acceptance. Referring now to FIG. 14, if user 110 accepts, then the customized client will be added to a contact list 1412 of user 110.

Either way, this results in the generic web search address (in this case, "AlertIM-Search@IMservice.com") being added to the contact list 1412, and leaving at least one corresponding field to be filled with the client-controlled information regarding the customized client in question. In the present example, not to be considered limiting, fields 1466, 1476 are used to store the presence state and screen name, respectively, of the customized client having the unique client-specific address AlertIM-Search@IMservice.com.

At step 1308, the messaging application executed by the processor 104 in the communication server 102 determines that the contact list 1412 includes a new buddy, which has been identified by the generic web search address. In response, the messaging application executed by the processor 104 in the communication server 102 creates a client-specific address associated with the search applet 118 and unique to user 110. By way of specific non-limiting example, a suitable client-specific address associated with the search applet 118 and unique to user 110 could be AlertIM-Search-User-110@IMservice.com. Thus, the unique client-specific address created at step 1308 effectively spawns a new client of the instant messaging service, which amounts to a "customized web search client" of the instant messaging service.

Of course, the preceding unique client-preceding specific address associated with the search applet 118 and unique to user 110 has been used as an example only, and for the sole purpose of enhancing readability; it should thus be appreciated that in actuality, the unique client-specific address associated with the search applet 118 and unique to user 110, but which need not be visible to user 110, could be different, non-standard and/or less meaningful to interpretation by a human being. Also, the unique client-specific address associated with the search applet 118 and a given user could be created by the given user or by the search applet 118.

At step 1309, the messaging application executed by the processor 104 in the communication server 102 allocates a portion of the memory 106 to the customized web search client. For example, with reference again to FIG. 14, the messaging application executed by the processor 104 in the communication server 102 allocates a memory area 1460 to the customized web search client. It will be observed that the memory area 1460 comprises a contact list 1462 for the customized web search client. Initially, the contact list 1462 can be empty, i.e., it does not include the client-specific addresses of any other clients of the instant messaging service (that is, the customized web search client has no "buddies"). The memory area 1460 further comprises an eigen-area 1464 containing client-controlled information regarding the customized web search client.

The client-controlled information regarding the customized web search client (which is stored in eigen-area 1464) represents information that the customized web search client wishes to convey to user 110. The client-controlled information stored in eigen-area 1464 may include a presence state and/or a screen name. The presence state could be used to specify an attentiveness of the customized web search client to receiving instant messages, while the screen name could be used to specify an identifier that the customized web search client wishes to use to identify itself during a conversation. However, in accordance with non-limiting embodiments of the present invention, either or both of the presence state and/or the screen name (and/or possibly other portions of the client-controlled information stored in eigen-area 1464) is used to convey the user-specific information regarding a data service, namely, a feature (e.g. current status, number of results, relevancy, etc.) of an online search to be performed later on at step 1314 based on seed data.

Accordingly, at step 1310, user 110 supplies the aforesaid seed data to the communication server 102. The seed data may include search parameters or other information employed by the search applet 118 to generate user-specific information regarding a data service. The seed data can be supplied in a number of ways, several non-limiting examples of which are now described.

In a first non-limiting example of step 1310, the messaging application executed by the processor 104 in the communication server 102 determines that the contact list 1412 includes the new buddy (identified by aforesaid the generic web search address), as described above. At this point, the messaging application executed by the processor 104 in the communication server 102 can be configured to communicate with user 110. To this end, the communication server 102 can initiate an instant message exchange with communication device 120; alternatively, the communication server 102 can initiate a call back to a telephone number associated with user 110; still other possibilities are within the scope of the present invention, including but not limited to via a web portal, interactive voice response system, URL embedded in an email or other electronic message, etc. During such communication between user 110 and the communication server 102, user 110 may supply to the communication server 102 the aforesaid seed data In a second non-limiting example of step 1310, the messaging application executed by the processor 104 in the communication server 102 determines that the contact list 1412 includes the new buddy (identified by aforesaid the generic web search address), as described above. At this point, the messaging application executed by the processor 104 in the communication server 102 can be configured to contact the search applet 118 (which can be done in a number of ways, including but not limited to using protocols such as IP and SOAP, for example) and ask it whether it wishes to add user 110 to its contact list as a buddy of its own. This may trigger the search applet 118 to communicate with user 110, e.g. by sending an instant message of its own or in a variety of other ways including but not limited to via a web portal, interactive voice response system, URL embedded in an email or other electronic message, etc. In response, user 110 may supply the aforesaid seed data to the search applet 118.

In a third non-limiting example of step 1310, the messaging application executed by the processor 104 in the communication server 102 determines that the contact list 1412 includes the new buddy (identified by aforesaid the generic web search address), and the customized web search client adds user 110 to its own contact list 1462. At this point, user 110 and the customized web search client will be cross-linked to one another. By virtue of the instant messaging service provided by the communication server 102, user 110 can initiate an instant messaging session with the search applet 118 by sending the aforesaid seed data in an instant message.

Referring now to FIG. 13B, if the actual embodiment of step 1310 did not result in the search applet 118 having been provided the seed data by user 110, then at step 1312, the messaging application executed by the processor 104 in the communication server 102 may contact the search applet 118 and supply the search applet 118 with the identity of user 110 and the seed data.

At step 1314, the search applet 118 in turn performs the web search based on the seed data provided at step 1310. The result of the web search is the user-specific information regarding a data service.

Assume now that the user-specific information regarding a data service is "133 relevant results found, 50% complete", which indicates that the web search is half complete and has found 133 relevant results. At step 1318, the search applet 118 is configured to update eigen-area 1464 for the customized web search client with the aforesaid user-specific information regarding a data service.

Specifically, and with reference again to FIG. 14, the customized web search client can update the client-controlled information in eigen-area 1464 by modifying the presence state to reflect the user-specific information regarding a data service (which, in the present example, is "133 relevant results found, 50% complete"). In addition, or alternatively, the customized web search client can update the client-controlled information in eigen-area 1464 by causing the presence state to reflect other data such as whether the search is complete and/or whether at least one relevant result was found. In a simple embodiment, the presence state can be toggled between two states (e.g., online and offline) depending on whether there are new search results. Consider the case where a specific song or video is being sought by user 110. Upon initiating the search, the presence state of the customized web search client may go to "offline", and might not change to "online" until the search has concluded successfully. By observing the presence state, user 110 can gain knowledge in a non-intrusive way that the web search has completed successfully (or that the web search has not yet completed successfully). Of course, in an alternative embodiment, the customized web search client could have updated the client-controlled information in eigen-area 1464 by also (or instead) modifying the screen name and/or possibly other portions of the client-controlled information stored in eigen-area 1464 to reflect the user-specific information regarding a data service. In summary, the information of interest is stored in eigen-area 1464 as text data or other data (such as data that encodes one or more graphical icons).

At step 1320, having determined that the client-controlled information regarding the new buddy (i.e., the customized web search client) has been updated in eigen-area 1464, the messaging application executed by the processor 104 in the communication server 102 updates the client-controlled information regarding the new buddy on the contact list 1412 for user 110. Specifically, the client-controlled information regarding the customized web search client is obtained from eigen-area 1464 which, as previously described, conveys the result of the web search. In one embodiment, the messaging application executed by the processor 104 in the communication server 102 copies the presence state and screen name from eigen-area 1464 into fields 1466, 1476 of the contact list 1412, respectively. In another embodiment where fields 1466, 1476 contain pointers to, respectively, the presence state and screen name in eigen-area 1464, the client-controlled information regarding the customized web search client will be instantly updated without the need for data transfer.

At this point, the client-controlled information regarding the customized web search client (which, it is recalled, comprises a feature of the online search) is ready for observation by user 110. Accordingly, at step 1322, which can be inherent in step 1320 or a separate step altogether, the client-controlled information regarding the customized web search client can be conveyed to user 110 in a visual format.

In a specific non-limiting example, and with reference to FIG. 20, the client-controlled information regarding the customized web search client can be displayed on the aforesaid screen of communication device 120 in the form of text, graphics and/or an icon. In this example, "web search" and "133 relevant results, 50% complete" are, respectively, the screen name and presence state of the client-controlled information regarding the customized web search client, which provides a feature of an online search performed by the search applet 118, based on seed data provided by user 110. Of note is the hourglass on the left of "web search", which indicates that the online search is still in progress.

Persons skilled in the art will therefore appreciate that the above described embodiments allow the persistent conveyance of the search results of an online search based on seed data to user 110, in a non-intrusive manner and without interrupting user 110. Specifically, user 110 can monitor the status, progress and results of an online search over time—and at instants of his or her own choosing. Moreover, user 110 is not compelled to remember this information since user 110 can refresh his or her knowledge merely by glancing at the contact list 1412.

Meanwhile, it will be recalled from step 1314, the search applet 118 may continue to perform the online search (if it is not complete) in order to obtain the user-specific information regarding a data service. Thus, the client-controlled information regarding the customized web search client will continue to be updated in eigen-area 1464 as the results of the search come in, which ensures currency of the information being persistently conveyed to, and observed by, user 110. In addition, the second variant of Scenario II allows user 110 to obtain search results on an ad hoc basis, i.e., without any prior enrollment with the search applet 118.

Scenario III (FIGS. 7, 8, 15 and 16A-16C)

Scenario III is applicable to data services that are private (i.e., providing data that is requested by individual users and is only accessible with the user's permission). Specific non-limiting examples of data services to which Scenario III applies include, without limitation:

a link to a voice mail system subscribed to by a given user (where the information regarding a data service is a feature (e.g. message urgency, number of messages, number of new messages, content of messages, etc.) of voice mail messages in the user's voice mail box);

a link to a financial institution subscribed to by a given user (where the information regarding a data service is a feature (e.g., current balance, transaction listing) regarding the user's account;

a link to a home security system subscribed to by a given user (where the information regarding a data service is the current status of various sensors in the user's home);

a link to an electronic mail system subscribed to by a given user (where the information regarding a data service is a feature (e.g. message urgency, number of messages, number of unread messages, content of messages, etc.) of email messages in the user's electronic mail box);

a link to a vehicle management system subscribed to by a given user (where the information regarding a data service is a feature (e.g. location, diagnostics, etc.) of one or more vehicles in a fleet);

a link to mapping system subscribed to by a given user (where the information regarding a data service is the location of items (e.g. mobile communication devices, courier packages, electronically tagged inventory, etc.) associated with a user account)

a link to telephony presence feature subscribed to by a given user (where the information regarding a data service is an indication of whether a given potential called party is engaged in a telephone conversation);

a link to a text messaging system subscribed to by a given user (where the information regarding a data service is a feature (e.g., message urgency, number of text messages, number of unread text messages, content of text messages, etc.) of text messages in the user's text message mailbox);

etc.

Figure 15:
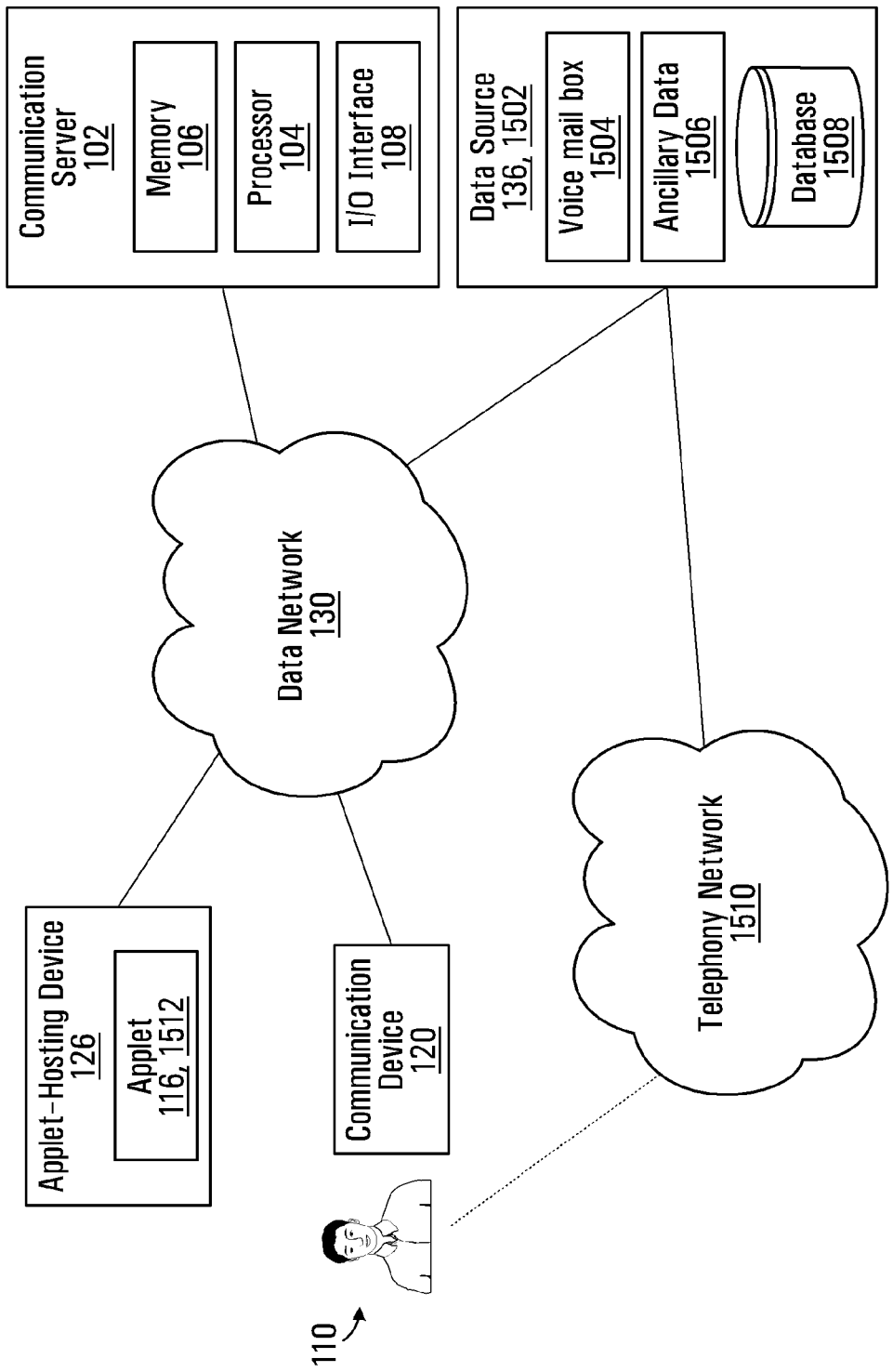
FIG. 15 illustrates a non-limiting embodiment where one of the data sources of the instant messaging architecture of FIG. 1 is a voice mail system, in connection with the third example scenario and example situation considered in FIG. 7.

Scenario III assumes the prior establishment of a relationship between user 110 and one of the data sources, say, data source 136. With reference to FIG. 15, let it be assumed for the purposes of the present non-limiting example that data source 136 is a voice mail system 1502. For the purposes of the present example, user 110 is associated with a unique network identifier (e.g. a directory number) that is reachable over a telephony network 1510, which may include the public switched telephone network (PSTN) and/or a mobile network and/or a data network (such as the data network 130).

The voice mail system 1502 is used for storing messages arising from voice calls destined for the directory number that user 110 cannot—or does not wish to—answer. For instance, when the telephony network 1510 cannot reach user 110 to complete a call placed by a caller to the directory number associated with user 110, the telephony network 1510 redirects the caller to the voice mail system 1502 where the caller leaves a voice mail message for user 110. Voice mail messages for user 110 are stored in a voice mail box 1504 associated with user 110.

The voice mail system 1502 also stores ancillary data 1506 associated with the voice mail box 1504. The ancillary data 1506 associated with the voice mail box 1504 may include information regarding the voice mail messages in the voice mail box 1504, such as the number of voice mail messages, the number of new voice mail messages, whether there are any new voice mail messages at all, the date and time of receipt of individual voice mail messages, the duration of individual voice mail messages, the urgency of individual voice mail messages, the source (e.g., originating party telephone number) of individual voice mail messages, a preview (e.g., speech-to-text) of a portion of individual voice mail messages, a contextual analysis of individual voice mail messages, etc.

In addition, the voice mail system 1502 comprises a database 1508 that stores authentication credentials for user 110 and other users of the voice mail system 1502. The authentication credentials can be used to impose or lift access restrictions to the voice mail box 1504. For example, when a querying party 1512 provides the correct identifier (e.g., a voice mail box number) and password to the voice mail system 1502, the querying party 1512 is given access to the voice mail messages in the voice mail box 1504 as well as the ancillary data 1506 associated with the voice mail box 1504. The querying party 1512 may access the voice mail box 1504 in a variety of ways, which may include—but is not limited to—dialing a telephone number of the voice mail system 1502 and communicating with the voice mail system 1502 using email and/or instant messaging. Where the querying party 1512 is a machine rather than a person, then the querying party 1512 may also access the voice mail box 1504 in a variety of ways, which may include—but is not limited to—communicating with the voice mail system 1502 using protocols such as IP and SOAP, for example.

It is noted that the querying party 1512 may be user 110 but may also be an entity other than user 110. In the example to be presented below, the querying party 1512 is applet 116, which is assumed to be a voice mail applet.

With reference to FIG. 7, Scenario III begins at step 702 by user 110 enrolling with the voice mail applet 116 to configure the data service for user 110. In particular, user 110 can contact the voice mail applet 116 by employing communication device 120 but may also enroll in a number of different ways, such as by interaction with a web portal, a customer service representative, an interactive voice response system, etc., and/or by the transmission of email messages or other messages, and using a variety of different devices. During enrolment, user 110 provides an identity of user 110, which can be in the form of the client-specific address associated with user 110 (which, in the example being used herein, is "User-110@IMservice.com"), a name, a telephone number, an IP address, an alias, a social security number, etc.

In addition, during step 702, user 110 supplies voice mail extraction parameters to the voice mail applet 116. The voice mail extraction parameters may include the aforesaid authentication credentials (e.g., identifier and password), which can be used to access the voice mail box 1504. The voice mail extraction parameters may optionally also include a telephone number of the voice mail system 1502 or other information (e.g., IP address) that will allow the voice mail applet 116 to contact the voice mail system 1502 at the next step (step 704). The voice mail extraction parameters may further include an indication of "voice mail data" for user 110, i.e., an indication as to what information user 110 is interested in knowing about the voice mail messages in the voice mail box 1504. Examples of voice mail data for user 110 include the number of voice mail messages, the number of new voice mail messages, whether there are any new voice mail messages at all (which is a binary value), the date and time of receipt of individual voice mail messages, the duration of individual voice mail messages, the urgency of individual voice mail messages, the source (e.g. originating party telephone number) of individual voice mail messages, a preview (e.g., speech-to-text) of a portion of individual voice mail messages, a contextual analysis of individual voice mail messages, etc. To this end, and depending on how user 110 entered into contact with the voice mail applet 116, the voice mail applet 116 may implement a graphical user interface or interactive voice response (IVR) system which guides user 110 through a customization procedure for providing the aforesaid indication of voice mail data for user 110.

At step 704, the voice mail applet 116 contacts the voice mail system 1502 to configure the data service for user 110. In some embodiments, the voice mail applet 116 knows by default how to contact the voice mail system 1502. In other embodiments, information on how to contact the voice mail system 1502 may have been provided by user 110 as a subset of the voice mail extraction parameters. As part of step 704, a handshake procedure may take place, whereby the voice mail applet 116 and the voice mail system 1502 agree on how the voice mail data for user 110 will be sent from the voice mail system 1502 to the voice mail applet 116.

In some embodiments, the voice mail data for user 110 will be pushed by the voice mail system 1502 on an occasional, continuous, synchronous or asynchronous basis, in which case the voice mail applet 116 can provide the voice mail system 1502 with (i) the authentication credentials for user 110 in order to prove to the voice mail system 1502 that the voice mail applet 116 can be trusted; and (ii) an address of applet-hosting device 126 in order to indicate to the voice mail system 1502 where to send the voice mail data for user 110. Alternatively, in a trusted environment, the authentication credentials for user 110 can be omitted and instead, the voice mail applet 116 can simply provide the identity of user 110 to the voice mail system 1502, whereas the address of applet-hosting device 126 will be implicit in the communication between the voice mail applet 116 and the voice mail system 1502. The identity of user 110 can then be used by the voice mail system 1502 to uniquely identify the voice mail box 1504.

In other embodiments, the voice mail data for user 110 will be pulled by the voice mail applet 116 from the voice mail system 1502 on an occasional, continuous, synchronous or asynchronous basis, in which case the voice mail applet 116 does not need to provide any information to the voice mail system 1502 at step 704. Rather, the voice mail applet 116 will provide the authentication credentials to the voice mail system 1502 on an as-needed basis, in order to access the voice mail data for user 110. In a trusted environment, the voice mail applet 116 would not even need to provide the authentication credentials to the voice mail system 1502 when accessing the voice mail data for user 110.

At step 706, the voice mail applet 116 is registered (either autonomously or with the aid of a person) as a client of the instant messaging service. This is done by contacting the communication server 102 (in this case, www.IMservice.com) and creating a client-specific address associated with the voice mail applet 116 that is unique to user 110. By way of specific non-limiting example, a suitable client-specific address associated with the voice mail applet 116 that is unique to user 110 could be AlertIM-VM-User-110@IMservice.com. It will be noted that this address is associated both with the nature of the data service (i.e., voice mail) and with a specific client of the instant messaging service (in this case, user 110). The unique client-specific address created at step 706 effectively spawns a new client of the instant messaging service, hereinafter referred to as a "customized voice mail client" of the instant messaging service.

Of course, the preceding unique client-preceding specific address associated with the voice mail applet 116 and user 110 has been used as an example only, and for the sole purpose of enhancing readability; it should thus be appreciated that in actuality, the unique client-specific address associated with the voice mail applet 116 and user 110, but which need not be visible to user 110, could be different, non-standard and/or less meaningful to interpretation by a human being. Also, the unique client-specific address associated with a the voice mail applet 116 and a given user could be created by voice mail applet 116 or the given user.

At step 708, in response to creation of the client-specific address associated with the customized voice mail client of the instant messaging service, the messaging application executed by the processor 104 in the communication server 102 allocates a portion of the memory 106 to the customized voice mail client. For example, with reference to FIG. 16A, the messaging application executed by the processor 104 in the communication server 102 allocates a memory area 1660 to the customized voice mail client. It will be observed that the memory area 1660 comprises a contact list 1662 for the customized voice mail client. Initially, the contact list 1662 can be empty, i.e., it does not include the client-specific addresses of any other clients of the instant messaging service (that is, the customized voice mail client has no "buddies"). The memory area 1660 further comprises an eigen-area 1664 containing client-controlled information regarding the customized voice mail client, which the communication server 102 will make available to user 110 if that user's contact list ultimately includes the customized voice mail client.

The client-controlled information regarding the customized voice mail client (which is stored in eigen-area 1664) represents information that the customized voice mail client wishes to convey to user 110. The client-controlled information stored in eigen-area 1664 may include a presence state and/or a screen name. The presence state could be used to specify an attentiveness of the customized voice mail client to receiving instant messages, while the screen name could be used to specify an identifier that the customized voice mail client wishes to use to identify itself during a conversation. However, in accordance with non-limiting embodiments of the present invention, either or both of the presence state and/or the screen name (and/or possibly other portions of the client-controlled information stored in eigen-area 1664) is used to convey the aforesaid voice mail data for user 110.

Accordingly, and returning to FIG. 7 at step 712, the voice mail applet 116 is configured to obtain the voice mail data for user 110 from the voice mail system 1502. Moreover, this operation can be performed for other users (e.g., users 112, 114) in order to obtain the respective voice mail data for those users as well. In order for the voice mail applet 116 to obtain the voice mail data for user 110 from the voice mail system 1502, the voice mail applet 116 may occasionally, continuously, synchronously or asynchronously pull the voice mail data for user 110 from the voice mail system 1502; alternatively, the voice mail system 1502 may be configured to occasionally, continuously, synchronously or asynchronously push the voice mail data for user 110 to the voice mail applet 116.

Assume now that the voice mail data for user 110 is "4 messages, 1 new", which indicates that there are four (4) voice mail messages in the voice mail box 1504, of which one (1) is new. At step 714, the voice mail applet 116 is configured to update eigen-area 1664 for the customized voice mail client with the voice mail data for user 110.

Figure 16A:
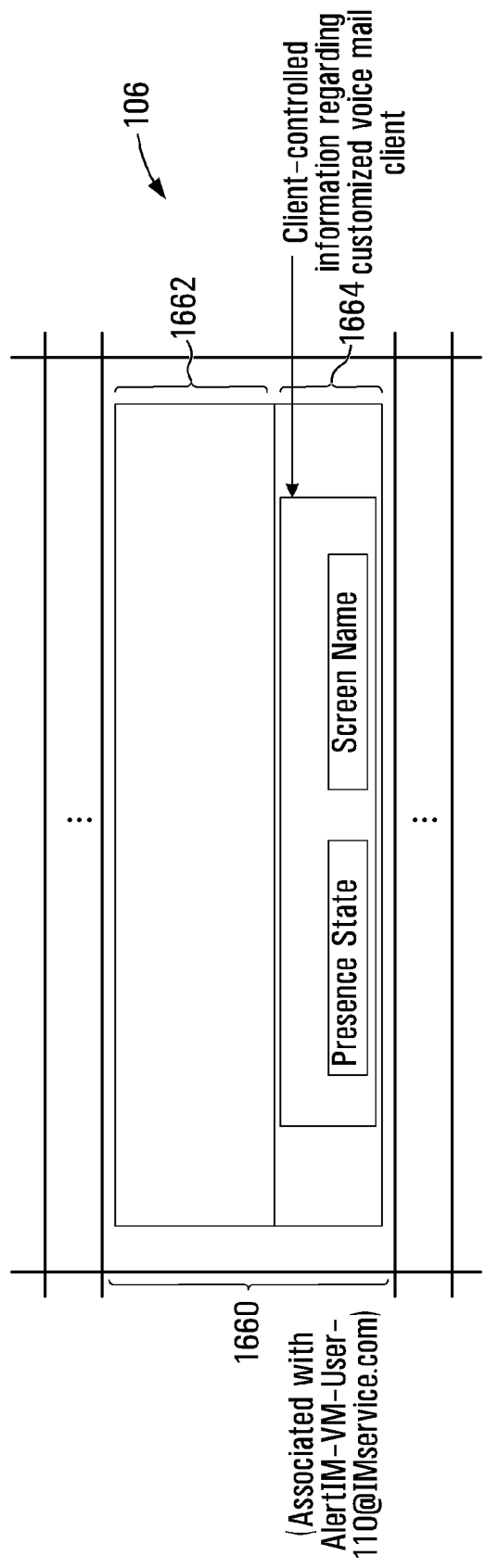
FIG. 16A illustrates an example of potential contents of memory areas of the memory of the communication server of FIG. 1, in connection with the third example scenario and example situation considered in FIG. 7.
Figure 16B:
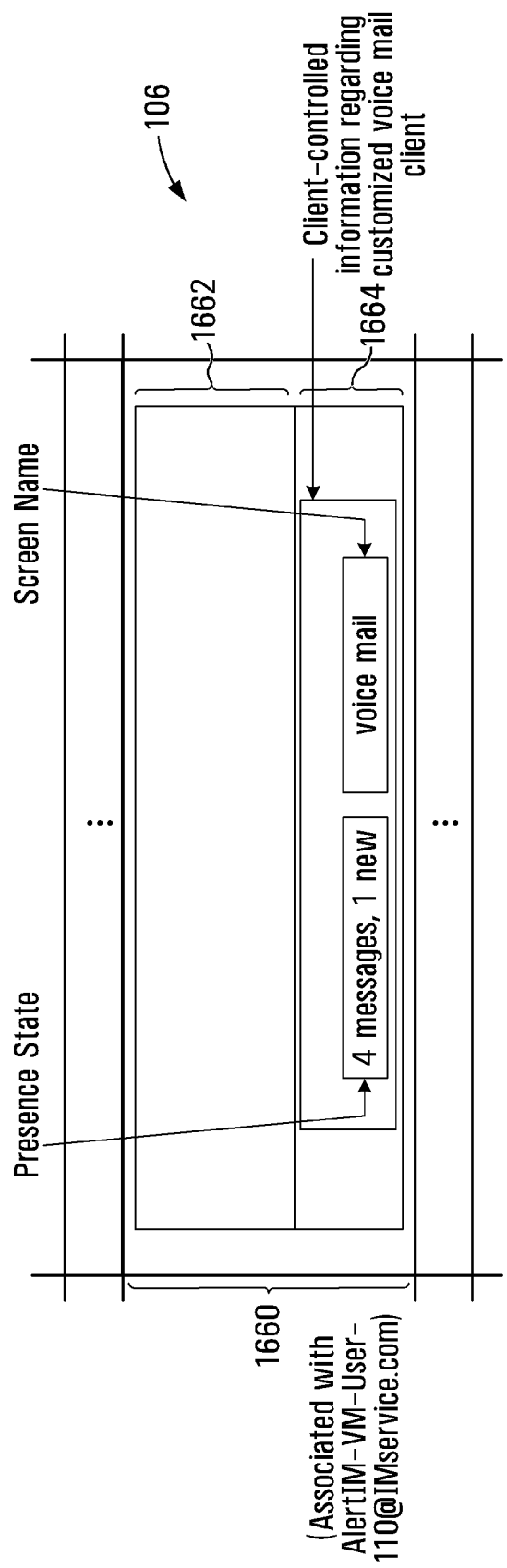
FIG. 16B illustrates an example of potential updated contents of the memory areas of FIG. 16A.
Figure 16C:
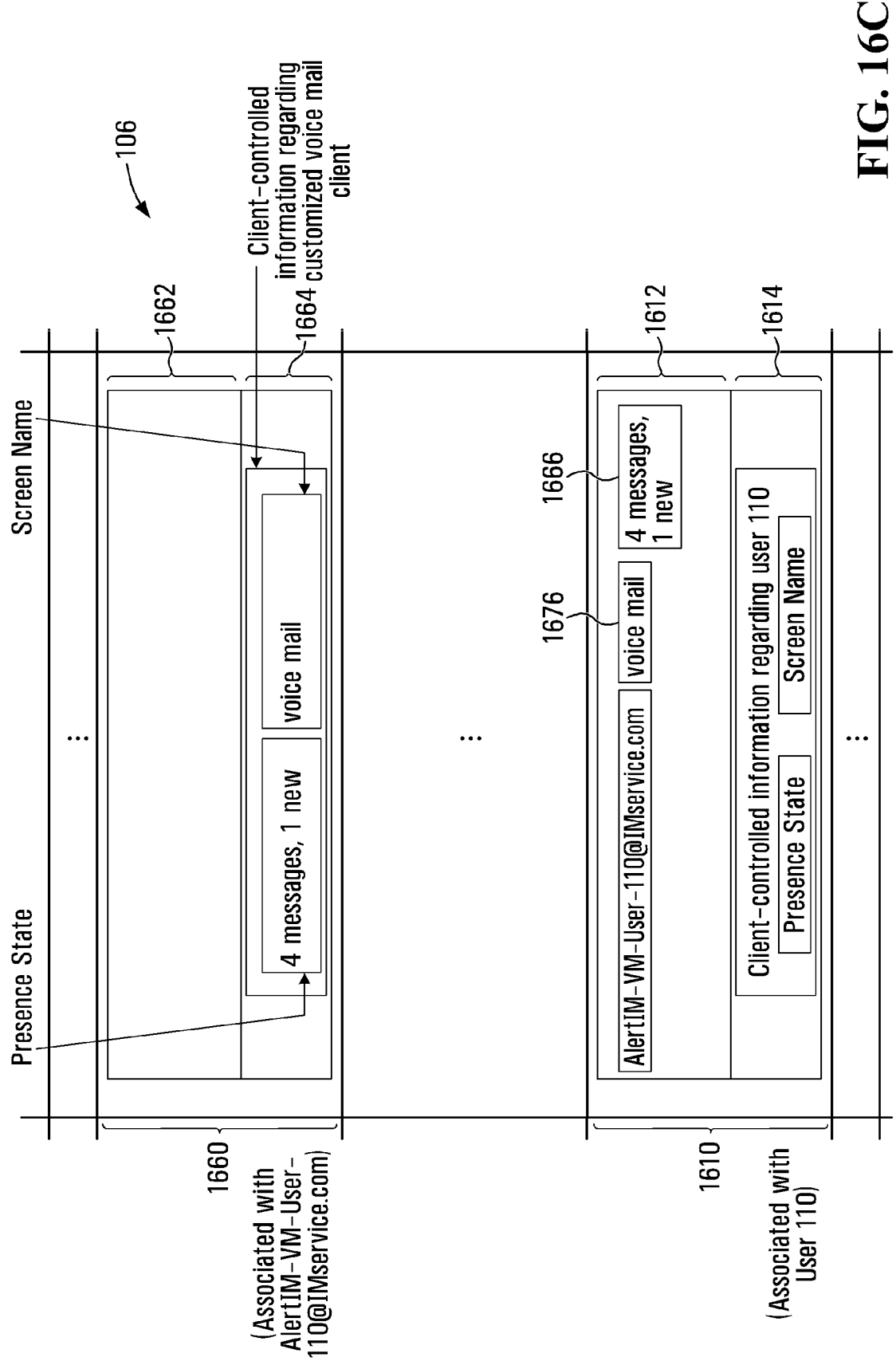
FIG. 16C illustrates a further example of potential contents of memory areas of the memory of the communication server of FIG. 1, in connection with the third example scenario and example situation considered in FIG. 7.

Specifically, and with reference to FIG. 16B, the customized voice mail client can update the client-controlled information in eigen-area 1664 by modifying the presence state to reflect the voice mail data for user 110 (which, in the present example, is "4 messages, 1 new"). In addition, or alternatively, the customized voice mail client can update the client-controlled information in eigen-area 1664 by causing the presence state to reflect data that can be easily expressed using simple icons, such as whether there are any voice mail messages at all and/or whether there are any new voice mail messages. This can also be achieved by causing the presence state to indicate "online" when there is at least one new voice mail message and "offline" otherwise. Of course, in an alternative embodiment, the customized voice mail client could have updated the client-controlled information in eigen-area 1664 by also (or instead) modifying the screen name and/or possibly other portions of the client-controlled information stored in eigen-area 1664 to reflect the voice mail data for user 110. In summary, the voice mail data is stored in eigen-area 1664 as text data or other data (such as data that encodes one or more graphical icons).

Interaction between a given one the communication devices 120, 122, 124 and the communication server 102 under Scenario III is now described. For the sake of simplicity, let the given communication device be communication device 120 which is associated with user 110, and let it be assumed that user 110 is a client of the instant messaging service. That is to say, user 110 has a client-specific address, say, "User-110@IMservice.com". In addition, a portion of the memory 106 is allocated to user 110. For example, with reference to FIG. 16C, the messaging application executed by the processor 104 in the communication server 102 allocates a memory area 1610 to user 110.

It will be observed that memory area 1610 comprises a contact list 1612 for user 110. Initially, the contact list 1612 can be empty, i.e., it does not include the client-specific addresses of any other clients of the instant messaging service (that is, user 110 has no "buddies"). Over time, user 110 may add/remove various buddies to/from the contact list 1612 by control of the messaging application executed by the processor 104 in the communication server 102. The memory area 1610 further comprises an eigen-area 1614 containing client-controlled information regarding user 110, which the communication server 102 will make available to other clients of the instant messaging service (such as, potentially, users 112, 114 and the customized voice mail client) if their contact lists ultimately include user 110.

Figure 8:
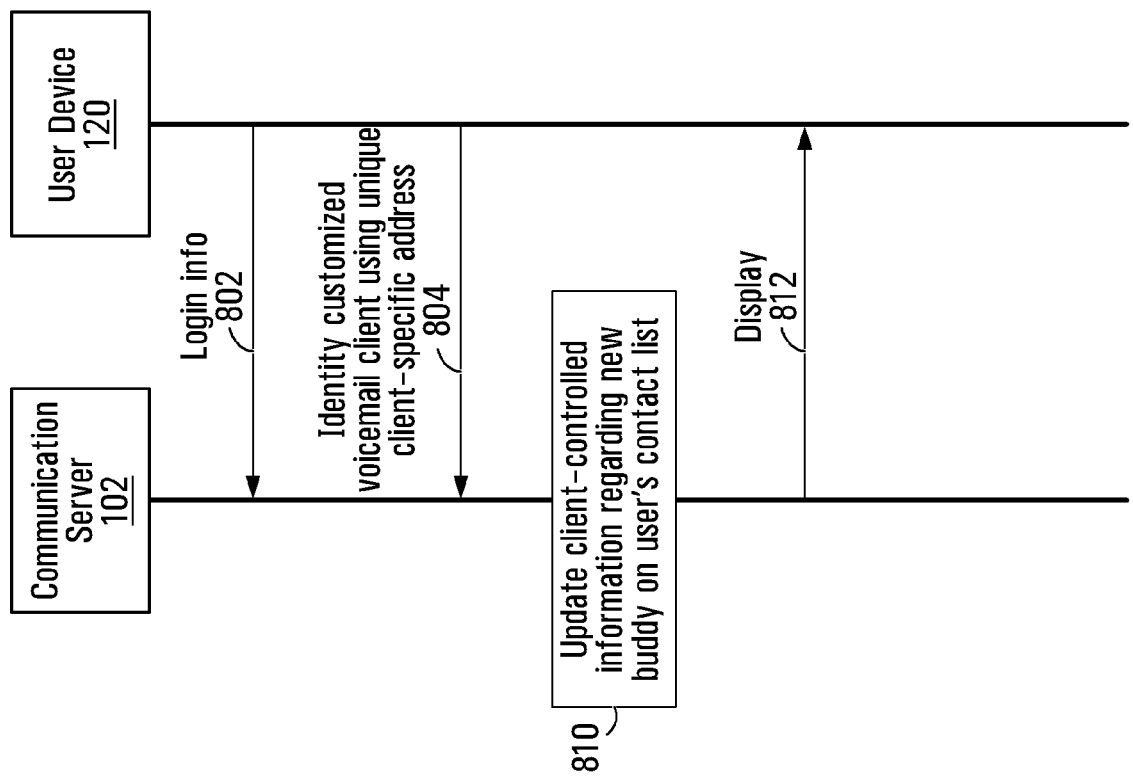
FIG. 8 is a message flow diagram illustrating further interaction between various components of the instant messaging architecture of FIG. 1, in the third example scenario and example situation considered in FIG. 7.

With reference now to the message flow diagram in FIG. 8, user 110 uses communication device 120 to log in to (i.e., thereby instantiating a client of) the instant messaging service at step 802. This can be achieved by providing identification and authentication credentials such as a username and a password, for example.

At step 804, user 110 identifies the customized voice mail client by entering the unique client-specific address associated with the customized voice mail client. In the example being presently described, user 110 may enter AlertIM-VM-User-110@IMservice.com. In certain embodiments, user 110 identifies the customized voice mail client using a directory service offered by the communication server 102, while in other embodiments, user 110 may directly type in the unique client-specific address associated with the customized voice mail client.

Alternatively, since user 110 has previously enrolled with the voice mail applet 116, the customized voice mail client may send a request for acceptance to user 110, such that when user 110 logs in as a client of the instant messaging service, user 110 is prompted to accept or decline the request for acceptance. If user 110 accepts, then the customized voice mail client will be added to the contact list 1612 of user 110.

Either way, this results in the unique client-specific address associated with the customized voice mail client being added to the contact list 1612, leaving fields 1666, 1676 in the contact list 1612 for storing the client-controlled information regarding the customized voice mail client. In the present example, not to be considered limiting, fields 1666, 1676 are used to store the presence state and screen name, respectively, of the client having the unique client-specific address AlertIM-VM-User-110@IMservice.com.

As an aside, it should be appreciated that an optional step (710) could have been performed in FIG. 7, whereby the unique client-specific address created at step 704 can be revealed to user 110 in order to inform him or her of the unique client-specific address associated with the customized voice mail client. It should be appreciated that step 710 is optional, since the clients of the instant messaging service can gain awareness of the unique client-specific address associated with the customized voice mail client in other ways, such as through other communication devices and other methods of communication, including, without limitation: interaction with a customer service representative, interaction with an automated voice response system, interaction with a web portal, receipt of an email, text message or instant message containing the unique client-specific address, etc. It should further be appreciated that the clients of the instant messaging service may employ a directory service (e.g. operated by the communication server 102) and, as such, not need be explicitly aware of the unique client-specific address associated with the customized voice mail client.

Returning now to FIGS. 8 and 16C, having determined that the client-controlled information regarding the new buddy (i.e., the customized voice mail client) has been updated in eigen-area 1664, the messaging application executed by the processor 104 in the communication server 102 updates the client-controlled information regarding the new buddy on the contact list 1612 for user 110.

Specifically, the client-controlled information regarding the customized voice mail client is obtained from eigen-area 1664 which, as previously described, conveys voice mail data. In one embodiment, the messaging application executed by the processor 104 in the communication server 102 copies the presence state and screen name from eigen-area 1664 into fields 1666, 1676 of the contact list 1612. In another embodiment where fields 1666, 1676 contain pointers to, respectively, the presence state and screen name in eigen-area 1664, the client-controlled information regarding the customized voice mail client will be instantly updated without the need for data transfer.

At this point, the client-controlled information regarding the customized voice mail client (which, it is recalled, comprises the voice mail data for user 110) is ready for observation by user 110. Accordingly, at step 812, which can be inherent in step 810 or a separate step altogether, the client-controlled information regarding the customized voice mail client can be conveyed to user 110 in a visual format.

In a specific non-limiting example, and with reference to FIG. 20, the client-controlled information regarding the customized voice mail client can be displayed on the aforesaid screen of communication device 120 in the form of text, graphics and/or an icon. In this example, "voice mail" and "4 messages, 1 new" are, respectively, the screen name and presence state of the client-controlled information regarding the customized voice mail client, which provides a feature of voice mail messages in voice mail box 1504.

Persons skilled in the art will therefore appreciate that the above described embodiments allow the persistent conveyance of client-controlled information regarding the customized voice mail client to user 110, in a non-intrusive manner and without interrupting user 110. Specifically, user 110 can monitor the number of new or total messages in the voice mail box 1504 and/or their content and/or their status on an ongoing basis—and at times of his or her own choosing. Moreover, user 110 is not compelled to remember this information since user 110 can refresh his or her knowledge merely by glancing at the contact list 1612.

Meanwhile, it will be recalled from step 712 in FIG. 7, the voice mail applet 116 continues to obtain the voice mail data for user 110 from the voice mail system 1502. Thus, the client-controlled information regarding the customized voice mail client will continue to be updated in eigen-area 1664 as the voice mail applet 116 continues to execute, which ensures currency of the information being persistently conveyed to, and observed by, user 110.

Moreover, it should be appreciated that the client-controlled information regarding a given customized client can include passive data, which can be intended merely for observation by user 110, as well as active data, which can allow user 110 to perform an action on the active data, triggering an interaction with the given customized client and allowing user 110 to retrieve further information related to the active data. For example, where the client-controlled information regarding the given customized client is voice mail data for user 110, the "further information" can be the actual contents of one or more voice mail messages.

The aforesaid interaction between user 110 and the given customized client may be triggered by user 110 sending an electronic message (e.g., an instant message) to the given customized client, which can serve as a request for the further information. Alternatively, the given customized client can send an electronic message (e.g., an instant message) to user 110 containing an actionable URL, which can lead user 110 to a web portal where user 110 may interact further with the applet that supports the given customized client.

The aforesaid further information (e.g., the actual contents of one or more voice mail messages) can be conveyed in various non-limiting ways, such as by triggering a callback to a telephony device registered to user 110, or sending a media file for playback over communication device 120. According to yet other non-limiting alternatives, the aforesaid further information (e.g., the actual contents of one or more voice mail messages) can be conveyed in various other ways, such as by conversion from speech into text that is sent in the form of one or more messages (e.g., instant messages, email messages, etc.) to communication device 120 or to another communication device employed by user 110.

Also, it should be appreciated that the client-controlled information regarding a given customized client can be dynamically updated based on the aforesaid interaction between user 110 and the given customized client. For example, the given customized client can track which client-controlled information regarding the given customized client has been observed by user 110. This can be achieved by tracking which further information has been retrieved by user 110 pursuant to an interaction with the given customized client. Alternatively, this can be achieved by monitoring cookies within communication device 120, or in a variety of other ways. With the knowledge of what information user 110 has actually observed, the given customized client can accordingly update the client-controlled information regarding the given customized client.

For example, where the user-specific client-controlled information regarding the customized voice mail client is an indication that there are three new voice mail messages #1, #2 and #3, and where user 110 has retrieved further information (e.g., has just listened to) voice mail message #2, the customized voice mail client can gain knowledge of this fact in one of the aforesaid ways. The result is that the client-controlled information regarding the customized voice mail client will now be an indication that there are only two new voice mail messages (i.e., #1 and #3). An indication of voice mail message #2 can be displayed differently, or can simply be classified as a voice mail message that is "old", thereby assisting user 110 in navigating through the voice mail box 1504.

Persons skilled in the art will appreciate that it may be beneficial to ensure that a given user who wishes to benefit from a particular private data service falling under Scenario III be authorized to do so. For example, it is within the scope of the present invention to require that the given user pay for the data service on a per-use basis, on a per-customized client basis or in accordance with any suitable subscription scheme. It is also within the scope of the present invention to require that the given user enroll with the applet-hosting device that hosts the applet that provides the particular data service. Thus, an authorization step may be included at some point during Scenario III. Reference is made to the above description of FIGS. 4A through 4F, which also apply to Scenario III, with the exception that the enrollment steps in FIGS. 4A and 4B can be considered redundant, since user 110 is assumed to have enrolled with the voice mail applet 116.

Figure 18A:
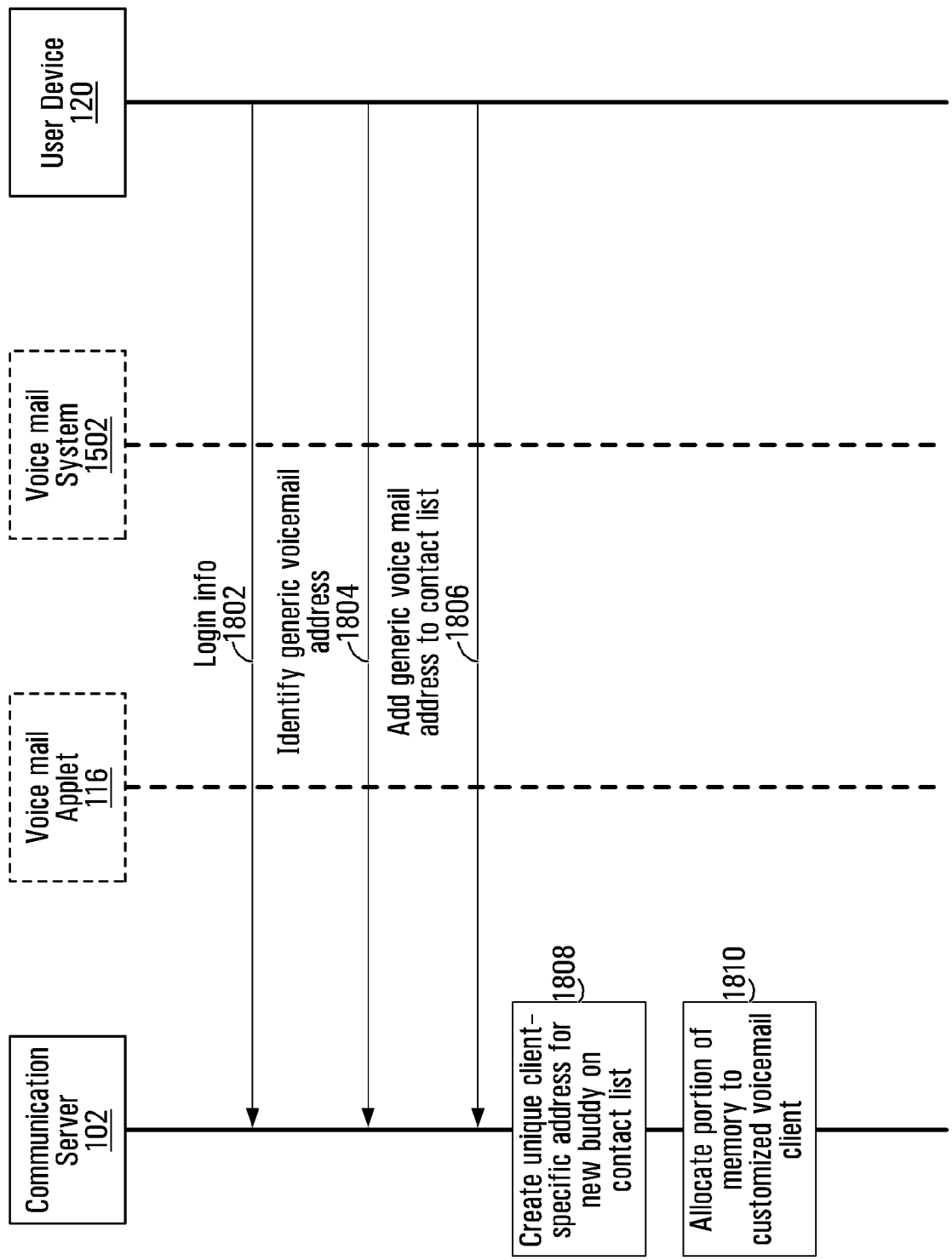
FIG. 18A is a message flow diagram related to a first variant of the third example scenario and example situation considered in FIG. 7.
Figure 18B:
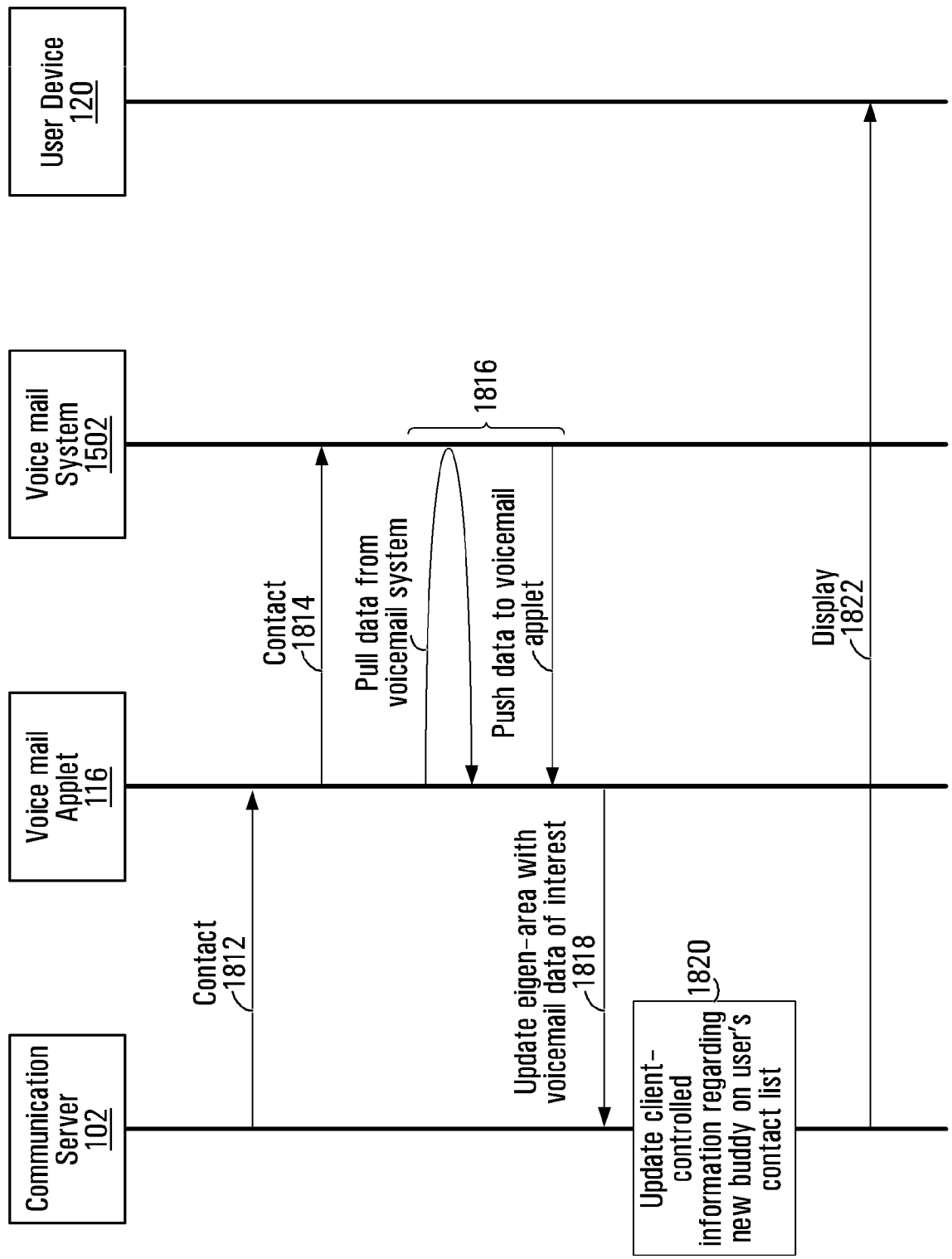
FIG. 18B is a message flow diagram illustrating further interaction between various components of the instant messaging architecture of FIG. 1, in the first variant of the third example scenario and example situation that is considered in FIG. 18A.

Variant of Scenario III (FIGS. 18A, 18B and 19)

A variant of Scenario III is now described, wherein a generic client-specific address is used to identify a voice mail data service for user 110. Accordingly, reference is made to FIG. 18A, where user 110 logs in to the instant messaging service at step 1802. This can be achieved by providing identification and authentication credentials such as a username and a password, for example. At step 1804, user 110 enters a generic client-specific address associated with the voice mail data service (hereinafter referred to as a "generic voice mail address"), such as "AlertIM-VM@IMservice.com". In some embodiments, user 110 obtains knowledge of the generic voice mail address through media advertising, interaction with a customer service representative, interaction with an automated voice response system, interaction with a web portal, receipt of an email, text message or instant message containing the generic voice mail address, etc. In other embodiments, user 110 obtains the generic voice mail address by invoking a directory service offered by the communication server 102.

Alternatively, since user 110 has previously enrolled with the voice mail applet 116, the customized voice mail client may send a request for acceptance to user 110, such that when user 110 logs in as a client of the instant messaging service, user 110 is prompted to accept or decline the request for acceptance. Referring now to FIG. 19, if user 110 accepts, then the customized voice mail client will be added to a contact list 1912 of user 110.

Either way, his results in the generic voice mail address being added to the contact list 1912, and leaving at least one corresponding field to be filled with the client-controlled information regarding the customized client in question. In the present example, not to be considered limiting, fields 1966, 1976 are used to store the presence state and screen name, respectively, of the customized client having the generic client-specific address AlertIM-VM@IMservice.com.

At step 1808, the messaging application executed by the processor 104 in the communication server 102 determines that the contact list 1912 includes a new buddy, which has been identified by the generic voice mail address. In response, the messaging application executed by the processor 104 in the communication server 102 creates a client-specific address associated with the voice mail applet 116 and unique to user 110. By way of specific non-limiting example, a suitable client-specific address associated with the voice mail applet 116 and unique to user 110 could be AlertIM-VM-User-110@IMservice.com. Thus, the unique client-specific address created at step 1808 effectively spawns a new client of the instant messaging service, which amounts to the aforementioned "customized voice mail client" of the instant messaging service.

Of course, the preceding unique client-preceding specific address associated with the voice mail applet 116 and user 110 has been used as an example only, and for the sole purpose of enhancing readability; it should thus be appreciated that in actuality, the unique client-specific address associated with the voice mail applet 116 and user 110, but which need not be visible to user 110, could be different, non-standard and/or less meaningful to interpretation by a human being. Also, the unique client-specific address associated with the voice mail applet 116 and a given user could be created by voice mail applet 116 or the given user.

At step 1810, in response to creation of the unique client-specific address associated with the customized voice mail client of the instant messaging service, the messaging application executed by the processor 104 in the communication server 102 allocates a portion of the memory 106 to the customized voice mail client. For example, with reference again to FIG. 19, the messaging application executed by the processor 104 in the communication server 102 allocates a memory area 1960 to the customized voice mail client. It will be observed that the memory area 1960 comprises a contact list 1962 for the customized voice mail client. Initially, the contact list 1962 can be empty, i.e., it does not include the client-specific addresses of any other clients of the instant messaging service (that is, the customized voice mail client has no "buddies"). The memory area 1960 further comprises an eigen-area 1964 containing client-controlled information regarding the customized voice mail client.

The client-controlled information regarding the customized voice mail client (which is stored in eigen-area 1964) represents information that the customized voice mail client wishes to convey to user 110. The client-controlled information stored in eigen-area 1964 may include a presence state and/or a screen name. The presence state could be used to specify an attentiveness of the customized voice mail client to receiving instant messages, while the screen name could be used to specify an identifier that the customized voice mail client wishes to use to identify itself during a conversation. However, in accordance with non-limiting embodiments of the present invention, either or both of the presence state and/or the screen name (and/or possibly other portions of the client-controlled information stored in eigen-area 1964) is used to convey the aforesaid voice mail data for user 110.

Accordingly, and referring now to FIG. 18B, at step 1812, the messaging application executed by the processor 104 in the communication server 102 contacts the voice mail applet 116 and supplies the voice mail applet 116 with the identity of user 110, which was received at step 1802. At step 1814, the voice mail applet 116 in turn contacts the voice mail system 1502 to configure the data service for user 110. It is within the scope of the present invention for the voice mail applet 116 to know by default how to contact the voice mail system 1502. As part of step 1814, a handshake procedure may take place, whereby the voice mail applet 116 and the voice mail system 1502 agree on how voice mail data for user 110 will be sent from the voice mail system 1502 to the customized voice mail client. This has previously been described with reference to step 704.

At step 1816, the voice mail applet 116 is configured to obtain the voice mail data for user 110 from the voice mail system 1502. In order for the voice mail applet 116 to obtain the voice mail data for user 110 from the voice mail system 1502, the customized voice mail client may occasionally, continuously, synchronously or asynchronously pull the voice mail data for user 110 from the voice mail system 1502; alternatively, the voice mail system 1502 may be configured to occasionally, continuously, synchronously or asynchronously push the voice mail data for user 110 to the voice mail applet 116.

Assume now that the voice mail data for user 110 is "4 messages, 1 new", which indicates that there are four (4) voice mail messages in the voice mail box 1504, of which one (1) is new. At step 1818, the voice mail applet 116 is configured to update eigen-area 1964 for the customized voice mail client with the voice mail data for user 110.

Specifically, and with reference again to FIG. 19, the customized voice mail client updates the client-controlled information in eigen-area 1964 by modifying the presence state to reflect the voice mail data for user 110 (which, in the present example, is "4 messages, 1 new"). In addition, or alternatively, the customized voice mail client can update the client-controlled information in eigen-area 1964 by causing the presence state to reflect data that can be easily expressed using simple icons, such as whether there are any voice mail messages at all and/or whether there are any new voice mail messages. This can also be achieved by causing the presence state to indicate "online" when there is at least one new voice mail message and "offline" otherwise. Of course, in an alternative embodiment, the customized voice mail client could have updated the client-controlled information in eigen-area

1964 by also (or instead) modifying the screen name and/or possibly other portions of the client-controlled information stored in eigen-area 1964 to reflect the voice mail data for user 110. In summary, the voice mail data is stored in eigen-area 1964 as text data or other data (such as data that encodes one or more graphical icons).

At step 1820, having determined that the client-controlled information regarding the new buddy (i.e., the customized voice mail client) has been updated in eigen-area 1964, the messaging application executed by the processor 104 in the communication server 102 updates the client-controlled information regarding the new buddy on the contact list 1912 for user 110.

Specifically, the client-controlled information regarding the customized voice mail client is obtained from eigen-area 1964 which, as previously described, conveys voice mail data. In one embodiment, the messaging application executed by the processor 104 in the communication server 102 copies the presence state and screen name from eigen-area 1964 into fields 1966, 1976 of the contact list 1612. In another embodiment where fields 1966, 1976 contain pointers to, respectively, the presence state and screen name in eigen-area 1964, the client-controlled information regarding the customized voice mail client will be instantly updated without the need for data transfer.

At this point, the client-controlled information regarding the customized voice mail client (which, it is recalled, comprises the voice mail data) is ready for observation by user 110. Accordingly, at step 1820, which can be inherent in step 1818 or a separate step altogether, the client-controlled information regarding the customized voice mail client can be conveyed to user 110 in a visual format.

Persons skilled in the art will therefore appreciate that the above described embodiments allow the persistent conveyance of client-controlled information regarding the customized voice mail client to user 110, in a non-intrusive manner and without interrupting user 110. Specifically, user 110 can monitor the number of total or new messages in the voice mail box 1504 and/or their content and/or their status on an ongoing basis—and at times of his or her own choosing. Moreover, user 110 is not compelled to remember this information since user 110 can refresh his or her knowledge merely by glancing at the contact list 1912.

Meanwhile, it will be recalled from step 1816, the voice mail applet 116 continues to obtain the voice mail data for user 110 from the voice mail system 1502. Thus, the client-controlled information regarding the customized voice mail client will continue to be updated in eigen-area 1964 as the voice mail applet 116 continues to execute, which ensures currency of the information being persistently conveyed to, and observed by, user 110. In addition, the above variant of Scenario III allows user 110 to obtain voice mail data on an ad hoc basis, i.e., without any prior enrollment with the voice mail applet 116.

Thus, it will be appreciated that the present invention is applicable to instances where a given user wishes to keep track of a certain amount of information regarding a data service on an ongoing basis (even when the information regarding a data service does not change), and without being interrupted when the information regarding a data service does change.

Moreover, it should be appreciated that the information regarding a data service can include passive data, which is akin to a status update, and active data, which allows the given user to take further action. For example, the information regarding a data service in any of the above scenarios may comprise a uniform resource locator (URL) that can be actionable by user 110 and, when actioned, leads user 110 to a portal where user 110 can interact with an underlying system, be it a search engine, voice mail system, etc.

Figure 21:
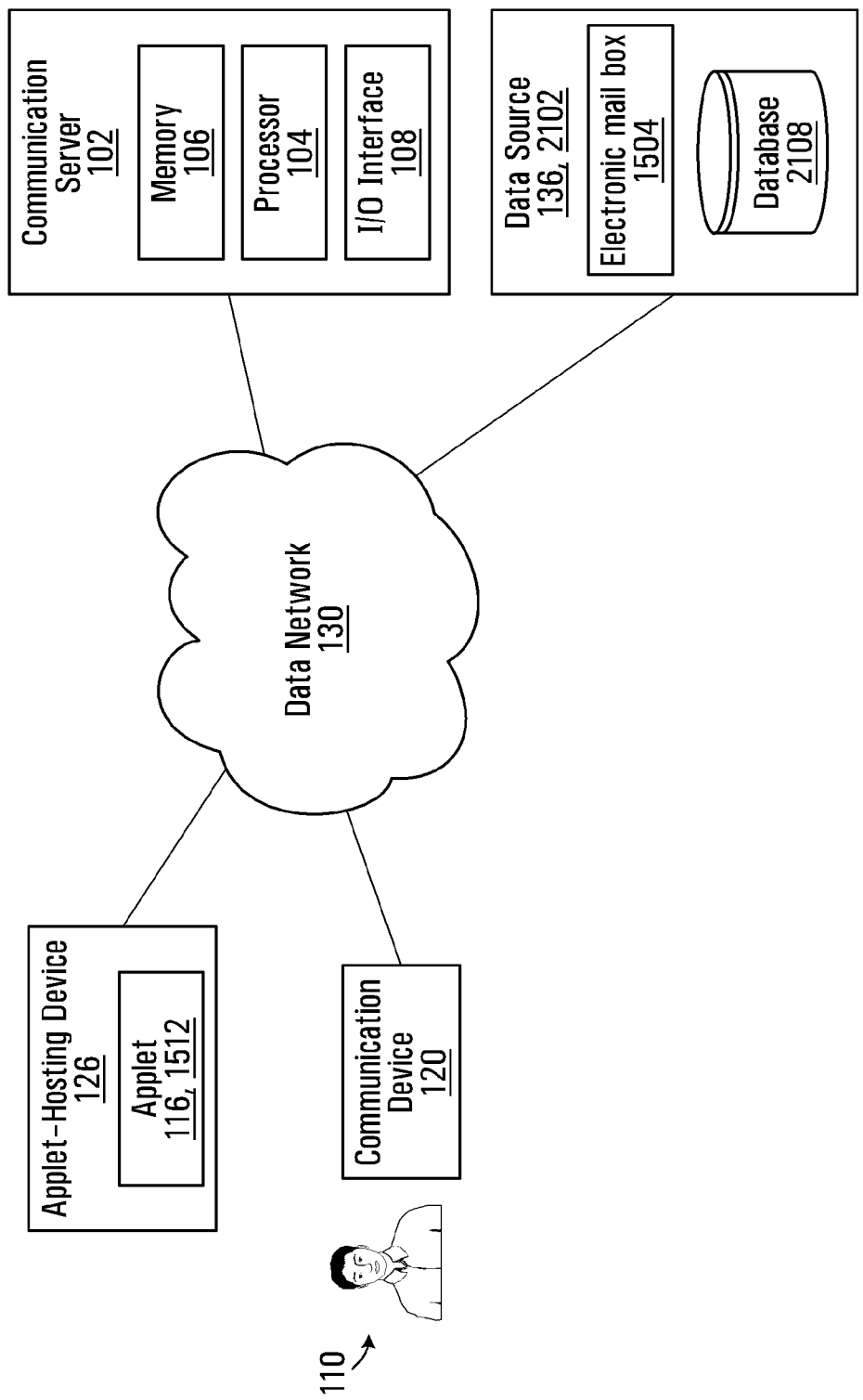
FIG. 21 illustrates a non-limiting embodiment where one of the data sources of the instant messaging architecture of FIG. 1 is an electronic mail system.

With reference to FIG. 21, let it be assumed for the purposes of the present non-limiting example that data source 136 is an electronic mail system 2102. For the purposes of the present example, user 110 is associated with a unique network identifier (e.g. an email address) that is reachable over a data network, which may include the data network 130. The electronic mail system 2102 comprises an electronic mailbox 2104 used for storing email messages sent to the aforesaid unique network identifier. Specifically, the electronic mailbox 2104 can store data associated with the electronic mail messages, such as the number of electronic mail messages, the number of unread electronic mail messages, whether there are any electronic mail messages at all, the date and time of receipt of individual electronic mail messages, the duration of individual electronic mail messages, the urgency of individual electronic mail messages, the source (e.g. originating address) of individual electronic mail messages, a preview pane of a portion of individual electronic mail messages, whether the originating address of an individual electronic mail message is present in an email contact list for user 110, etc. Various software interfaces can be used to allow user 110 to manage (e.g., read, sort, delete, forward, etc.) the email messages in the electronic mailbox 2104.

In addition, the electronic mail system 2102 comprises a database 2108 that stores authentication credentials for user 110 and other users of the electronic mail system 2102. The authentication credentials can be used to impose or lift access restrictions to the electronic mailbox 2104. For example, when a querying party 2112 provides the correct identifier (e.g. a electronic mailbox number) and password to the electronic mail system 2102, the querying party 2112 is given access to the electronic mail messages in the electronic mailbox 2104 as well as the data associated therewith. The querying party 2112 may access the electronic mailbox 2104 in a variety of ways, which may involve the use of various server-to-server protocols and/or communication with the electronic mail system 2102 using email and/or instant messaging. Where the querying party 2112 is a machine rather than a person, then the querying party 2112 may also access the electronic mailbox 2104 in a variety of ways, which may include—but is not limited to—communicating with the electronic mail system 2102 using protocols such as IP and SOAP, for example.

It is noted that the querying party 2112 may be user 110 but may also be an entity other than user 110. In the example to be presented below, the querying party 2112 is applet 116, which is assumed to be an electronic mail applet.

Figure 25:
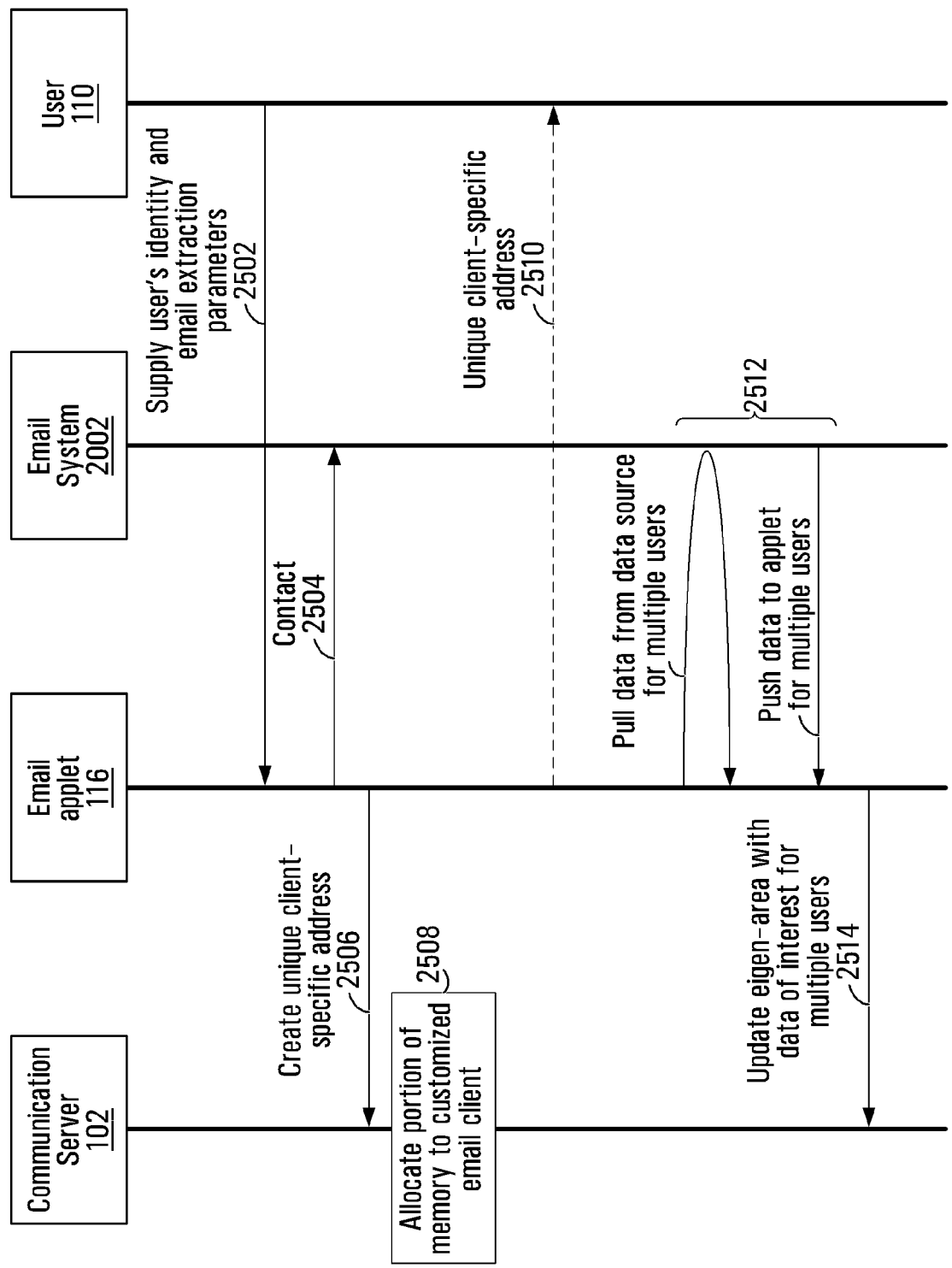
FIG. 25 is a message flow diagram illustrating interaction between various components of the instant messaging architecture of FIG. 1, in connection with the non-limiting embodiment considered in FIG. 21 and in a variant.

With reference to FIG. 25, Scenario III begins at step 2502 by user 110 enrolling with the electronic mail applet 116 to configure the data service for user 110. In particular, user 110 can contact the electronic mail applet 116 by employing communication device 120 but may also enroll in a number of different ways, such as by interaction with a web portal, a customer service representative, an interactive voice response system, etc., and/or by the transmission of email messages or other messages, and using a variety of different devices. During enrolment, user 110 provides an identity of user 110, which can be in the form of the client-specific address associated with user 110 (which, in the example being used herein, is "User-110@IMservice.com"), a name, a telephone number, an IP address, an alias, a social security number, etc.

In addition, during step 2502, user 110 supplies electronic mail extraction parameters to the electronic mail applet 116. The electronic mail extraction parameters may include the aforesaid authentication credentials (e.g. identifier and password), which can be used to access the electronic mailbox 2104. The electronic mail extraction parameters may optionally also include a telephone number of the electronic mail system 2102 or other information (e.g., IP address) that will allow the electronic mail applet 116 to contact the electronic mail system 2102 at the next step (step 2504). The electronic mail extraction parameters may further include an indication of "email data" for user 110, i.e., an indication as to what information user 110 is interested in knowing about the electronic mail messages in the electronic mailbox 2104. Examples of email data for user 110 include the number of electronic mail messages, the number of new electronic mail messages, whether there are any new electronic mail messages at all (which is a binary value), the date and time of receipt of individual electronic mail messages, the duration of individual electronic mail messages, the urgency of individual electronic mail messages, the source (e.g., originating party telephone number) of individual electronic mail messages, a preview (e.g., speech-to-text) of a portion of individual electronic mail messages, a contextual analysis of individual electronic mail messages, etc. To this end, and depending on how user 110 entered into contact with the electronic mail applet 116, the electronic mail applet 116 may implement a graphical user interface or interactive voice response (IVR) system which guides user 110 through a customization procedure for providing the aforesaid indication of email data for user 110.

At step 2504, the electronic mail applet 116 contacts the electronic mail system 2102 to configure the data service for user 110. In some embodiments, the electronic mail applet 116 knows by default how to contact the electronic mail system 2102. In other embodiments, information on how to contact the electronic mail system 2102 may have been provided by user 110 as a subset of the electronic mail extraction parameters. As part of step 2504, a handshake procedure may take place, whereby the electronic mail applet 116 and the electronic mail system 2102 agree on how the email data for user 110 will be sent from the electronic mail system 2102 to the electronic mail applet 116.

In some embodiments, the email data for user 110 will be pushed by the electronic mail system 2102 on an occasional, continuous, synchronous or asynchronous basis, in which case the electronic mail applet 116 can provide the electronic mail system 2102 with (i) the authentication credentials for user 110 in order to prove to the electronic mail system 2102 that the electronic mail applet 116 can be trusted; and (ii) an address of applet-hosting device 126 in order to indicate to the electronic mail system 2102 where to send the email data for user 110. Alternatively, in a trusted environment, the authentication credentials for user 110 can be omitted and instead, the electronic mail applet 116 can simply provide the identity of user 110 to the electronic mail system 2102, whereas the address of applet-hosting device 126 will be implicit in the communication between the electronic mail applet 116 and the electronic mail system 2102. The identity of user 110 can then be used by the electronic mail system 2102 to uniquely identify the electronic mailbox 2104.

In other embodiments, the email data for user 110 will be pulled by the electronic mail applet 116 from the electronic mail system 2102 on an occasional, continuous, synchronous or asynchronous basis, in which case the electronic mail applet 116 does not need to provide any information to the electronic mail system 2102 at step 2504. Rather, the electronic mail applet 116 will provide the authentication credentials to the electronic mail system 2102 on an as-needed basis, in order to access the email data for user 110. In a trusted environment, the electronic mail applet 116 would not even need to provide the authentication credentials to the electronic mail system 2102 when accessing the email data for user 110.

At step 2506, the electronic mail applet 116 is registered (either autonomously or with the aid of a person) as a client of the instant messaging service. This is done by contacting the communication server 102 (in this case, www.IMservice.com) and creating a client-specific address associated with the electronic mail applet 116 that is unique to user 110. By way of specific non-limiting example, a suitable client-specific address associated with the electronic mail applet 116 that is unique to user 110 could be AlertIM-EMAIL-User-110@IMservice.com. It will be noted that this address is associated both with the nature of the data service (i.e., electronic mail, or "email") and with a specific client of the instant messaging service (in this case, user 110). The unique client-specific address created at step 2506 effectively spawns a new client of the instant messaging service, hereinafter referred to as a "customized email client" of the instant messaging service.

Of course, the preceding unique client-preceding specific address associated with the electronic mail applet 116 and user 110 has been used as an example only, and for the sole purpose of enhancing readability; it should thus be appreciated that in actuality, the unique client-specific address associated with the electronic mail applet 116 and user 110, but which need not be visible to user 110, could be different, non-standard and/or less meaningful to interpretation by a human being. Also, the unique client-specific address associated with a the electronic mail applet 116 and a given user could be created by electronic mail applet 116 or the given user.

Figure 22A:
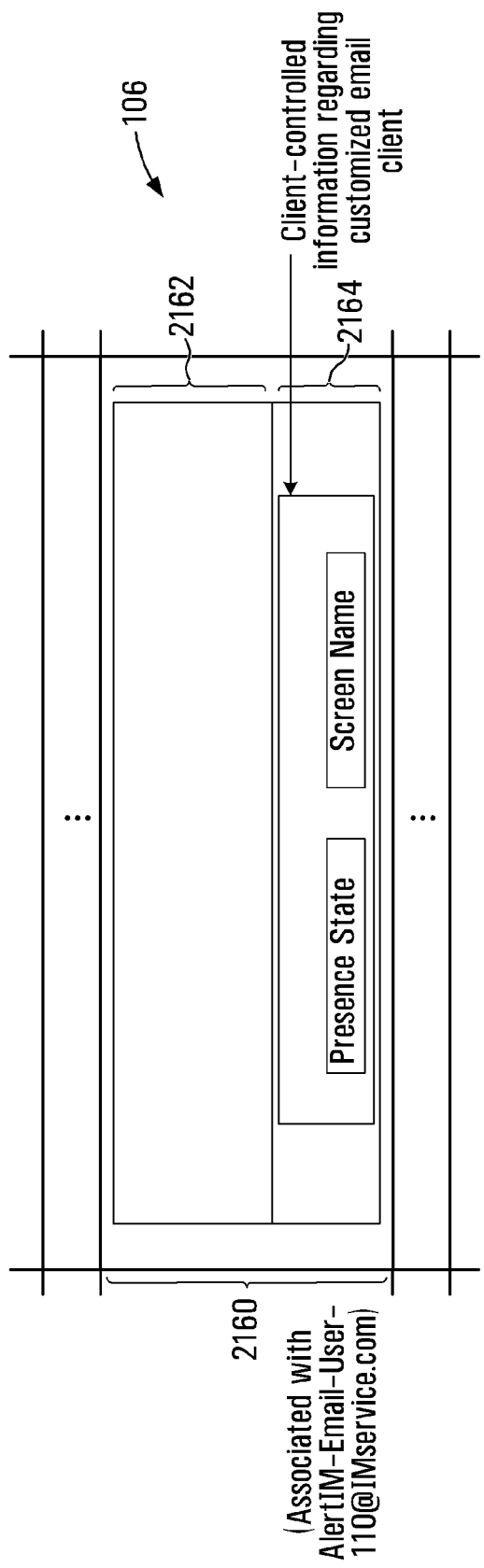
FIG. 22A illustrates an example of potential contents of a memory area of the memory of the communication server of FIG. 1, in connection with the non-limiting embodiment of FIG. 21.

At step 2508, in response to creation of the client-specific address associated with the customized email client of the instant messaging service, the messaging application executed by the processor 104 in the communication server 102 allocates a portion of the memory 106 to the customized email client. For example, with reference to FIG. 22A, the messaging application executed by the processor 104 in the communication server 102 allocates a memory area 2260 to the customized email client. It will be observed that the memory area 2260 comprises a contact list 2262 for the customized email client. Initially, the contact list 2262 can be empty, i.e., it does not include the client-specific addresses of any other clients of the instant messaging service (that is, the customized email client has no "buddies"). The memory area 2260 further comprises an eigen-area 2264 containing client-controlled information regarding the customized email client, which the communication server 102 will make available to user 110 if that user's contact list ultimately includes the customized email client.

The client-controlled information regarding the customized email client (which is stored in eigen-area 2264) represents information that the customized email client wishes to convey to user 110. The client-controlled information stored in eigen-area 2264 may include a presence state and/or a screen name. The presence state could be used to specify an attentiveness of the customized email client to receiving instant messages, while the screen name could be used to specify an identifier that the customized email client wishes to use to identify itself during a conversation. However, in accordance with non-limiting embodiments of the present invention, either or both of the presence state and/or the screen name (and/or possibly other portions of the client-controlled information stored in eigen-area 2264) is used to convey the aforesaid email data for user 110.

Accordingly, and returning to FIG. 25 at step 2512, the electronic mail applet 116 is configured to obtain the email data for user 110 from the electronic mail system 2102. Moreover, this operation can be performed for other users (e.g., users 112, 114) in order to obtain the respective email data for those users as well. In order for the electronic mail applet 116 to obtain the email data for user 110 from the electronic mail system 2102, the electronic mail applet 116 may occasionally, continuously, synchronously or asynchronously pull the email data for user 110 from the electronic mail system 2102; alternatively, the electronic mail system 2102 may be configured to occasionally, continuously, synchronously or asynchronously push the email data for user 110 to the electronic mail applet 116.

Assume now that the email data for user 110 is "4 messages, 1 new", which indicates that there are four (4) electronic mail messages in the electronic mailbox 2104, of which one (1) is new. At step 2514, the electronic mail applet 116 is configured to update eigen-area 2264 for the customized email client with the email data for user 110.

Figure 22B:
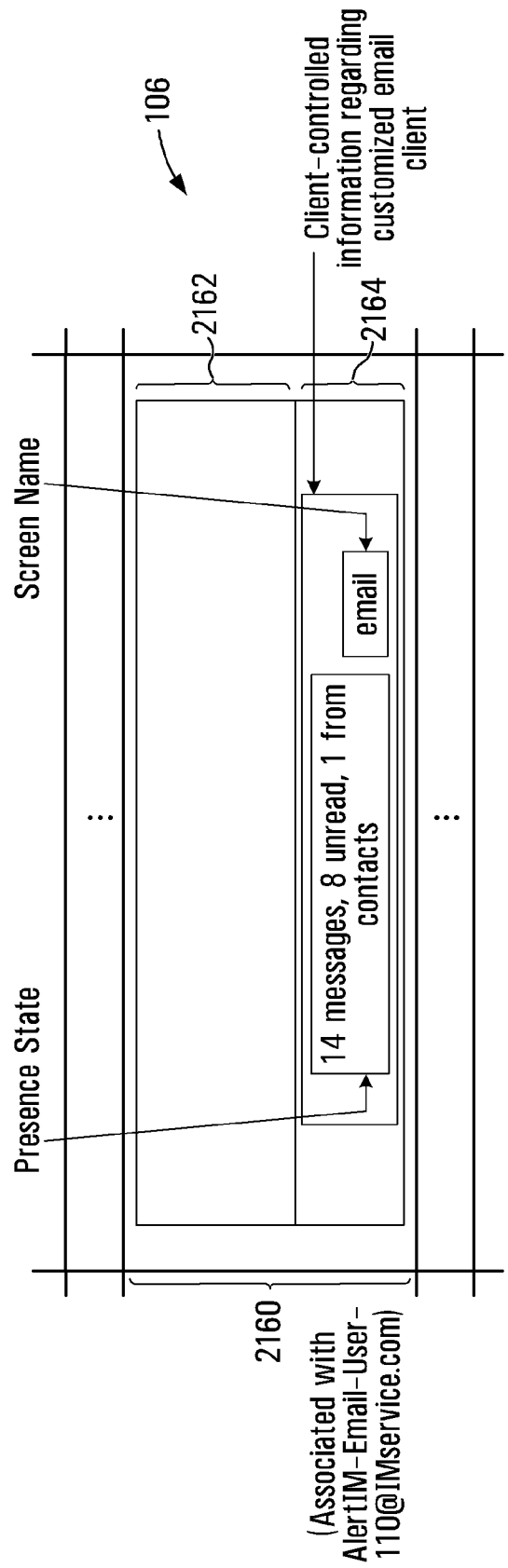
FIG. 22B illustrates an example of potential updated contents of the memory area of FIG. 22A.

Specifically, and with reference to FIG. 22B, the customized email client can update the client-controlled information in eigen-area 2264 by modifying the presence state to reflect the email data for user 110 (which, in the present example, is "4 messages, 1 new"). In addition, or alternatively, the customized email client can update the client-controlled information in eigen-area 2264 by causing the presence state to reflect data that can be easily expressed using simple icons, such as whether there are any electronic mail messages at all and/or whether there are any new electronic mail messages. This can also be achieved by causing the presence state to indicate "online" when there is at least one new electronic mail message and "offline" otherwise. Of course, in an alternative embodiment, the customized email client could have updated the client-controlled information in eigen-area 2264 by also (or instead) modifying the screen name and/or possibly other portions of the client-controlled information stored in eigen-area 2264 to reflect the email data for user 110. In summary, the email data is stored in eigen-area 2264 as text data or other data (such as data that encodes one or more graphical icons).

Figure 22C:
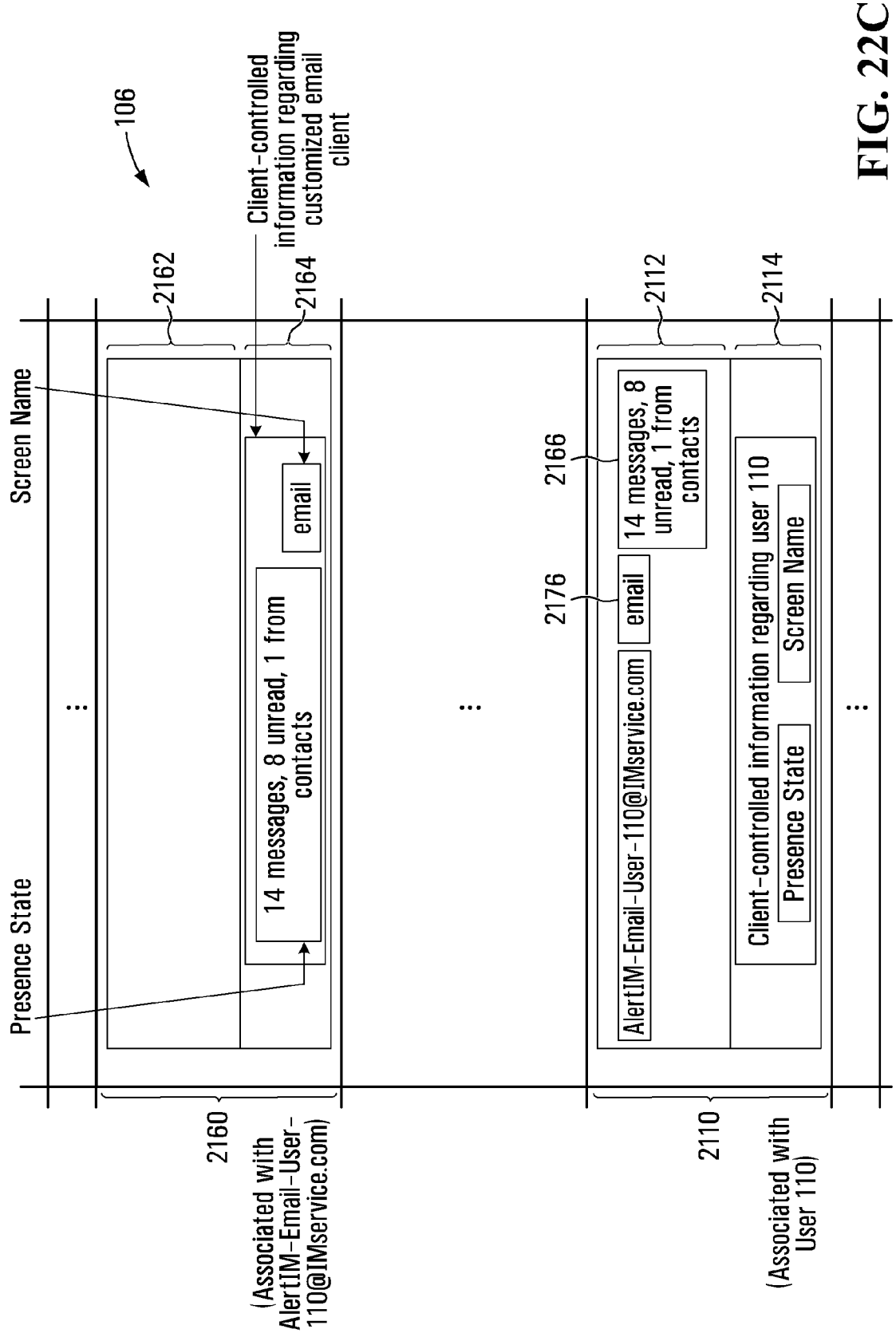
FIG. 22C illustrates a further example of potential contents of a memory area of the memory of the communication server of FIG. 1, in connection with the non-limiting embodiment of FIG. 21.

Interaction between a given one the communication devices 120, 122, 124 and the communication server 102 under Scenario III is now described. For the sake of simplicity, let the given communication device be communication device 120 which is associated with user 110, and let it be assumed that user 110 is a client of the instant messaging service. That is to say, user 110 has a client-specific address, say, "User-110@IMservice.com". In addition, a portion of the memory 106 is allocated to user 110. For example, with reference to FIG. 22C, the messaging application executed by the processor 104 in the communication server 102 allocates a memory area 2210 to user 110.

It will be observed that memory area 2210 comprises a contact list 2212 for user 110. Initially, the contact list 2212 can be empty, i.e., it does not include the client-specific addresses of any other clients of the instant messaging service (that is, user 110 has no "buddies"). Over time, user 110 may add/remove various buddies to/from the contact list 2212 by control of the messaging application executed by the processor 104 in the communication server 102. The memory area 2210 further comprises an eigen-area 2214 containing client-controlled information regarding user 110, which the communication server 102 will make available to other clients of the instant messaging service (such as, potentially, users 112, 114 and the customized email client) if their contact lists ultimately include user 110.

Figure 26:
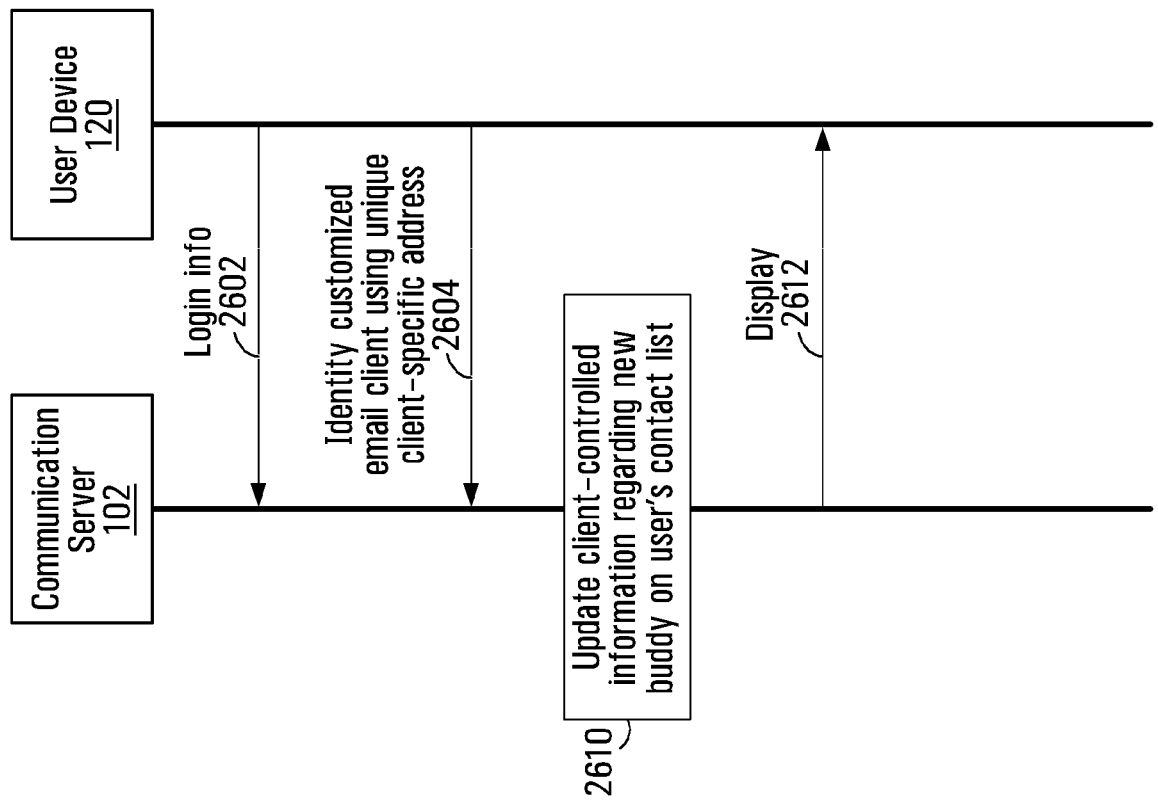
FIG. 26 is a message flow diagram illustrating further interaction between various components of the instant messaging architecture of FIG. 1, in connection with the non-limiting embodiment considered in FIG. 21 and the variant considered in FIG. 25.

With reference now to the message flow diagram in FIG. 26, user 110 uses communication device 120 to log in to (i.e., thereby instantiating a client of) the instant messaging service at step 2602. This can be achieved by providing identification and authentication credentials such as a username and a password, for example.

At step 2604, user 110 identifies the customized email client by entering the unique client-specific address associated with the customized email client. In the example being presently described, user 110 may enter AlertIM-EMAIL-User-110@IMservice.com. In certain embodiments, user 110 identifies the customized email client using a directory service offered by the communication server 102, while in other embodiments, user 110 may directly type in the unique client-specific address associated with the customized email client.

Alternatively, since user 110 has previously enrolled with the electronic mail applet 6, the customized email client may send a request for acceptance to user 110, such that when user 110 logs in as a client of the instant messaging service, user 110 is prompted to accept or decline the request for acceptance. If user 110 accepts, then the customized email client will be added to the contact list 2212 of user 110.

Either way, this results in the unique client-specific address associated with the customized email client being added to the contact list 2212, leaving fields 2266, 2276 in the contact list 2212 for storing the client-controlled information regarding the customized email client. In the present example, not to be considered limiting, fields 2266, 2276 are used to store the presence state and screen name, respectively, of the client having the unique client-specific address AlertIM-EMAIL-User-110@IMservice.com.

As an aside, it should be appreciated that an optional step (2510) could have been performed in FIG. 25, whereby the unique client-specific address created at step 2504 can be revealed to user 110 in order to inform him or her of the unique client-specific address associated with the customized email client. It should be appreciated that step 2510 is optional, since the clients of the instant messaging service can gain awareness of the unique client-specific address associated with the customized email client in other ways, such as through other communication devices and other methods of communication, including, without limitation: interaction with a customer service representative, interaction with an automated voice response system, interaction with a web portal, receipt of an email, text message or instant message containing the unique client-specific address, etc. It should further be appreciated that the clients of the instant messaging service may employ a directory service (e.g. operated by the communication server 102) and, as such, not need be explicitly aware of the unique client-specific address associated with the customized email client.

Returning now to FIGS. 26 and 22C, having determined that the client-controlled information regarding the new buddy (i.e., the customized email client) has been updated in eigen-area 2264, the messaging application executed by the processor 104 in the communication server 102 updates the client-controlled information regarding the new buddy on the contact list 2212 for user 110.

Specifically, the client-controlled information regarding the customized email client is obtained from eigen-area 2264 which, as previously described, conveys email data. In one embodiment, the messaging application executed by the processor 104 in the communication server 102 copies the presence state and screen name from eigen-area 2264 into fields 2266, 2276 of the contact list 2212. In another embodiment where fields 2266, 2276 contain pointers to, respectively, the presence state and screen name in eigen-area 2264, the client-controlled information regarding the customized email client will be instantly updated without the need for data transfer.

At this point, the client-controlled information regarding the customized email client (which, it is recalled, comprises the email data for user 110) is ready for observation by user 110. Accordingly, at step 2612, which can be inherent in step 2610 or a separate step altogether, the client-controlled information regarding the customized email client can be conveyed to user 110 in a visual format.

In a specific non-limiting example, and with reference to FIG. 20, the client-controlled information regarding the customized email client can be displayed on the aforesaid screen of communication device 120 in the form of text, graphics and/or an icon. In this example, "email" and "14 messages, 8 unread, 1 from contacts" are, respectively, the screen name and presence state of the client-controlled information regarding the customized email client, which provides a feature of electronic mail messages in electronic mailbox 2104.

Persons skilled in the art will therefore appreciate that the above described embodiments allow the persistent conveyance of client-controlled information regarding the customized email client to user 110, in a non-intrusive manner and without interrupting user 110. Specifically, user 110 can monitor the number of new or total messages in the electronic mailbox 2104 and/or their content and/or their status on an ongoing basis—and at times of his or her own choosing. Moreover, user 110 is not compelled to remember this information since user 110 can refresh his or her knowledge merely by glancing at the contact list 2212.

Meanwhile, it will be recalled from step 2512 in FIG. 25, the electronic mail applet 116 continues to obtain the email data for user 110 from the electronic mail system Thus, the client-controlled information regarding the customized email client will continue to be updated in eigen-area 2264 as the electronic mail applet 116 continues to execute, which ensures currency of the information being persistently conveyed to, and observed by, user 110.

Moreover, it should be appreciated that the client-controlled information regarding a given customized client can include passive data, which can be intended merely for observation by user 110, as well as active data, which can allow user 110 to perform an action on the active data, triggering an interaction with the given customized client and allowing user 110 to retrieve further information related to the active data. For example, where the client-controlled information regarding the given customized client is email data for user 110, the "further information" can be the actual contents of one or more email messages.

The aforesaid interaction between user 110 and the given customized client may be triggered by user 110 sending an electronic message (e.g., an instant message) to the given customized client, which can serve as a request for the further information. Alternatively, the given customized client can send an electronic message (e.g., an instant message) to user 110 containing an actionable URL, which can lead user 110 to a web portal where user 110 may interact further with the applet that supports the given customized client.

Also, it should be appreciated that the client-controlled information regarding a given customized client can be dynamically updated based on the aforesaid interaction between user 110 and the given customized client. For example, the given customized client can track which client-controlled information regarding the given customized client has been observed by user 110. This can be achieved by tracking which further information has been retrieved by user 110 pursuant to an interaction with the given customized client. Alternatively, this can be achieved by monitoring cookies within communication device 120, or in a variety of other ways. With the knowledge of what information user 110 has actually observed, the given customized client can accordingly update the client-controlled information regarding the given customized client.

For example, where the user-specific client-controlled information regarding the customized electronic mail client is an indication that there are three unread email messages #1, #2 and #3, and where user 110 has retrieved further information (e.g., has just read to) email message #1, the customized electronic mail client can gain knowledge of this fact in one of the aforesaid ways. The result is that the client-controlled information regarding the customized electronic mail client will now be an indication that there are only two unread email messages (i.e., #2 and #3). An indication of email message #1 can be displayed differently, or can simply be classified as an email message that is "read", thereby assisting user 110 in navigating through the electronic mailbox 2104.

Persons skilled in the art will appreciate that it may be beneficial to ensure that a given user who wishes to benefit from a particular private data service falling under Scenario III be authorized to do so. For example, it is within the scope of the present invention to require that the given user pay for the data service on a per-use basis, on a per-customized client basis or in accordance with any suitable subscription scheme. It is also within the scope of the present invention to require that the given user enroll with the applet-hosting device that hosts the applet that provides the particular data service. Thus, an authorization step may be included at some point during Scenario III. Reference is made to the above description of FIGS. 4A through 4F, which also apply to Scenario III, with the exception that the enrollment steps in FIGS. 4A and 4B can be considered redundant, since user 110 is assumed to have enrolled with the electronic mail applet 116.

Figure 23A:
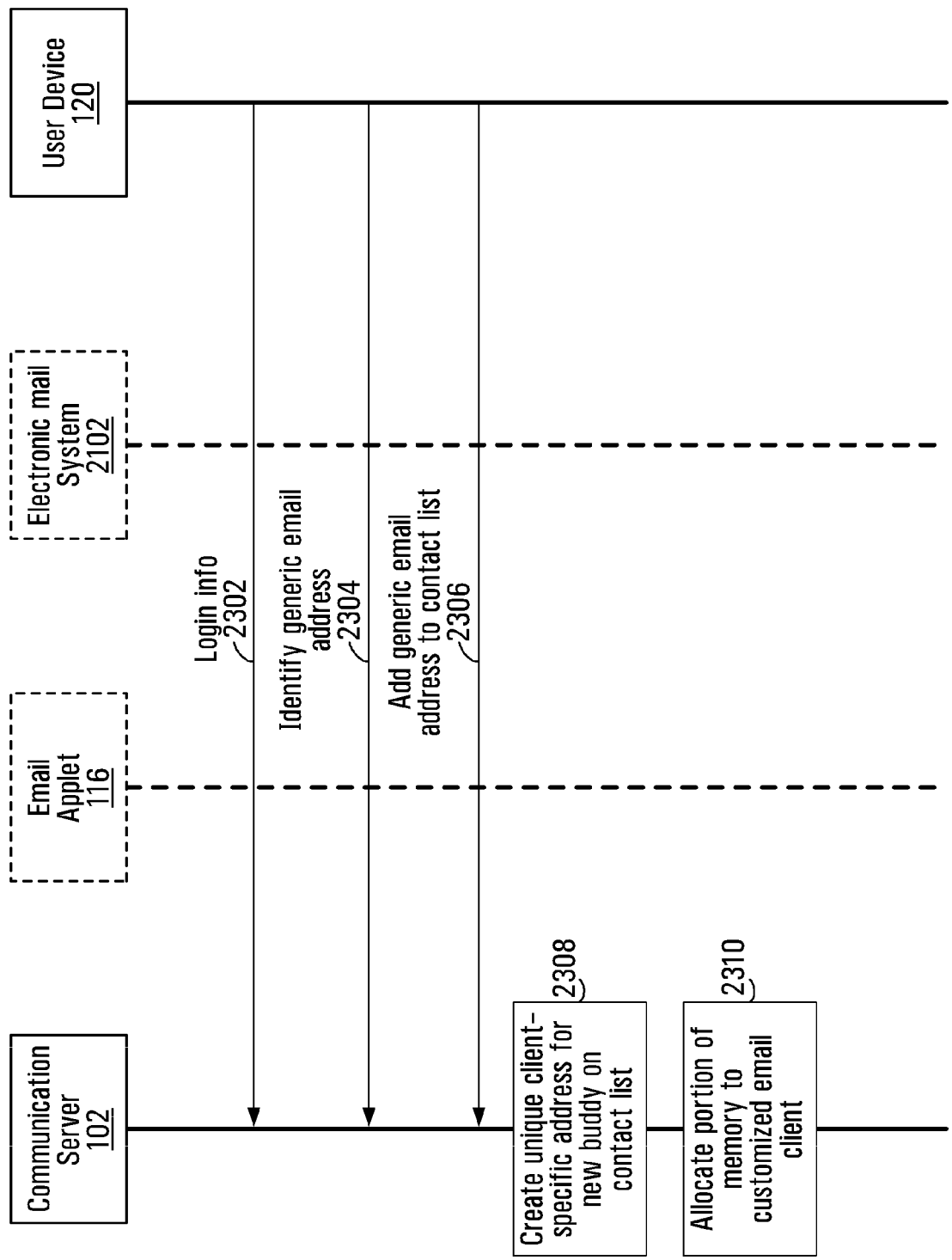
FIG. 23A is a message flow diagram illustrating interaction between various components of the instant messaging architecture of FIG. 1, in connection with the non-limiting embodiment considered in FIG. 21.

Variant of Scenario III (FIGS. 23A, 23B and 24)

A variant of Scenario III is now described, wherein a generic client-specific address is used to identify an email data service for user 110. Accordingly, reference is made to FIG. 23A, where user 110 logs in to the instant messaging service at step 2302. This can be achieved by providing identification and authentication credentials such as a username and a password, for example. At step 2304, user 110 enters a generic client-specific address associated with the email data service (hereinafter referred to as a "generic email address"), such as "AlertIM-EMAIL@IMservice.com". In some embodiments, user 110 obtains knowledge of the generic email address through media advertising, interaction with a customer service representative, interaction with an automated voice response system, interaction with a web portal, receipt of an email, text message or instant message containing the generic email address, etc. In other embodiments, user 110 obtains the generic email address by invoking a directory service offered by the communication server 102.

Alternatively, since user 110 has previously enrolled with the electronic mail applet 116, the customized email client may send a request for acceptance to user 110, such that when user 110 logs in as a client of the instant messaging service, user 110 is prompted to accept or decline the request for acceptance. Referring now to FIG. 24, if user 110 accepts, then the customized email client will be added to a contact list 2412 of user 110.

Either way, his results in the generic email address being added to the contact list 2412, and leaving at least one corresponding field to be filled with the client-controlled information regarding the customized client in question. In the present example, not to be considered limiting, fields 2466, 2476 are used to store the presence state and screen name, respectively, of the customized client having the generic client-specific address AlertIM-EMAIL@IMservice.com.

At step 2308, the messaging application executed by the processor 104 in the communication server 102 determines that the contact list 2412 includes a new buddy, which has been identified by the generic email address. In response, the messaging application executed by the processor 104 in the communication server 102 creates a client-specific address associated with the electronic mail applet 116 and unique to user 110. By way of specific non-limiting example, a suitable client-specific address associated with the electronic mail applet 116 and unique to user 110 could be AlertIM-EMAIL-User-110@IMservice.com. Thus, the unique client-specific address created at step 2308 effectively spawns a new client of the instant messaging service, which amounts to the aforementioned "customized email client" of the instant messaging service.

Of course, the preceding unique client-preceding specific address associated with the electronic mail applet 116 and user 110 has been used as an example only, and for the sole purpose of enhancing readability; it should thus be appreciated that in actuality, the unique client-specific address associated with the electronic mail applet 116 and user 110, but which need not be visible to user 110, could be different, non-standard and/or less meaningful to interpretation by a human being. Also, the unique client-specific address associated with the electronic mail applet 116 and a given user could be created by electronic mail applet 116 or the given user.

At step 2310, in response to creation of the unique client-specific address associated with the customized email client of the instant messaging service, the messaging application executed by the processor 104 in the communication server 102 allocates a portion of the memory 106 to the customized email client. For example, with reference again to FIG. 24, the messaging application executed by the processor 104 in the communication server 102 allocates a memory area 2460 to the customized email client. It will be observed that the memory area 2460 comprises a contact list 2462 for the customized email client. Initially, the contact list 2462 can be empty, i.e., it does not include the client-specific addresses of any other clients of the instant messaging service (that is, the customized email client has no "buddies"). The memory area 2460 further comprises an eigen-area 2464 containing client-controlled information regarding the customized email client.

The client-controlled information regarding the customized email client (which is stored in eigen-area 2464) represents information that the customized email client wishes to convey to user 110. The client-controlled information stored in eigen-area 2464 may include a presence state and/or a screen name. The presence state could be used to specify an attentiveness of the customized email client to receiving instant messages, while the screen name could be used to specify an identifier that the customized email client wishes to use to identify itself during a conversation. However, in accordance with non-limiting embodiments of the present invention, either or both of the presence state and/or the screen name (and/or possibly other portions of the client-controlled information stored in eigen-area 2464) is used to convey the aforesaid email data for user 110.

Accordingly, and referring now to FIG. 23B, at step 2312, the messaging application executed by the processor 104 in the communication server 102 contacts the electronic mail applet 116 and supplies the electronic mail applet 116 with the identity of user 110, which was received at step 2302. At step 2314, the electronic mail applet 116 in turn contacts the electronic mail system 2102 to configure the data service for user 110. It is within the scope of the present invention for the electronic mail applet 116 to know by default how to contact the electronic mail system 2102. As part of step 2314, a handshake procedure may take place, whereby the electronic mail applet 116 and the electronic mail system 2102 agree on how email data for user 110 will be sent from the electronic mail system 2102 to the customized email client. This has previously been described with reference to step 2504.

At step 2316, the electronic mail applet 116 is configured to obtain the email data for user 110 from the electronic mail system 2102. In order for the electronic mail applet 116 to obtain the email data for user 110 from the electronic mail system 2102, the customized email client may occasionally, continuously, synchronously or asynchronously pull the email data for user 110 from the electronic mail system 2102; alternatively, the electronic mail system 2102 may be configured to occasionally, continuously, synchronously or asynchronously push the email data for user 110 to the electronic mail applet 116.

Assume now that the email data for user 110 is "4 messages, 1 new", which indicates that there are four (4) electronic mail messages in the electronic mailbox 2104, of which one (1) is new. At step 2318, the electronic mail applet 116 is configured to update eigen-area 2464 for the customized email client with the email data for user 110.

Specifically, and with reference again to FIG. 24, the customized email client updates the client-controlled information in eigen-area 2464 by modifying the presence state to reflect the email data for user 110 (which, in the present example, is "4 messages, 1 new"). In addition, or alternatively, the customized email client can update the client-controlled information in eigen-area 2464 by causing the presence state to reflect data that can be easily expressed using simple icons, such as whether there are any electronic mail messages at all and/or whether there are any new electronic mail messages. This can also be achieved by causing the presence state to indicate "online" when there is at least one new electronic mail message and "offline" otherwise. Of course, in an alternative embodiment, the customized email client could have updated the client-controlled information in eigen-area 2464 by also (or instead) modifying the screen name and/or possibly other portions of the client-controlled information stored in eigen-area 2464 to reflect the email data for user 110. In summary, the email data is stored in eigen-area 2464 as text data or other data (such as data that encodes one or more graphical icons).

At step 2320, having determined that the client-controlled information regarding the new buddy (i.e., the customized email client) has been updated in eigen-area 2464, the messaging application executed by the processor 104 in the communication server 102 updates the client-controlled information regarding the new buddy on the contact list 2412 for user 110.

Specifically, the client-controlled information regarding the customized email client is obtained from eigen-area 2464 which, as previously described, conveys email data. In one embodiment, the messaging application executed by the processor 104 in the communication server 102 copies the presence state and screen name from eigen-area 2464 into fields 2466, 2476 of the contact list 2212. In another embodiment where fields 2466, 2476 contain pointers to, respectively, the presence state and screen name in eigen-area 2464, the client-controlled information regarding the customized email client will be instantly updated without the need for data transfer.

At this point, the client-controlled information regarding the customized email client (which, it is recalled, comprises the email data) is ready for observation by user 110. Accordingly, at step 2320, which can be inherent in step 2318 or a separate step altogether, the client-controlled information regarding the customized email client can be conveyed to user 110 in a visual format.

Persons skilled in the art will therefore appreciate that the above described embodiments allow the persistent conveyance of client-controlled information regarding the customized email client to user 110, in a non-intrusive manner and without interrupting user 110. Specifically, user 110 can monitor the number of total or new messages in the electronic mailbox 2104 and/or their content and/or their status on an ongoing basis—and at times of his or her own choosing. Moreover, user 110 is not compelled to remember this information since user 110 can refresh his or her knowledge merely by glancing at the contact list 2412.

Meanwhile, it will be recalled from step 2316, the electronic mail applet 116 continues to obtain the email data for user 110 from the electronic mail system 2102. Thus, the client-controlled information regarding the customized email client will continue to be updated in eigen-area 2464 as the electronic mail applet 116 continues to execute, which ensures currency of the information being persistently conveyed to, and observed by, user 110.

Thus, it will be appreciated that the present invention is applicable to instances where a given user wishes to keep track of a certain amount of information regarding a data service on an ongoing basis (even when the information regarding a data service does not change), and without being interrupted when the information regarding a data service does change.

Moreover, it should be appreciated that the information regarding a data service can include passive data, which is akin to a status update, and active data, which allows the given user to take further action. For example, the information regarding a data service in any of the above scenarios may comprise a uniform resource locator (URL) that can be actionable by user 110 and, when actioned, leads user 110 to a portal where user 110 can interact with an underlying system, be it a search engine, electronic mail system, etc.

Moreover, it should be appreciated that the present invention is also applicable to the use and configuration of applets that serve as unified gateways to a plurality of data services, which can be generic, customized, private or a combination thereof. For example, applet 116 or applet 118 can serve as a unified voice mail applet that accesses a plurality of voice mail boxes maintained by one or more voice mail systems similar to voice mail system 1502. Similarly, applet 116 or applet 118 can serve as a unified electronic mail applet that accesses a plurality of electronic mailboxes maintained by one or more electronic mail systems similar to electronic mail system 2102. Also, applet 116 or applet 118 can serve as a unified voice mail/email applet for user 110 by having access to both voice mail box 1504 and electronic mailbox 2104. Accordingly, the unified voice mail/email applet may amalgamate the information available from the voice mail system 1502 and the electronic mail system 2102.

In a manner similar to what has previously been described, a unique client-specific address is created for the unified voice mail/email applet, resulting in the creation of what is hereinafter referred to as a "unified communication client" of the instant messaging service for user 110. In particular, the unified communication client stores client-controlled information regarding the unified communication client. The client-controlled information regarding the unified communication client represents information that the unified communication client renders available for conveyance to user 110. The client-controlled information stored may include a presence state and/or a screen name. The presence state could be used to specify an attentiveness of the unified communication client to receiving instant messages, while the screen name could be used to specify an identifier that the unified communication client wishes to use to identify itself during a conversation. However, in accordance with non-limiting embodiments of the present invention, either or both of the presence state and/or the screen name (and/or possibly other portions of the client-controlled information) is used to convey voice mail data and email data for user 110.

In a specific non-limiting example, and with reference to FIG. 20, the client-controlled information regarding the unified communication client can be displayed on the aforesaid screen of communication device 120 in the form of text, graphics and/or an icon. In this example, "unified communication" and "(email: 3 new messages)(work voice mail: 10 messages, 0 new)(home voice mail: 3 new messages)" are, respectively, the screen name and presence state of the client-controlled information regarding the unified communication client.

It should also be reiterated that in a peer-to-peer embodiment, the various clients of the instant messaging service contact each other without assistance from the communication server 102. Thus, the communication server 102 can be entirely dispensed with, which would leave both the contact lists for the various clients and the eigen-areas for those clients to be stored in a distributed fashion, such as on the devices used by those clients. Thus, if a given client knows the addresses of other clients for whom the given client is a buddy, then in order to ensure that the information on the contact lists of those other clients is up-to-date, the given client can push the client-controlled information regarding the given client to those other clients directly. Alternatively, if a given client knows the addresses of his or her buddies, then to ensure that the information on the given client's contact list is up-to-date, the given client can obtain the client-controlled information regarding its buddies by polling them directly.

While specific embodiments of the present invention have been described and illustrated, it will be apparent to those skilled in the art that numerous modifications and variations can be made without departing from the scope of the invention as defined in the appended claims.

The invention claimed is:

1. A method, comprising:
   instantiating a first client of a messaging service, the first client providing a data service;
   maintaining in memory a contact list for a second client of the messaging service;
   receiving a request for the data service from the second client;
   as part of providing the data service, the first client retrieving data from at least one data source;
   including, in the contact list for the second client, client-controlled information regarding the first client including a screen name of the first client;
   the screen name of the first client being modified by the first client to include the retrieved data.

2. The method defined in claim 1, further comprising persistently conveying to the second client the contact list for the second client.

3. The method defined in claim 1, said messaging service having a distributed architecture.

4. The method defined in claim 3, said first and second clients being peers.

5. The method defined in claim 1, said messaging service having a server-centric architecture comprising a server.

6. The method defined in claim 5, said first and second clients communicating via said server.

7. The method defined in claim 1, wherein the first client is implemented by an applet.

8. The method defined in claim 1, wherein the retrieved data is publicly accessible.

9. The method defined in claim 1, wherein the retrieved data is customized to a user of the second client.

10. The method defined in claim 1, wherein the retrieved data is protected by credentials associated with a user of the second client.

11. The method defined in claim 10, further comprising supplying the credentials to the data source in order to obtain said retrieved data.

12. The method defined in claim 1, further comprising responding to a request from the second client to view further information related to the data service by rendering said further information available for conveyance to the second client.

13. The method defined in claim 12, further comprising modifying the client-controlled information included in the contact list as a function of observation by a user of the second client of said further information related to the data service.

14. The method defined in claim 1, wherein the data service comprises at least one of a share price reporting service, a weather reporting service, a sports reporting service, a web monitoring service, a general traffic reporting service, a news reporting service on specific topics, a movie listing service, a horoscope service, a lottery results service, a transportation schedule service, a product pricing service, an advertisement service, a stock portfolio reporting service customized for a user of the second client, a news reporting service customized for a user of the second client, a traffic reporting service customized for a user of the second client, a web search service customized for a user of the second client, a real estate service customized for a user of the second client, a dating service customized for a user of the second client, a job search service customized for a user of the second client, a shopping service customized for a user of the second client, a web monitoring customized for a user of the second client, a link to a voice mail system subscribed to by a user of the second client, a link to a financial institution subscribed to by a user of the second client, a link to a home security system subscribed to by a user of the second client, a link to an email system subscribed to by a user of the second client, a link to a vehicle management system subscribed to by a user of the second client, a link to a mapping system subscribed to by a user of the second client, comprises a link to a telephony presence feature subscribed to by a user of the second client, and a link to a text messaging system subscribed to by a user of the second client.

15. The method defined in claim 14, wherein the retrieved data comprises at least one of a share price of a given company, a weather report for a given city, the current score in a sporting event, an indication of a recent addition to a blog or website, an indication of the traffic conditions on certain roads or bridges, news regarding the specific topics, a schedule or price grid for movies being shown at a certain movie theatre, commentary about each zodiac sign, the result of recent prize draws, current information regarding at least one of trains, flights and public transit, movement in a price of a certain product available from one or more suppliers, an advertisement for a product or service, a share price of companies in a user-selected portfolio, headline news from news sources in a user-selected set of news sources or regarding user-specific topics, a current traffic synopsis for a user-selected travel route, a feature of an online search including at least one of current status, number of results and result relevancy score, an availability of a property meeting user-defined criteria, an availability of a person of interest matching a user-defined profile, an availability of a position matching user-defined criteria, an availability of an item or service meeting user-defined criteria including a price, an indication of the most recent addition to a user-selected set of blogs or websites, a feature of voice mail messages in a voice mail box of the user including at least one of message urgency, number of messages, number of new messages and content of messages, a feature regarding the user's account including at least one of a current balance and a transaction listing, a current status of at least one sensor in the user's home, a feature of email messages in an electronic mailbox of the user including at least one of message urgency, number of messages, number of unread messages, content of messages, a feature of at least one vehicle in a fleet including at least one of vehicle location and vehicle diagnostics, the location of at least one items associated with an account of the user, an indication of whether a given potential called party is engaged in a telephone conversation, and a feature of text messages in a text message mailbox of the user including at least one of message urgency, number of text messages, number of unread text messages, content of text messages.

16. The method defined, in claim 1, wherein the client-controlled information regarding the first client is conveyed to the second client without an instant message exchange between the first client and the second client.

17. The method defined in claim 12, said request being received via an instant message.

18. The method defined in claim 12, further comprising causing said further information to be conveyed to the second client via an instant message.

19. A system, comprising:
   an applet associated with a first client of a messaging service, the applet providing a data service, wherein as part of the data service, the applet retrieves data from at least one data source;
   a communication device associated with a second client of the messaging service, the second client configured to generate a request for the data service;
   the applet being configured to respond to said request by causing a screen name of the first client to be included in a contact list for the second client, the screen name of the first client including the retrieved data.

20. The system defined in claim 19, wherein the messaging service is configured to persistently convey to the communication device the contact list for the second client.

21. The system defined in claim 19, said messaging service having a distributed architecture.

22. The system defined in claim 21, said first and second clients being peers.

23. The system defined in claim 19, said messaging service having a server-centric architecture comprising a server.

24. The system defined in claim 23, said first and second clients communicating via said server.

25. The method defined in claim 17, further comprising causing said further information to be conveyed to the second client via an instant message.

26. A method for execution by a first client of a messaging service, comprising:
   receiving and storing a client-specific address associated with at least one authorized client;
   receiving a client-specific address associated with a second client of the messaging service;
   determining whether the client-specific address associated with the second client matches the client-specific address of at least one of the at least one authorized client;

obtaining data from a data source;
causing client-controlled information regarding the first client to be included in a contact list for the second client when a data service associated with the first client is requested by the second client and the client-specific address associated with the second client matches the client-specific address of at least one of the at least one authorized client; and
causing the client-controlled information regarding the first client to include said data obtained from the data source.

27. A method for execution by a first client of a messaging service, comprising:
receiving an indication of a desire of a second client of the messaging service to obtain data from a data source;
determining whether the second client is authorized to obtain said data;
causing client-controlled information regarding the first client to be included in a contact list for the second client when a data service associated with the first client is requested by the second client; and
causing the client-controlled information regarding the first client to include said data only if the second client is authorized to obtain said data.

28. The method defined in claim 27, wherein the client-controlled information regarding the first client includes a state of the first client, the state being an online state or an offline state in dependence upon said retrieved data.

29. The method defined in claim 27, wherein the client-controlled information regarding the first client includes a presence state of the first client, the presence state being modifiable to include said retrieved data.

30. The method defined in claim 27, wherein the client-controlled information regarding the first client includes a screen name of the first client that is modifiable to include said retrieved data.

31. The method defined in claim 27, wherein said determining comprises:
interacting with the second client to obtain authorization data therefrom;
determining whether the authorization data matches pre-stored authorization data.

32. The method defined in claim 31, wherein said interacting comprises an exchange of instant messages.

33. The method defined in claim 31, further comprising: initiating said interacting.

34. The method defined in claim 33, wherein said initiating is performed by sending an instant message to the second client.

35. A method for execution by a first client of a messaging service, comprising:
obtaining data from a data source;
causing client-controlled information regarding the first client to be included in a contact list for a second client of the messaging service when a data service associated with the first client is requested by the second client;
causing the client-controlled information regarding the first client to include said data obtained from the data source; and
creating a specific address associated with the first client, the specific address being unique to the second client.

36. The method defined in claim 35, further comprising: using the specific address to identify the first client to the messaging service.

37. The method defined in claim 35, further comprising: informing the second client of the specific address associated with the first client.

38. The method defined in claim 35, further comprising: receiving customized alert parameters from the second client.

39. The method defined in claim 38, wherein said creating a specific address is performed in response to said receiving customized alert parameters.

40. The method defined in claim 39, wherein the customized alert parameters specify the data to be obtained from the data source by said step of obtaining.

41. A method for execution by a first client of a messaging service, comprising:
obtaining data from a data source;
causing a screen name of the first client to be included in a contact list for a second client of the messaging service when a data service associated with the first client is requested by the second client;
causing the screen name of the first client to include said data obtained from the data source;
obtaining changes in the data from the data source;
modifying the screen name of the first client to include said changes in the data.

42. The method defined in claim 41, wherein the data is related to a data service and wherein the data service comprises at least one of a share price reporting service, a weather reporting service, a sports reporting service, a web monitoring service, a general traffic reporting service, a news reporting service on specific topics, a movie listing service, a horoscope service, a lottery results service, a transportation schedule service, a product pricing service, an advertisement service, a stock portfolio reporting service customized for a user of the second client, a news reporting service customized for a user of the second client, a traffic reporting service customized for a user of the second client, a web search service customized for a user of the second client, a real estate service customized for a user of the second client, a dating service customized for a user of the second client, a job search service customized for a user of the second client, a shopping service customized for a user of the second client, a web monitoring customized for a user of the second client, a link to a voice mail system subscribed to by a user of the second client, a link to a financial institution subscribed to by a user of the second client, a link to a home security system subscribed to by a user of the second client, a link to an email system subscribed to by a user of the second client, a link to a vehicle management system subscribed to by a user of the second client, a link to a mapping system subscribed to by a user of the second client, comprises a link to a telephony presence feature subscribed to by a user of the second client, and a link to a text messaging system subscribed to by a user of the second client.

43. The method defined in claim 42, wherein the data comprises at least one of a share price of a given company, a weather report for a given city, the current score in a sporting event, an indication of a recent addition to a blog or website, an indication of the traffic conditions on certain roads or bridges, news regarding the specific topics, a schedule or price grid for movies being shown at a certain movie theatre, commentary about each zodiac sign, the result of recent prize draws, current information regarding at least one of trains, flights and public transit, movement in a price of a certain product available from one or more suppliers, an advertisement for a product or service, a share price of companies in a user-selected portfolio, headline news from news sources in a user-selected set of news sources or regarding user-specific topics, a current traffic synopsis for a user-selected travel route, a feature of an online search including at least one of current status, number of results and result relevancy score, an availability of a property meeting user-defined criteria, an availability of a person of interest matching a user-defined profile, an availability of a position matching user-defined criteria, an availability of an item or service meeting user-defined criteria including a price, an indication of the most recent addition to a user-selected set of blogs or websites, a feature of voice mail messages in a voice mail box of the user including at least one of message urgency, number of messages, number of new messages and content of messages, a feature regarding the user's account including at least one of a current balance and a transaction listing, a current status of at least one sensor in the user's home, a feature of email messages in an electronic mailbox of the user including at least one of message urgency, number of messages, number of unread messages, content of messages, a feature of at least one vehicle in a fleet including at least one of vehicle location and vehicle diagnostics, the location of at least one items associated with an account of the user, an indication of whether a given potential called party is engaged in a telephone conversation, and a feature of text messages in a text message mailbox of the user including at least one of message urgency, number of text messages, number of unread text messages, content of text messages.

44. A communication server comprising a memory, the memory comprising:
   a first memory area having contents storing a screen name of a first client of a messaging service, the screen name of the first client including data retrieved from a data source as part of providing a data service;
   a second memory area comprising a contact list for a second client of the messaging service, wherein the contact list identifies the first client upon the second client requesting the data service;
   wherein the contact list in the second memory area includes the contents of the first memory area.

45. The communication server defined in claim 44, wherein the screen name of the first client is indicative of whether the data has or has not been previously conveyed to a user of the second client.

46. The communication server defined in claim 44, wherein the first client controls its screen name in dependence upon said data.

47. A method for execution by a computing apparatus associated with a first client of a messaging service, the method comprising displaying a contact list for the first client, the contact list for the first client including a screen name of a second client linked to the first client, the screen name of the second client comprising data retrieved by the second client as part of a data service provided by the second client and requested by the first client.

48. The method defined in claim 47, wherein the screen name of the second client further comprises an indication of the data service.

49. The method defined in claim 47, the retrieved data being persistently conveyed as graphics.

50. The method defined in claim 47, the retrieved data being persistently conveyed as text.

51. The method defined in claim 47, the retrieved data being persistently conveyed as a combination of text and graphics.

52. The method defined in claim 51, wherein said graphics comprise at least one icon associated a respective instance of the retrieved data.

53. The method defined in claim 47, further comprising computer-readable program code which, when executed by the computing apparatus associated with the first client of the messaging service, causes the computing apparatus to enable messaging with the second client via the contact list for the first client.

54. The method defined in claim 53, wherein said messaging with the second client occurs without an exchange of instant messages with the second client.

55. The method defined in claim 47, wherein the data service comprises at least one of a share price reporting service, a weather reporting service, a sports reporting service, a web monitoring service, a general traffic reporting service, a news reporting service on specific topics, a movie listing service, a horoscope service, a lottery results service, a transportation schedule service, a product pricing service, an advertisement service, a stock portfolio reporting service customized for a user of the second client, a news reporting service customized for a user of the second client, a traffic reporting service customized for a user of the second client, a web search service customized for a user of the second client, a real estate service customized for a user of the second client, a dating service customized for a user of the second client, a job search service customized for a user of the second client, a shopping service customized for a user of the second client, a web monitoring customized for a user of the second client, a link to a voice mail system subscribed to by a user of the second client, a link to a financial institution subscribed to by a user of the second client, a link to a home security system subscribed to by a user of the second client, a link to an email system subscribed to by a user of the second client, a link to a vehicle management system subscribed to by a user of the second client, a link to a mapping system subscribed to by a user of the second client, comprises a link to a telephony presence feature subscribed to by a user of the second client, and a link to a text messaging system subscribed to by a user of the second client.

56. The method defined in claim 55, wherein the data comprises at least one of a share price of a given company, a weather report for a given city, the current score in a sporting event, an indication of a recent addition to a blog or website, an indication of the traffic conditions on certain roads or bridges, news regarding the specific topics, a schedule or price grid for movies being shown at a certain movie theatre, commentary about each zodiac sign, the result of recent prize draws, current information regarding at least one of trains, flights and public transit, movement in a price of a certain product available from one or more suppliers, an advertisement for a product or service, a share price of companies in a user-selected portfolio, headline news from news sources in a user-selected set of news sources or regarding user-specific topics, a current traffic synopsis for a user-selected travel route, a feature of an online search including at least one of current status, number of results and result relevancy score, an availability of a property meeting user-defined criteria, an availability of a person of interest matching a user-defined profile, an availability of a position matching user-defined criteria, an availability of an item or service meeting user-defined criteria including a price, an indication of the most recent addition to a user-selected set of blogs or websites, a feature of voice mail messages in a voice mail box of the user including at least one of message urgency, number of messages, number of new messages and content of messages, a feature regarding the user's account including at least one of a current balance and a transaction listing, a current status of at least one sensor in the user's home, a feature of email messages in an electronic mailbox of the user including at least one of message urgency, number of messages, number of unread messages, content of messages, a feature of at least one vehicle in a fleet including at least one of vehicle location and vehicle diagnostics, the location of at least one items associated with an account of the user, an indication of whether a given potential called party is engaged in a telephone conversation, and a feature of text messages in a text message mailbox of the user including at least one of message urgency, number of text messages, number of unread text messages, content of text messages.

57. A method, comprising:
instantiating a first client of a messaging service;
requesting that a second client of the messaging service be linked to the first client, the second client associated with at least one data service;
displaying a contact list for the first client, the contact list for the first client including a screen name of the second client, the screen name of the second client being modifiable to convey data retrieved from the data service.

58. The method defined in claim 57, wherein said requesting includes entering an identifier of the second client in a process of adding the second client to the contact list for the first client.

59. The method defined in claim 57, wherein said requesting includes consulting a directory where an identifier of the second client is listed.

60. The method defined in claim 57, further comprising providing seed data to the second client for enabling the second client to retrieve the retrieved data.

61. The method defined in claim 57, further comprising enrolling with an applet that is associated with the second client.

62. The method defined in claim 61, wherein said enrolling takes place before said instantiating.

63. The method defined in claim 57, further comprising triggering an interaction with the second client based on the retrieved data.

64. The method defined in claim 63, wherein said interaction with the second client causes transmission of at least one instant message.

65. The method defined in claim 64, wherein said interaction with the second client causes display of further information regarding the retrieved data.

66. The method defined in claim 65, further comprising displaying said further information regarding the retrieved data.

67. The method defined in claim 66, wherein said further information regarding the retrieved data results in a modification to the retrieved data.

68. The method defined in claim 57, wherein the at least one data service includes a plurality of data services.

69. The method defined in claim 68, wherein the screen name of the second client comprises retrieved data from each of the plurality of data services.

* * * * *